US012665138B2

(12) United States Patent
Naguib et al.

(10) Patent No.: US 12,665,138 B2
(45) Date of Patent: Jun. 23, 2026

(54) ENGINEERING THE INTERLAYER SPACING BY PRE-INTERCALATION FOR HIGH PERFORMANCE SUPERCAPACITOR MXene ELECTRODES IN ROOM TEMPERATURE IONIC LIQUID

(71) Applicant: ADMINISTRATORS OF THE TULANE EDUCATIONAL FUND, New Orleans, LA (US)

(72) Inventors: Michael Naguib, New Orleans, LA (US); Kun Liang, New Orleans, LA (US)

(73) Assignee: ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 801 days.

(21) Appl. No.: 18/058,674

(22) Filed: Nov. 23, 2022

(65) Prior Publication Data

US 2025/0329504 A1 Oct. 23, 2025

Related U.S. Application Data

(60) Provisional application No. 63/283,003, filed on Nov. 24, 2021.

(51) Int. Cl.

*H01G 11/62* (2013.01)
*H01G 11/26* (2013.01)
*H01G 11/86* (2013.01)

(52) U.S. Cl.

CPC ............ *H01G 11/62* (2013.01); *H01G 11/26* (2013.01); *H01G 11/86* (2013.01)

(58) Field of Classification Search

CPC ......... H01G 11/62; H01G 11/26; H01G 11/86
See application file for complete search history.

(56) References Cited

U.S. PATENT DOCUMENTS

| | | | | |
|---|---|---|---|---|
| 11,424,083 B2* | 8/2022 | Dinca | H01G 11/30 | |
| 12,142,426 B2* | 11/2024 | Lin | H01G 11/62 | |
| 2011/0189548 A1* | 8/2011 | Xu | H01M 10/052 | 429/188 |
| 2013/0095351 A1* | 4/2013 | Gellett | H01G 9/035 | 429/9 |
| 2017/0148573 A1* | 5/2017 | Zhamu | H01G 11/46 | |
| 2017/0341010 A1* | 11/2017 | Dinca | C07F 15/065 | |
| 2021/0098203 A1* | 4/2021 | Dinca | H01G 11/48 | |
| 2022/0270831 A1* | 8/2022 | Lin | H01G 11/86 | |

FOREIGN PATENT DOCUMENTS

| | | | |
|---|---|---|---|
| CN | 115497753 A * | 12/2022 | H01G 11/30 |
| JP | 2022538118 A * | 8/2022 | H01G 11/86 |
| KR | 20210153904 A * | 12/2021 | H01G 11/86 |

(Continued)

OTHER PUBLICATIONS

Machine Translation of WO 2021/124958 (Year: 2021).*

(Continued)

*Primary Examiner* — Dion R. Ferguson
(74) *Attorney, Agent, or Firm* — Bell & Manning, LLC

(57) ABSTRACT

The present disclosure relates generally to a supercapacitor comprising an electrode having an intercalated MXene material, and a room temperature ionic liquid (RTIL), the supercapacitor having superior electrochemical performance.

20 Claims, 49 Drawing Sheets

(56) References Cited

FOREIGN PATENT DOCUMENTS

Figure 1A:
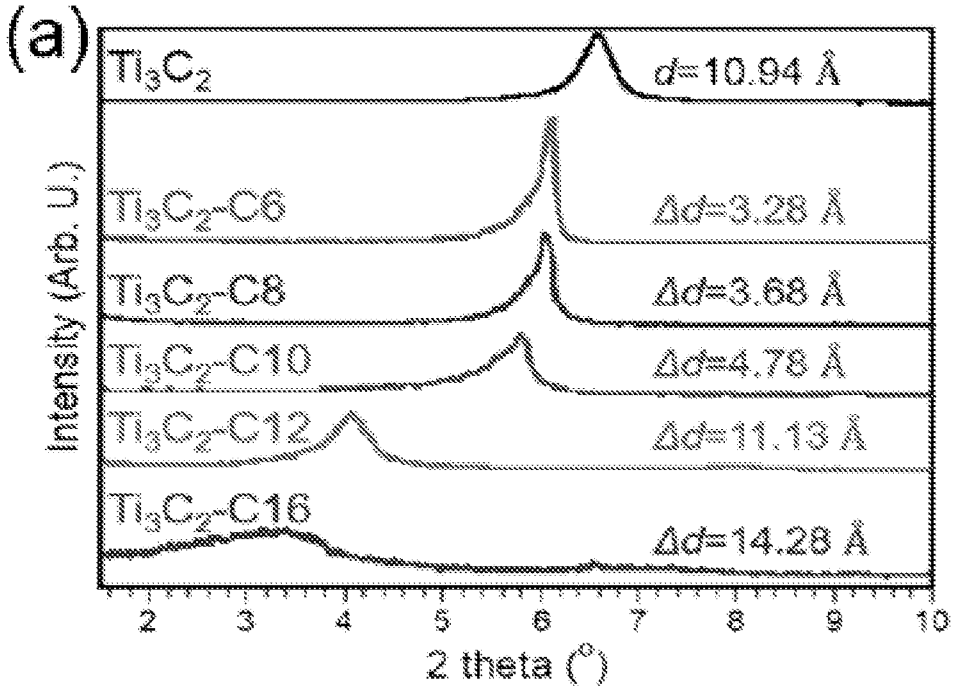

| | | | | | |
|---|---|---|---|---|---|
| WO | WO-2018066549 | A1 * | 4/2018 | ............. | H01G 11/02 |
| WO | WO-2018122797 | A1 * | 7/2018 | ............. | H01G 11/86 |
| WO | WO-2020004173 | A1 * | 1/2020 | ............. | H01G 11/62 |
| WO | WO-2020179585 | A1 * | 9/2020 | ............. | H01G 11/30 |
| WO | WO-2021124958 | A1 * | 6/2021 | ............. | H01G 11/30 |
| WO | WO-2024162390 | A1 * | 8/2024 | ............. | H01M 4/58 |

OTHER PUBLICATIONS

Abraham et al., GROMACS: High performance molecular simulations through multi-level parallelism from laptops to supercomputers, SoftwareX, 2015, 1-2, 19-25.
Allouche, Gabedit—A graphical user interface for computational chemistry softwares, J. Comput. Chem., 2011, 32, 17482.
Anasori et al., 2D metal carbides and nitrides (MXenes) for energy storage, Nat. Rev. Mater., 2017, 2, 16098.
Arnold et al., Nuclear Instruments and Methods in Physics Research Section A: Accelerators, Spectrometers, Detectors and Associated Equipment, 2014, 764, 156.
Augustyn et al., Pseudocapacitive oxide materials for high-rate electrochemical energy storage, Energy Environ. Sci., 2014, 7, 1597-614.
Azuah et al., DAVE: A Comprehensive Software Suite for the Reduction, Visualization, and Analysis of Low Energy Neutron Spectroscopic Data, J. Res. Natl. Inst. Stand. Technol., 2009, 114, 341-58.
Brezesinski et al., On the Correlation between Mechanical Flexibility, Nanoscale Structure, and Charge Storage in Periodic Mesoporous CeO2 Thin Films, ACS Nano, 2010, 4, 967-77.
Brezesinski et al., Ordered mesoporous ?- MoO3 with iso-oriented nanocrystalline walls for thin-film pseudocapacitors, Nat. Mater., 2010, 9, 146-51.
Bussi et al., Canonical sampling through velocity rescaling, J. Chem. Phys., 2007, 126, 014101.
Chaban et al., Acetonitrile Boosts Conductivity of Imidazolium Ionic Liquids, J. Phys. Chem. B, 2012, 116, 7719-27.
Chao et al., Array of nanosheets render ultrafast and high-capacity Na-ion storage by tunable pseudocapacitance, Nat. Commun., 2016, 7, 12122.
Chu et al., Large cation ethylammonium incorporated perovskite for efficient and spectra stable blue light-emitting diodes, Nat. Commun., 11(1):4165 (Aug. 2020).
Dall'Agnese et al., Capacitance of two-dimensional titanium carbide (MXene) and MXene/carbon nanotube composites in organic electrolytes, J. Power Sources, 2016, 306, 510-15.
Duay et al., Self-Limiting Electrodeposition of Hierarchical MnO2 and M(OH)2/MnO2 Nanofibril/Nanowires: Mechanism and Supercapacitor Properties, ACS Nano, 2013, 7, 1200-14.
Essmann et al., A smooth particle mesh Ewald method, J. Chem. Phys., 1995, 103, 8577.
Forghani et al., Method Comparison for Deconvoluting Capacitive and Pseudo-Capacitive Contributions to Electrochemical Capacitor Electrode Behavior, J. Electrochem. Soc. 2018, 165, A664.
Futamura et al., Partial breaking of the Coulombic ordering of ionic liquids confined in carbon nanopores, Nat. Mater., 2017, 16, 1225.
Gainaru et al., Mechanism of Conductivity Relaxation in Liquid and Polymeric Electrolytes: Direct Link between Conductivity and Diffusivity, J. Phys. Chem. B 2016, 120, 11074.
Ge et al., Novel hard carbon/graphite composites synthesized by a facile in situ anchoring method as high-performance anodes for lithium-ion batteries, RSC Adv., 2018, 8, 34682-9.
Ghidiu et al., Alkylammonium Cation Intercalation into Ti3C2 (MXene): Effects on Properties and Ion-Exchange Capacity Estimation, Chem. Mater., 2017, 29, 1099-106.
Ghidiu et al., Conductive two-dimensional titanium carbide 'clay' with high volumetric capacitance, Nature 2014, 516, 78-81.
Ghidiu et al., Ion-Exchange and Cation Solvation Reactions in Ti3C2 MXene, Chem. Mater., 2016, 28, 3507-14.
Gogotsi et al., Energy Storage in Nanomaterials—Capacitive, Pseudocapacitive, or Battery-like?, ACS Nano, 2018, 12, 2081.
Gowers et al., MDAnalysis: A Python Package for the Rapid Analysis of Molecular Dynamics Simulations, Proc. of the 15th Python in Science Conf. (SCIPY 2016), 98-105 (Sep. 2019).
He et al., Hierarchical Nanotubes Constructed by Carbon-Coated Ultrathin SnS Nanosheets for Fast Capacitive Sodium Storage, Angew. Chem. Int. Ed. 2017, 56, 12202.
Hess et al., GROMACS 4:? Algorithms for Highly Efficient, Load-Balanced, and Scalable Molecular Simulation, J. Chem. Theory Comput. 2008, 4, 435-47.
Hess et al., LINCS: A linear constraint solver for molecular simulations, J. Comput. Chem., 1997, 18, 1463.
Huang et al., Hydrolysis of 2D Transition-Metal Carbides (MXenes) in Colloidal Solutions, Inorg. Chem., 58: 1958-1966 (2019).
Ishai et al., Electrode polarization in dielectric measurements: a review, Meas. Sci. Technol., 2013, 24, 102001.
Ivol et al., Phenylacetonitrile (C6H5CH2CN) Ionic Liquid Blends as Alternative Electrolytes for Safe and High-Performance Supercapacitors, Molecules, 2020, 25, 2697.
Jha et al., High Energy Density Supercapacitor Based on a Hybrid Carbon Nanotube—Reduced Graphite Oxide Architecture, Adv. Energy Mater., 2012, 2, 438-44.
Jorgensen et al., Development and Testing of the OPLS All-Atom Force Field on Conformational Energetics and Properties of Organic Liquids, J. Am. Chem. Soc. 1996, 118, 11225.
Ju et al., Significantly Improved Cyclability of Conversion-Type Transition Metal Oxyfluoride Cathodes by Homologous Passivation Layer Reconstruction, Adv. Energy Mater. 2020, 10, 1903333.
Khamzin et al., Correction of the power law of ac conductivity in ion-conducting materials due to the electrode polarization effect, Phys. Rev. E, 2014, 89, 032303.
Kim et al., Bacterial outer membrane vesicles suppress tumor by interferon-?-mediated antitumor response, Nat. Commun. 2017, 8, 626.
Kim et al., High-Performance Supercapacitors Based on Poly(ionic liquid)-Modified Graphene Electrodes, ACS Nano 2011, 5, 436-42.
Kim et al., Tailoring the pore structure of carbon nanofibers for achieving ultrahigh-energy-density supercapacitors using ionic liquids as electrolytes, J. Mater. Chem. A 2016, 4, 4763-70.
Köddermann et al., Molecular Dynamic Simulations of Ionic Liquids: A Reliable Description of Structure, Thermodynamics and Dynamics, ChemPhysChem, 2007, 8, 2464-70.
Lai et al., Breaking the Limits of Ionic Liquid-Based Supercapacitors: Mesoporous Carbon Electrodes Functionalized with Manganese Oxide Nanosplotches for Dense, Stable, and Wide-Temperature Energy Storage, Adv. Funct. Mater., 2018, 28, 1801298.
Li et al., Carbonozed nanocellulose sustainanly boosts the performance of activated carbon in ionic liquid supercapacitors, Nano Energy, 25: 161-169 (2016).
Liang et al., Engineering the interlayer spacing by pre-intercalation for high performance supercapacitor MXene electrodes in room temperature ionic liquid, Adv. Funct. Mater., 31(33):2104007 (Jun. 18, 2021 first published).
Liang et al., In situ synthesis of SWNTs@MnO2/polypyrrole hybrid film as binder-free supercapacitor electrode, Nano Energy, 9: 245-251 (2014).
Liang et al., NiS2/FeS Holey Film as Freestanding Electrode for High-Performance Lithium Battery, Adv. Energy Mater., 2017, 7, 1701309.
Liang et al., Strained W(SexS1-x)2 Nanoporous Films for Highly Efficient Hydrogen Evolution, ACS Energy Lett., 2017, 2, 1315-20.
Lin et al., Capacitance of Ti3C2Tx MXene in ionic liquid electrolyte, J. Power Sources 2016, 326, 575-9.
Lin et al., Electrochemical and in-situ X-ray diffraction studies of Ti3C2Tx MXene in ionic liquid electrolyte, Electrochem. Commun., 72: 50-53 (2016).
Lin et al.. MXenes for Supercapacitor Application. In: Anasori B., Gogotsi Y. (eds) 2D Metal Carbides and Nitrides (MXenes). Springer, 349-365 (2019).
Lindahl et al., GROMACS 3.0: a package for molecular simulation and trajectory analysis, Molecular Modeling Annual, 2001, 7, 306-17.

(56) References Cited

OTHER PUBLICATIONS

Lindström et al., Li+ Ion Insertion in TiO2 (Anatase). 2. Voltammetry on Nanoporous Films, J. Phys. Chem. B, 1997, 101, 7717-22.
Liu et al., Graphene-Based Supercapacitor with an Ultrahigh Energy Density, Nano Lett. 2010, 10, 4863-8.
Lukatskaya et al., Cation intercalation and high volumetric capacitance of two-dimensional titanium carbide, Science, 2013, 341, 1502-5.
Lukatskaya et al., Multidimensional materials and device architectures for future hybrid energy storage, Nat. Commun. 2016, 7, 12647.
Lukatskaya et al., Ultra-high-rate pseudocapacitive energy storage in two-dimensional transition metal carbides, Nat. Energy, 2017, 2, 17105.
Mamontov et al., A time-of-flight backscattering spectrometer at the Spallation Neutron Source, BASIS, Rev. Sci. Instrum. 2011, 82, 085109.
Mashtalir et al., Intercalation and delamination of layered carbides and carbonitrides, Nat. Commun., 2013, 4, 1716.
McGibbon et al., MDTraj: A Modern Open Library for the Analysis of Molecular Dynamics Trajectories, Biophys. J., 2015, 109, 15.
Meyer et al., The high-flux backscattering spectrometer at the NIST Center for Neutron Research, Rev. Sci. Instrum., 2003, 74, 2759.
Mourad et al., Biredox ionic liquids with solid-like redox density in the liquid state for high-energy supercapacitors, Nat. Mater., 2017, 16, 446-53.
Muckley et al., Multimodality of Structural, Electrical, and Gravimetric Responses of Intercalated MXenes to Water, ACS Nano, 2017, 11, 11118-26.
MXene_polymer_emim GitHub Repository, downloaded from the Internet at: <https://github.com/rmatsum836/mxene_polymer_emim> (Mar. 22, 2021).
Naguib et al., Two-Dimensional Nanocrystals Produced by Exfoliation of Ti3AlC2, Adv. Mater. 2011, 23, 4248-53.
Naguib et al., Two-Dimensional Transition Metal Carbides, ACS Nano, 2012, 6, 132231.
Osti et al., Effect of Metal Ion Intercalation on the Structure of MXene and Water Dynamics on its Internal Surfaces, ACS Appl. Mater. Interfaces, 2016, 8, 8859.
Osti et al., Humidity Exposure Enhances Microscopic Mobility in a Room-Temperature Ionic Liquid in MXene, J. Phys. Chem. C, 2018, 122, 27561.
Osti et al., Microscopic dynamics in room-temperature ionic liquids confined in materials for supercapacitor applications, Sustain. Energy Fuels, 2020, 4, 1554-76.
Osti et al., Solvent Polarity Governs Ion Interactions and Transport in a Solvated Room-Temperature Ionic Liquid, J. Phys. Chem. Lett.2017, 8, 167-71.
Pronk et al., GROMACS 4.5: a high-throughput and highly parallel open source molecular simulation toolkit, Bioinformatics, 2013, 29, 845-54.
Raccichini et al., Boosting the power performance of multilayer graphene as lithium-ion battery anode via unconventional doping with in-situ formed Fe nanoparticles, Sci. Rep., 2016, 6, 23585.
Rogers et al., Chemistry. Ionic liquids—solvents of the future?, Science 2003, 302(5646):792-3.
Sankar et al., The ternary MnFe2O4/graphene/polyaniline hybrid composite as negative electrode for supercapacitors, J. Power Sources, 2015, 275, 399-407.
Sathiya et al., V2O5-Anchored Carbon Nanotubes for Enhanced Electrochemical Energy Storage, J. Am. Chem. Soc., 2011, 133, 16291-9.
Shao et al., Mechanism analysis of the capacitance contributions and ultralong cycling-stability of the isomorphous MnO2@MnO2 core/shell nanostructures for supercapacitors, J. Mater. Chem. A, 2015, 3, 6168-76.
Shi et al., 3D interpenetrating assembly of partially oxidized MXene confined Mn—Fe bimetallic oxide for superior energy storage in ionic liquid, Electrochim. Acta, 2020, 334, 135546.
Shi et al., Porous g-C3N4 and MXene Dual-Confined FeOOH Quantum Dots for Superior Energy Storage in an Ionic Liquid, Adv. Sci., 2020, 7, 1901975.
Simon et al., Perspectives for electrochemical capacitors and related devices, Nat. Mater., 2020, 19, 1151-63.
Simon et al., Where Do Batteries End and Supercapacitors Begin?, Science, 2014, 343, 1210-1.
Stacy et al., Fundamental Limitations of Ionic Conductivity in Polymerized Ionic Liquids, Macromolecules, 2018, 51, 8637-45.
Summers et al., MoSDeF, a python framework enabling large-scale computational screening of soft matter: application to chemistry-property relationships in lubricating monolayer films, J. Chem. Theory Comput., 2020, 16, 1779-93.
Thompson et al., Scalable Screening of Soft Matter: A Case Study of Mixtures of Ionic Liquids and Organic Solvents, J. Phys. Chem. B, 2019, 123, 1340-7.
Tsai et al., Outstanding performance of activated graphene based supercapacitors in ionic liquid electrolyte from ?50 to 80° C., Nano Energy, 2013, 2, 403-11.
Tsuzuki et al., Molecular Dynamics Simulations of Ionic Liquids: Cation and Anion Dependence of Self-Diffusion Coefficients of Ions, J. Phys. Chem. B, 2009, 113, 10641-9.
Wang et al., Influences from solvents on charge storage in titanium carbide MXenes, Nat. Energy, 2019, 4, 241-8.
Wang et al., Interconnected Carbon Nanosheets Derived from Hemp for Ultrafast Supercapacitors with High Energy, ACS Nano, 2013, 7, 5131-41.
Wang et al., Latest advances in supercapacitors: from new electrode materials to novel device designs, Chem. Soc. Rev., 2017, 46, 6816-54.
Wang et al., Pseudocapacitive Contributions to Electrochemical Energy Storage in TiO2 (Anatase) Nanoparticles, J. Phys. Chem. C 2007, 111, 14925-31.
Welton, Room-Temperature Ionic Liquids. Solvents for Synthesis and Catalysis, Chem. Rev. 1999, 99, 2071-84.
Xu et al., Length-dependent thermal conductivity in suspended single-layer graphene, Nat. Commun. 2014, 5, 3689.
Yan et al., Toward the Experimental Understanding of the Energy Storage Mechanism and Ion Dynamics in Ionic Liquid Based Supercapacitors, Adv. Energy Mater., 2018, 8, 1800026.
Yang et al., Ionic liquids and derived materials for lithium and sodium batteries, Chem. Soc. Rev., 47: 2020-64 (2018).
Yu et al., Ionic Liquid-Based Electrolytes for Supercapacitor and Supercapattery, Front. Chem., 2019, 7, 272.
Yu et al., MXene-Bonded Activated Carbon as a Flexible Electrode for High-Performance Supercapacitors, ACS Energy Lett. 2018, 3, 1597-603.
Zeraati et al., Improved synthesis of Ti3C2Tx MXenes resulting in exceptional electrical conductivity, high synthesis yield, and enhanced capacitance, Nanoscale, 2021, 13, 3572-80.
Zhang et al., Carbon-based materials as supercapacitor electrodes, Chem. Soc. Rev., 2009, 38, 2520-31.
Zhang et al., Molecular Investigation of Oxidized Graphene: Anatomy of the Double-Layer Structure and Ion Dynamics, J. Phys. Chem. C, 2019, 123, 12583-91.
Zheng et al., Ionic liquid pre-intercalated MXene films for ionogel-based flexible micro-supercapacitors with high volumetric energy density, J. Mater. Chem. A, 2019, 7, 9478-85.
Zhu et al., Carbon-based supercapacitors produced by activation of graphene, Science, 332(6037):1537-41 (2011).

* cited by examiner

ENGINEERING THE INTERLAYER SPACING BY PRE-INTERCALATION FOR HIGH PERFORMANCE SUPERCAPACITOR MXene ELECTRODES IN ROOM TEMPERATURE IONIC LIQUID

PRIORITY CLAIM

This application claims priority to and the benefit of U.S. Provisional Patent Application Ser. No. 63/283,003, filed Nov. 24, 2021, entitled "ENGINEERING THE INTERLAYER SPACING BY PRE-INTERCALATION FOR HIGH PERFORMANCE SUPERCAPACITOR MXENE ELECTRODES IN ROOM TEMPERATURE IONIC LIQUID", the entire contents of which are hereby incorporated by reference and relied upon.

GOVERNMENT RIGHTS

This invention was made with U.S. government support under grant number DE-AC05-00OR22725 awarded by the Department of Energy. The U.S. government has certain rights in the invention.

FIELD

The disclosure relates generally to supercapacitors comprising an intercalated MXene material having superior electrochemical performances in room temperature ionic liquids (RTILs). More specifically, the disclosure relates to a supercapacitor comprising an electrode having an intercalated MXene material having increased spacing between layers, and a room temperature ionic liquid (RTIL) based electrolyte.

INTRODUCTION

Electrochemical capacitors, also called supercapacitors, are an important type of energy storage system that deliver energy in seconds or minutes posing them at a unique position on the power density scale between that of dielectric capacitors and batteries. While energy density of a supercapacitor is not as high as that of batteries, discovering new electrode materials and engineering them to become compatible with large voltage window electrolytes can be an approach to overcome this challenge.

MXenes are a fast-growing family of electrically conductive two-dimensional (2D) transition metal carbides, nitrides or carbonitrides. More than 40 members of the MXene family have emerged since 2011. MXenes combine the metallic conductivity of transition metal carbides with a hydrophilic hydroxyl- or oxygen-terminated surfaces. With their unique layered structures, excellent conductivities (up to approximately 24,000 S $cm^{-1}$), and capability to host cations and/or a wide range of organic and inorganic molecules, MXenes have shown promising performance as electrodes for electrochemical energy storage in aqueous electrolytes. Microporous $Ti_3C_2T_x$ MXene films have been reported to deliver up to 210 F $g^{-1}$ at a 10 V $s^{-1}$ scan rate when tested in sulfuric acid aqueous electrolyte and MXene hydrogels have been reported to store a volumetric capacitance of about 1,500 F $cm^{-3}$. High specific capacitances can be achieved at high rates in aqueous electrolytes, but the limited potential window due to water decomposition is an obstacle to obtain high energy density devices. Moreover, oxidation of MXenes under high anodic potentials in aqueous electrolytes further limits their use as cathodes in asymmetric devices.

Room-temperature ionic liquids (RTILs) may be promising alternatives to aqueous electrolytes, owing to their wide potential windows (normally at about 2.5 to about 4.0 V), low vapor pressure, and high stability. Several studies have reported using RTILs as electrolytes, however, the capacitances are lower than those of aqueous electrolytes. The reason for this is because the cation size of RTILs, such as 1-ethyl-3-methylimidazolium ($EMIM^+$), is much larger than proton and other cations commonly used in aqueous systems (e.g., $H^+$, $Li^+$, $Na^+$, $K^+$), which limits the accessibility and transport of RTIL cations in the porous electrodes.

While MXenes can host ions beyond protons, the capacitance and rate capability are not as high as those achieved in sulfuric acid aqueous electrolytes. It has been reported that specific capacitances of 33 and 70 F $g^{-1}$ can be achieved for multilayer $Ti_3C_2T_x$ ($T_x$ is the combination of different termination groups, e.g. —F, —O, —OH) powders and delaminated $Ti_3C_2T_x$ papers, respectively, in 1 M 1-ethyl-3-methylimidazolium bis-(trifluoromethylsulfonyl)-imide (EMIMTFSI) in acetonitrile (ACN). After forming a composite with carbon nanotubes, the specific capacitance can increase to 85 F $g^{-1}$ for the CNT/$Ti_3C_2T_x$ composite. A capacitance of 70 F $g^{-1}$ using a $Ti_3C_2T_x$ ionogel electrode in a neat EMIMTFSI electrolyte has also been reported.

Accordingly, a need exists for new and improved supercapacitors using improved electrode materials in various room-temperature ionic liquids (RTILs) that addresses one or more of the technical issues discussed above and new methods of making same.

SUMMARY

The present technology includes electrode materials and supercapacitors, and their methods of preparation and use.

One aspect of the disclosure provides a supercapacitor comprising: an electrode comprising an electrode material, the electrode material comprising: $M_{n+1}X_nT_x$ layers having interlayers therebetween, wherein the M is selected from the group of Group 3, 4, 5, 6, or 7 transition metals, wherein X is C, N, or a combination thereof, wherein n is 1, 2, 3, or 4, wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof; and an intercalant located in the interlayers. The supercapacitor can further comprise an electrolyte comprising a room temperature ionic liquid (RTIL). Each of the $M_{n+1}X_nT_x$ layers have two surfaces. The $T_x$ are the termination groups on one or both surfaces of each of the $M_{n+1}X_nT_x$ layers. In embodiments, the intercalant comprises an alkyl-ammonium (AA) cation, a cationic polymer, a nanoparticle, a nanosheet, a quantum dot, or a combination thereof.

Another aspect of the disclosure provides a method of preparing a supercapacitor, the method comprising: incorporating into an electrode an electrode material comprising $M_{n+1}X_nT_x$ layers having interlayers therebetween and an intercalant located in at least a portion of the interlayers, wherein M is selected from the group of Group 3, 4, 5, 6, and 7 transition metals and a combination thereof, wherein X is C, N, or a combination thereof, wherein n is 1, 2, 3, or 4, wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof; incorporating the electrode into the supercapacitor; and incorporating an electrolyte comprising a room-temperature ionic liquid (RTIL) into the supercapacitor.

Another aspect of the disclosure provides an electrode material comprising: $M_{n+1}X_nT_x$ layers having interlayers therebetween and an intercalant located in at least a portion of the interlayers, wherein M is selected from the group of Group 3, 4, 5, 6, and 7 transition metals and a combination thereof, wherein X is C, N, or a combination thereof, wherein n is 1, 2, 3, or 4, wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof; and the $M_{n+1}X_nT_x$ layers further comprising an organic cation of an RTIL located in at least a portion of the interlayers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the disclosure.

FIGS. 1A-1F. AA cation-intercalated $Ti_3C_2T_x$ electrodes. (a), XRD patterns; (b), Atomically-resolved cross-sectional HAADF-STEM image of [1-100] oriented $Ti_3C_2$-C12 material; (c), CV curves at 1 mV $s^{-1}$; (d), Specific capacitances at different scan rates; (e), Determination of controlled steps, b values, through the logarithm of discharge peak current ($i_p$) versus logarithm of scan rate (v), the b values estimated by fitting the data in (e) are 0.64, 0.66, 0.73, 0.85, 0.93, and 0.81 for $Ti_3C_2$, $Ti_3C_2$-C6, $Ti_3C_2$-C8, $Ti_3C_2$-C10, $Ti_3C_2$-C12 and $Ti_3C_2$-C16, respectively; and (f), Contributions from surface and diffusion-controlled processes at a scan rate of 20 mV $s^{-1}$. 1 M EMIMTFSI in ACN was used as electrolyte for results shown in (c)-(f).

FIGS. 2A-2D. Structural and dynamic analysis. (a), (b), Ex-situ XRD patterns of pristine $Ti_3C_2T_x$ and $Ti_3C_2$-C12 electrodes after different electrochemical treatments, respectively; (c), Representative QENS spectra at Q=0.9 Å$^{-1}$ of pristine $Ti_3C_2T_x$ and $Ti_3C_2$-C12 electrode after charging, where the intensity scale has been truncated for clarity. Inset shows the dependence with $Q^2$ of HWHMs of the two Lorentzian functions obtained from the model fit as described in the text; (d), Real part of admittance ($Y'(\omega)\sim\sigma'(\omega)$) of AA cations intercalated $Ti_3C_2T_x$ free-standing electrode at open circuit potential with 1 M EMIMTFSI in ACN electrolyte. Inset shows dependence of conductivity relaxation time on the chain length for $Ti_3C_2$-C10, $Ti_3C_2$-C12, and $Ti_3C_2$-C16 electrodes.

FIGS. 3A-3H. Theoretical simulations. (a), (b), Snapshots from MD simulations of $Ti_3C_2(OH)_2$—C12 (spacing between the sheets of 1.31 nm) and $Ti_3C_2(OH)_2$—C16 (spacing between the sheets of 1.63 nm) systems displaying AA (green), $EMIM^+$ (red), and $TFSI^-$ ions (blue). MXene atoms include oxygen (red), hydrogen (white), titanium (cyan), and carbon (pink). The simulation is replicated in all three directions via periodic boundary conditions. (c)-(h), Normalized orientation profiles of $Ti_3C_2(OH)_2$—C12 and $Ti_3C_2(OH)_2$—C16, number density profiles of $EMIM^+$, AA, and $TFSI^-$ in $Ti_3C_2(OH)_2$—C12 and $Ti_3C_2(OH)_2$—C16, number density profiles of specific atoms of $Ti_3C_2(OH)_2$—C12 and $Ti_3C_2(OH)_2$—C16, respectively.

Figure 4A:
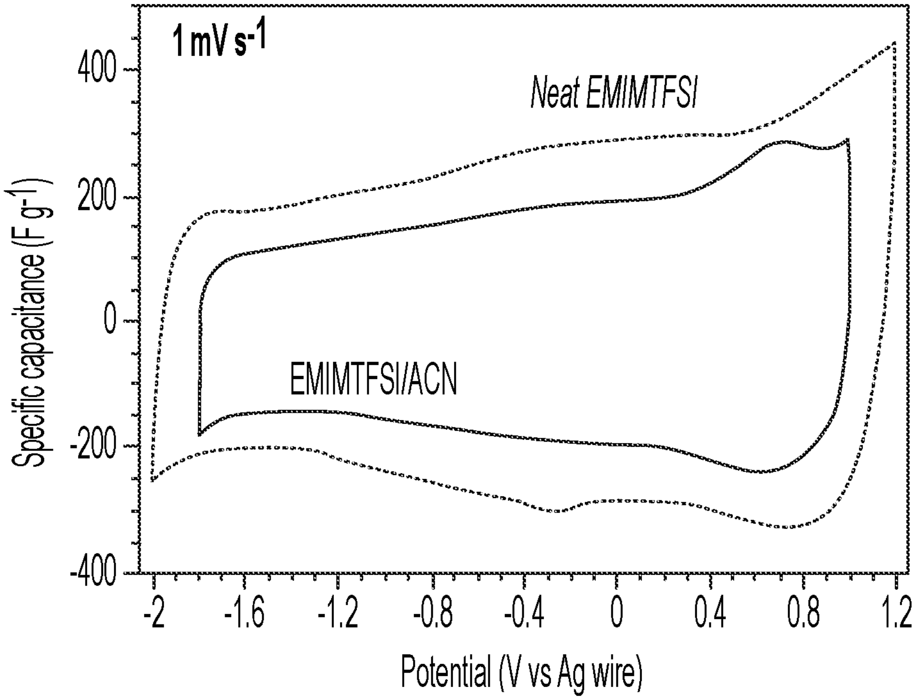
Figure 4B:
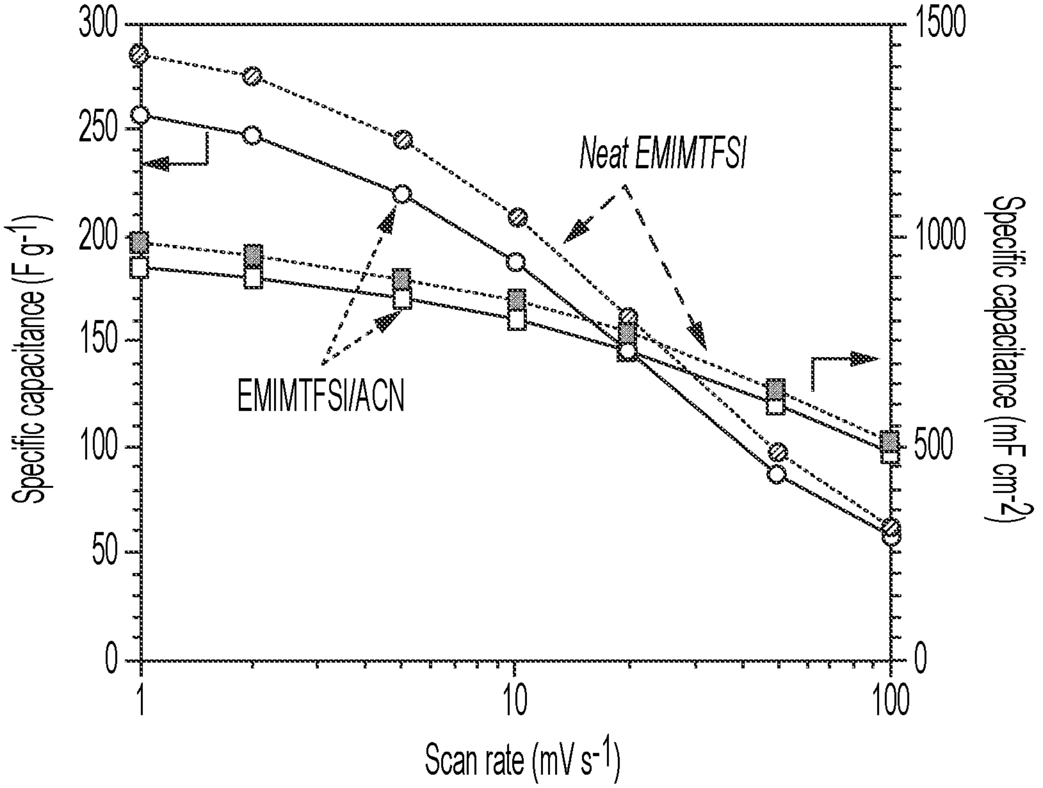
Figure 4C:
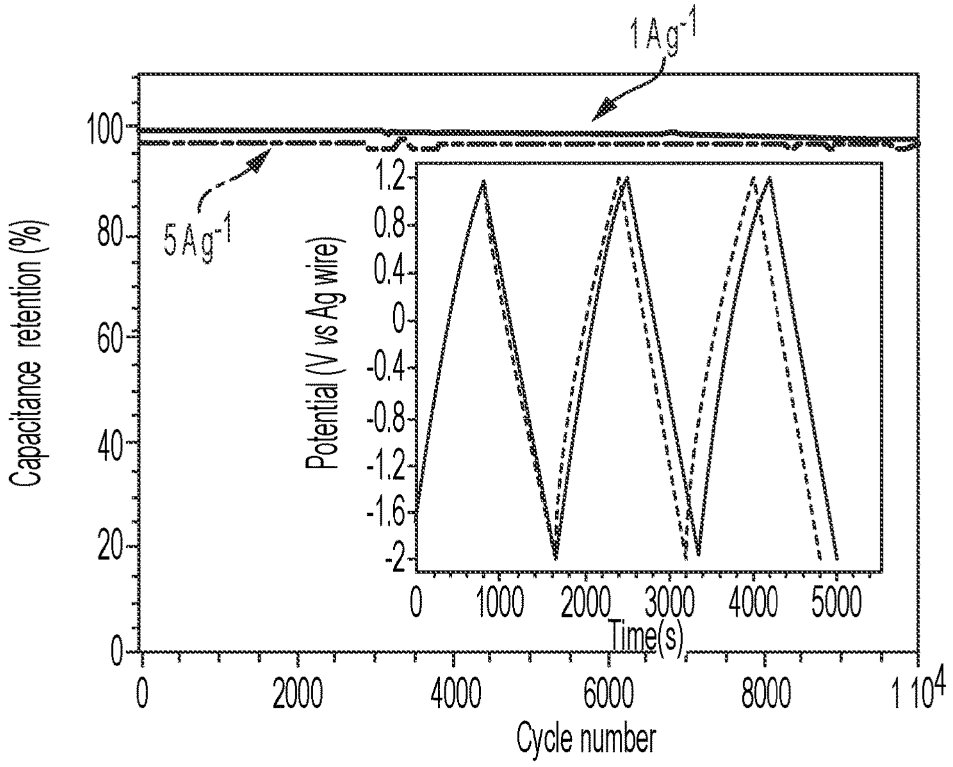

FIGS. 4A-4C. Electrochemical performance of $Ti_3C_2$-C12 electrode in neat EMIMTFSI. (a), CV curves of $Ti_3C_2$-C12 electrode with neat EMIMTFSI and 1 M EMIMTFSI in ACN electrolytes at 1.0 mV $s^{-1}$. (b), Specific capacitances at different scan rates. (c), Long-term cycling testing at 1.0 and 5.0 A $g^{-1}$, respectively. The inset is the GCD curves for the first (solid line) and last (dashed line) three cycles at a specific current of 1.0 A $g^{-1}$.

Figure 5:
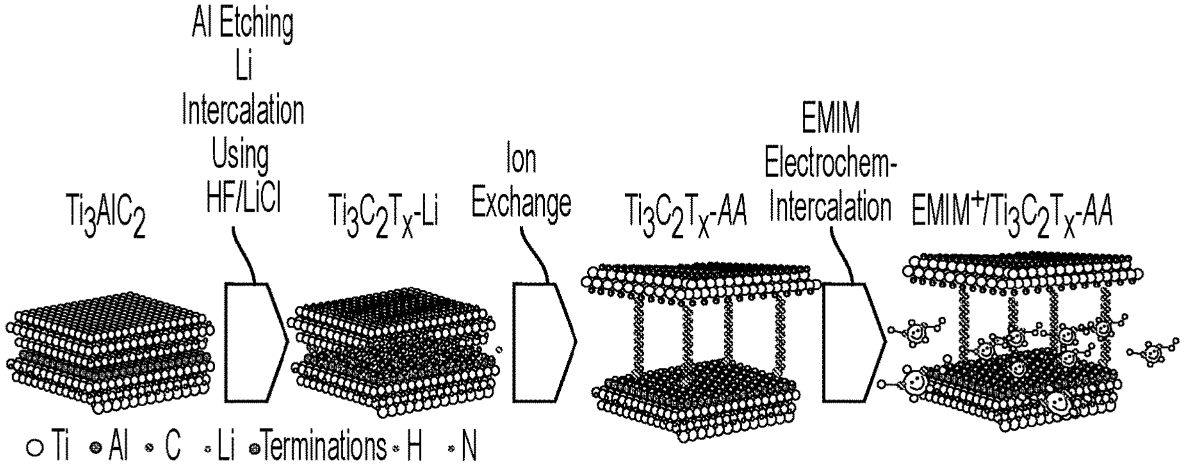

FIG. 5. A schematic for the preparation of AA-$Ti_3C_2T_x$ and intercalation of EMIM.

Figure 6A:
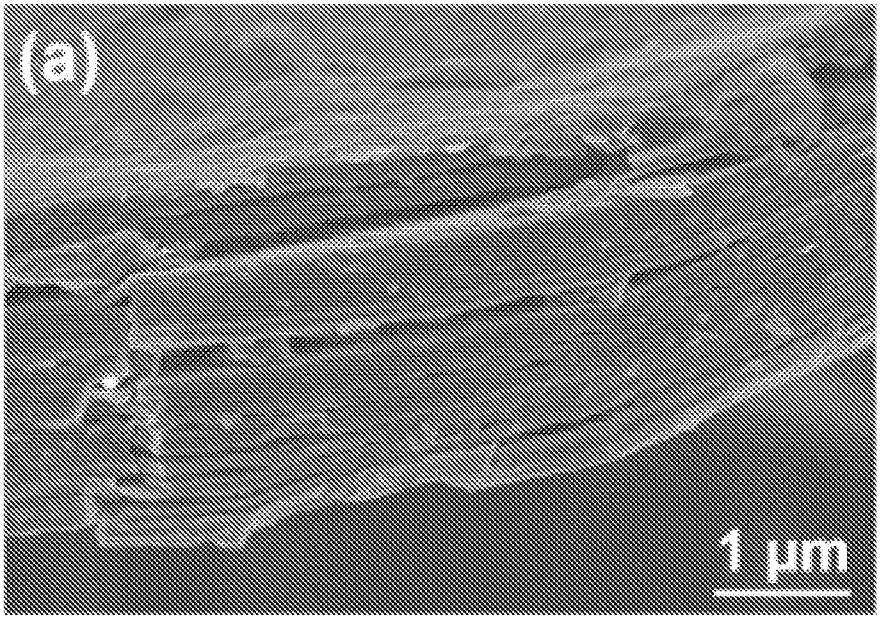
Figure 6B:
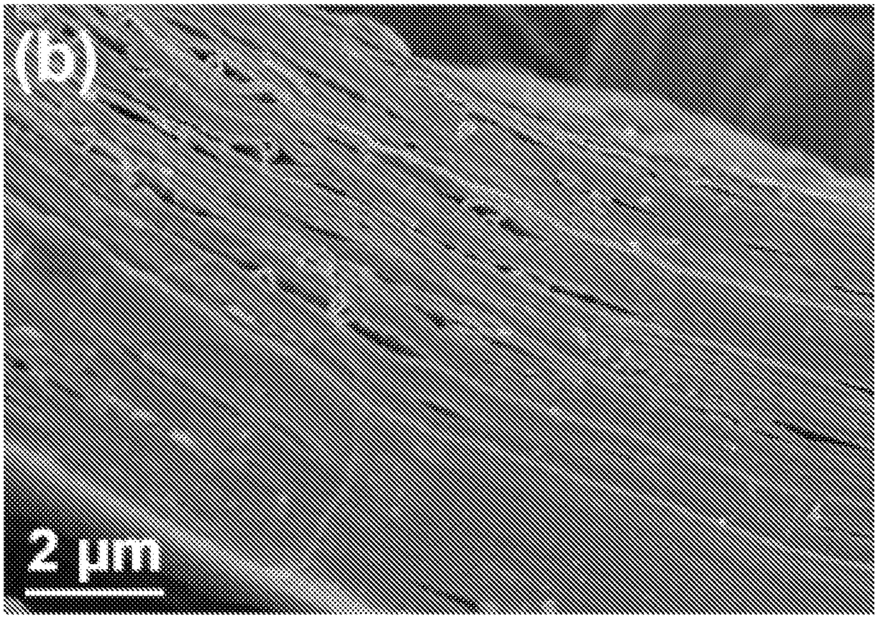

FIGS. 6A-6B. SEM images of (a) pristine $Ti_3C_2T_x$ and (b) alkylammonium cations intercalated $Ti_3C_2T_x$ materials.

Figure 7:
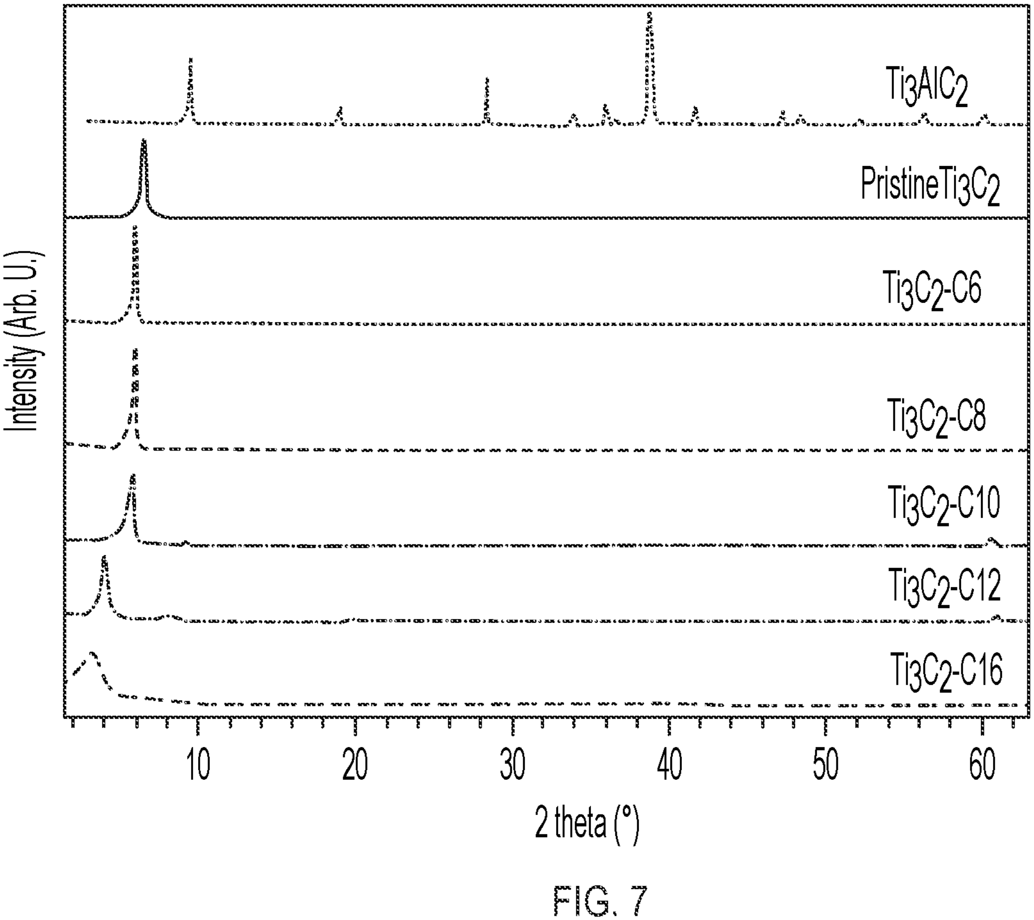

FIG. 7. XRD patterns of alkylammonium cations intercalated $Ti_3C_2T_x$ materials.

Figure 8A:
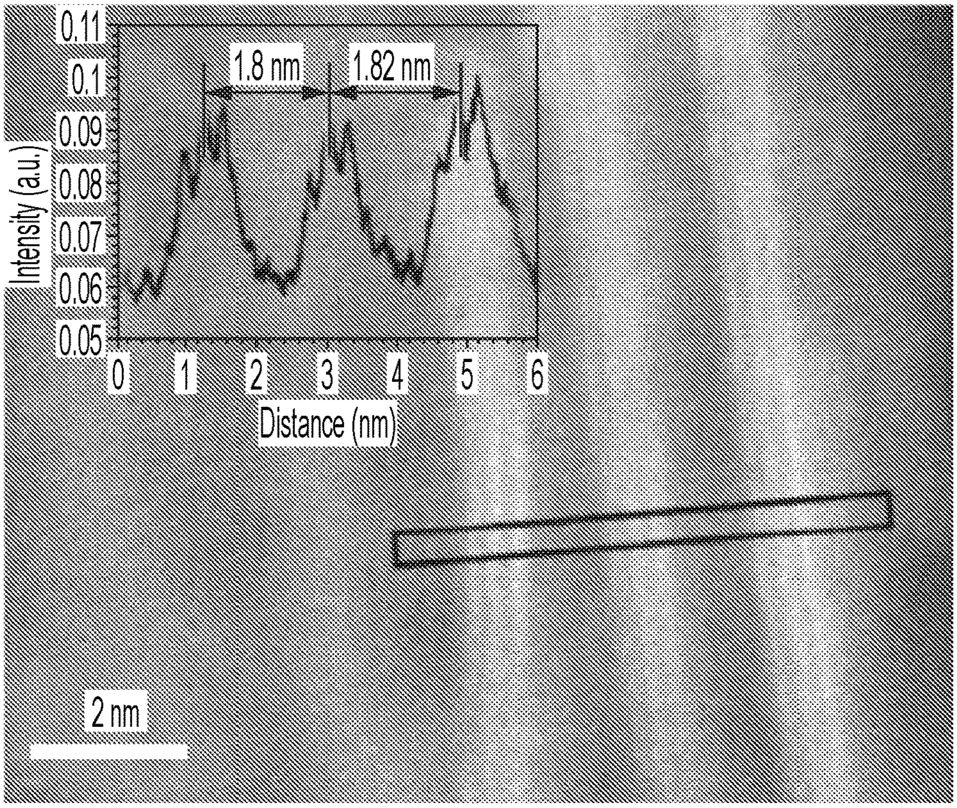
Figure 8B:
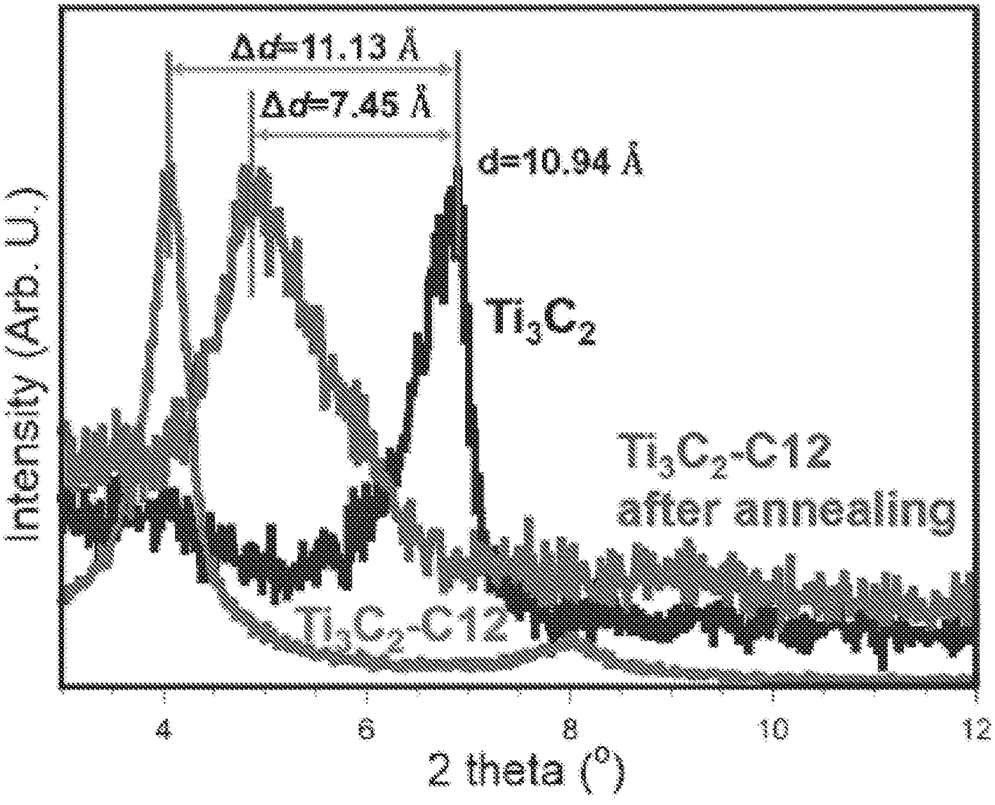

FIGS. 8A-8B. (a) STEM and (b) XRD curves of alkylammonium cations intercalated $Ti_3C_2T_x$ materials after vacuum annealing at 110° C. for 4 h, respectively.

Figure 9:
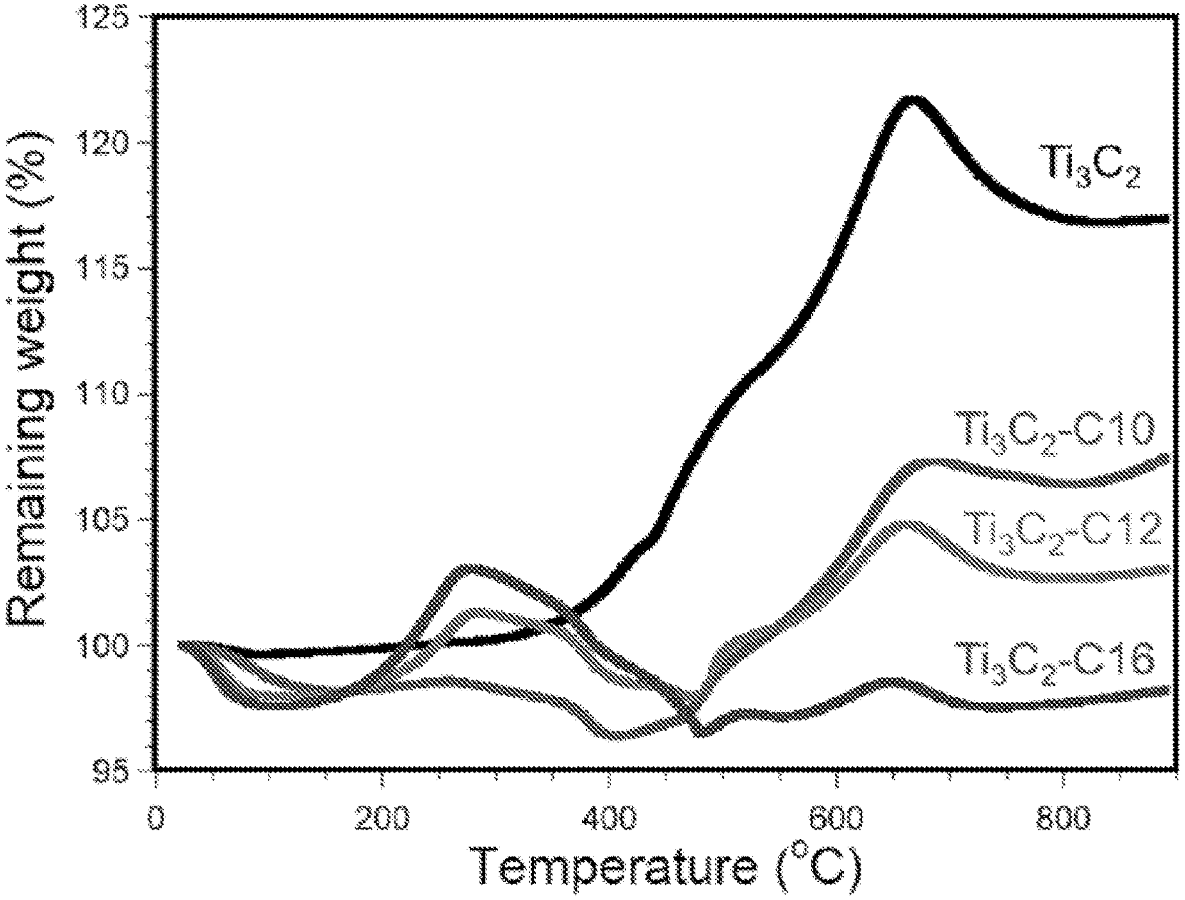
Figure 10A:
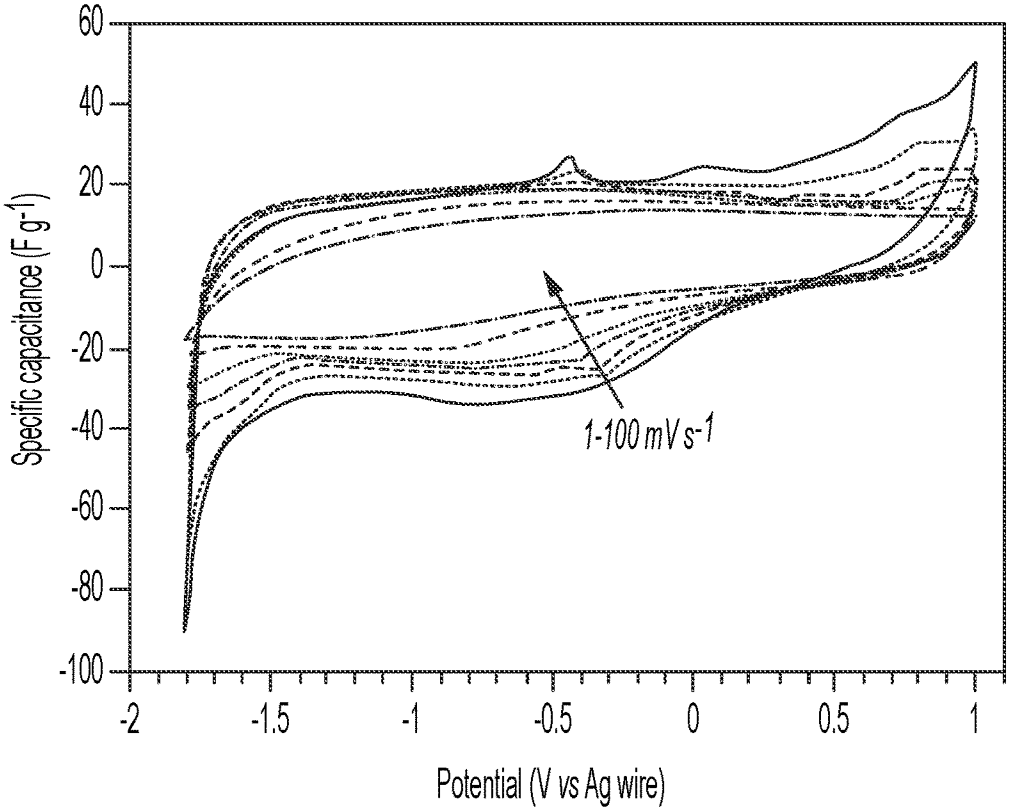
Figure 10B:
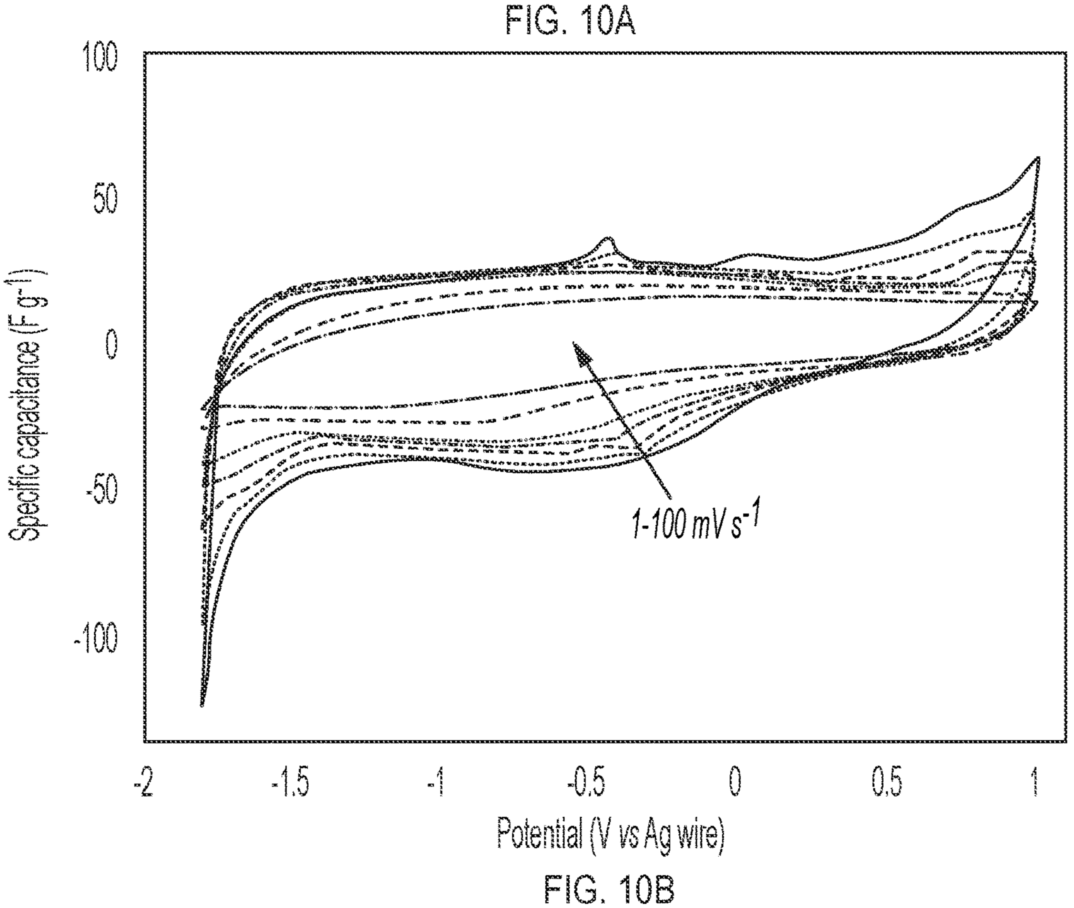
Figure 10C:
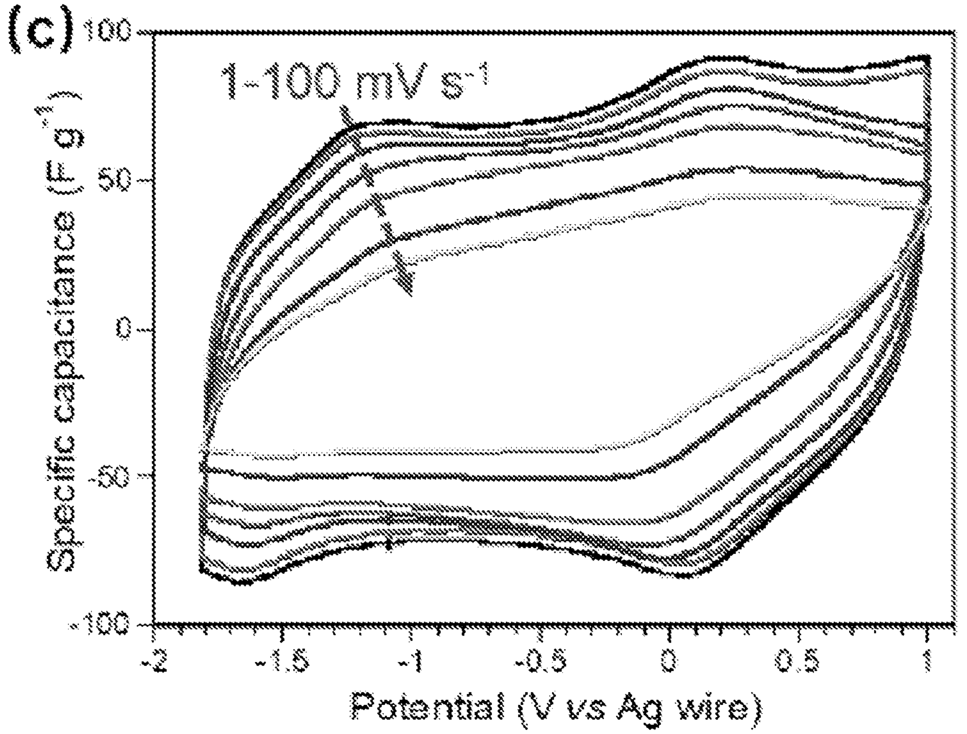
Figure 10D:
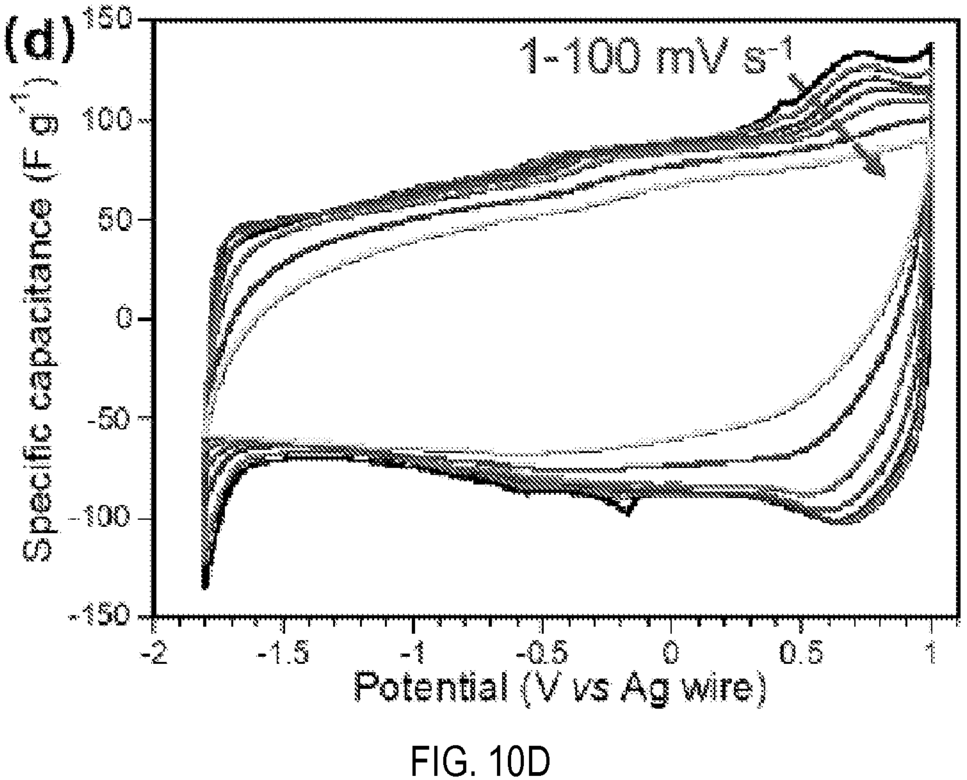
Figure 10E:
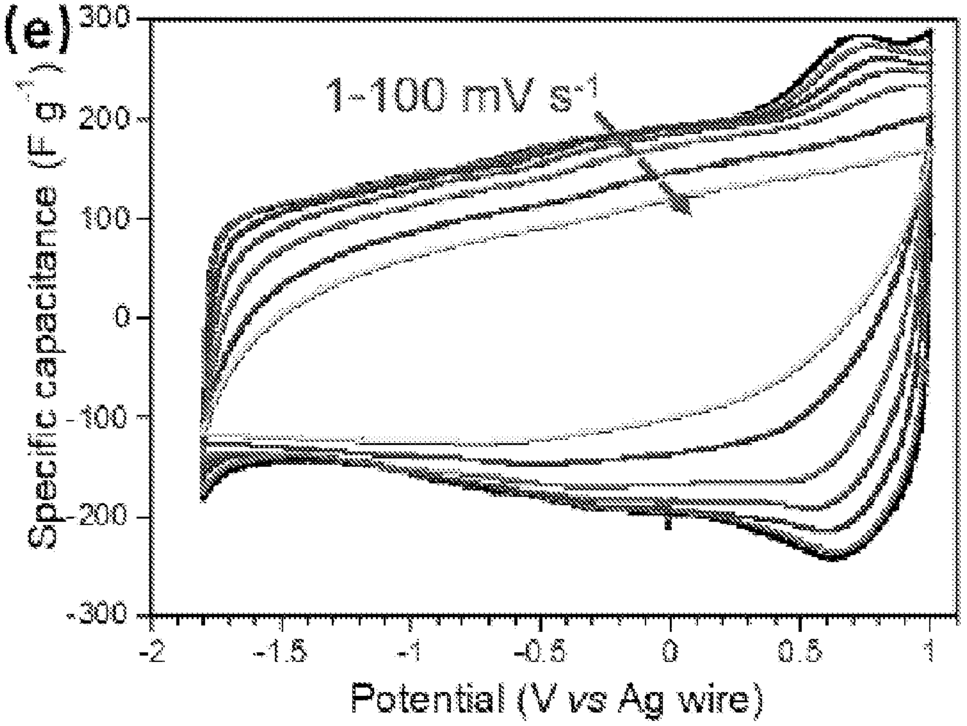
Figure 10F:
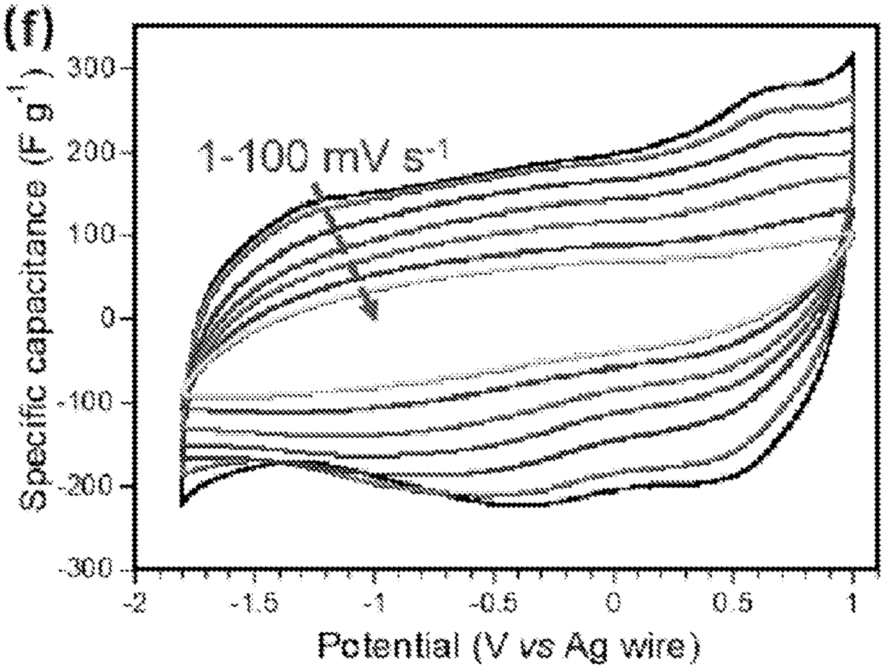

FIG. 9. TGA curves of alkylammonium (AA) cations intercalated $Ti_3C_2T_x$ MXenes.

FIGS. 10A-10F. Three-electrode CV curves of alkylammonium cations intercalated $Ti_3C_2T_x$ electrode with 1 M EMIMTFSI in ACN electrolyte. (a-f) CV curves of pristine $Ti_3C_2T_x$, $Ti_3C_2$-C6, $Ti_3C_2$-C8, $Ti_3C_2$-C10, $Ti_3C_2$-C12, and $Ti_3C_2$-C16, respectively. The scan rates from the outer cycle to the inner cycle are 1, 2, 5, 10, 20, 50, and 100 mV $s^{-1}$.

Figure 11A:
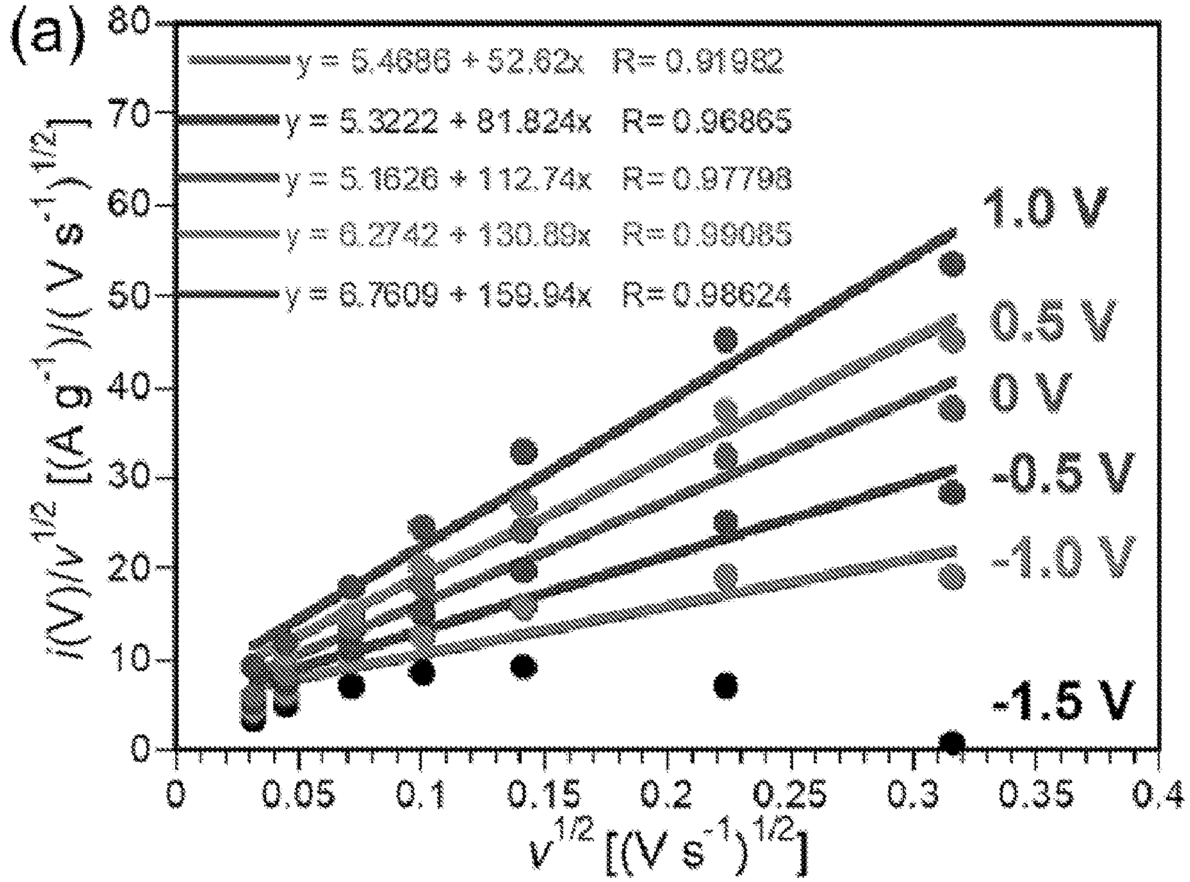
Figure 11B:
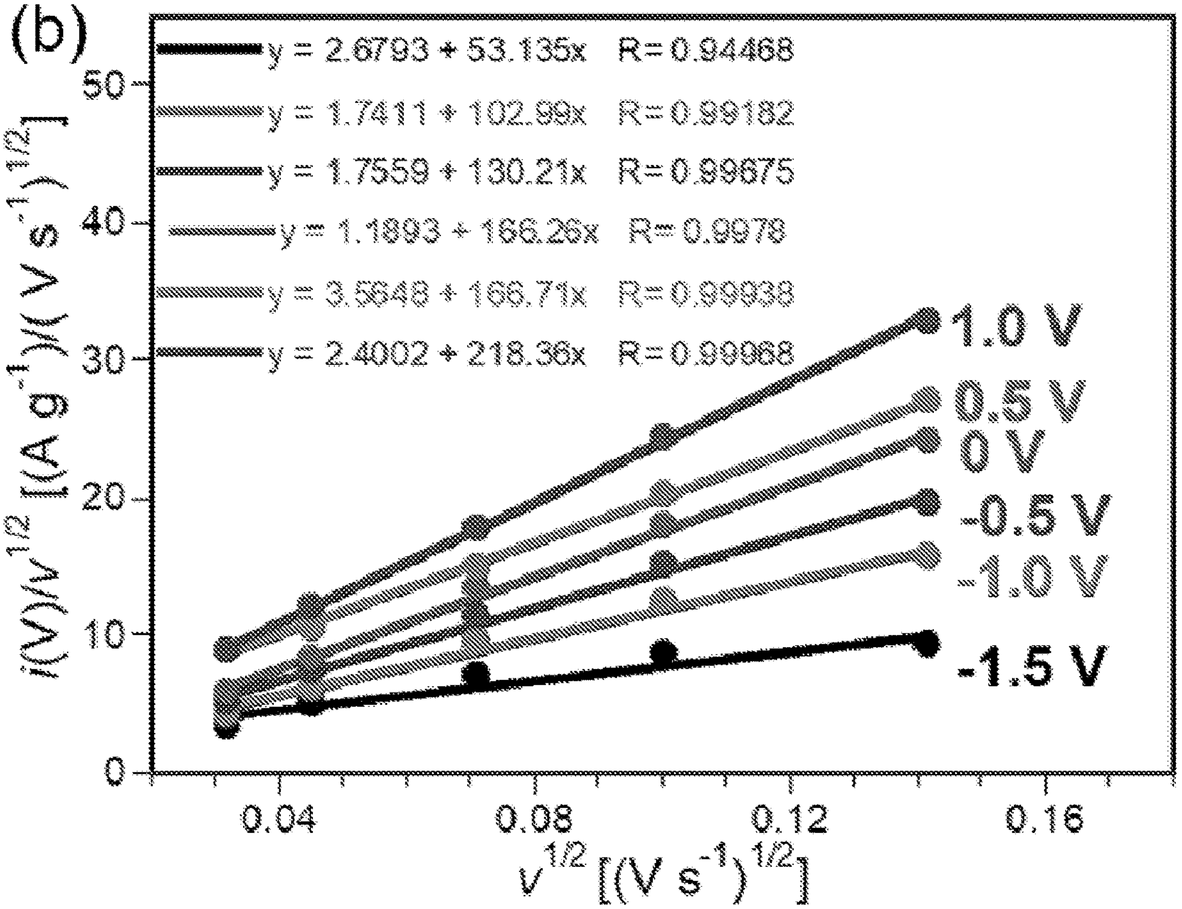
Figure 12A:
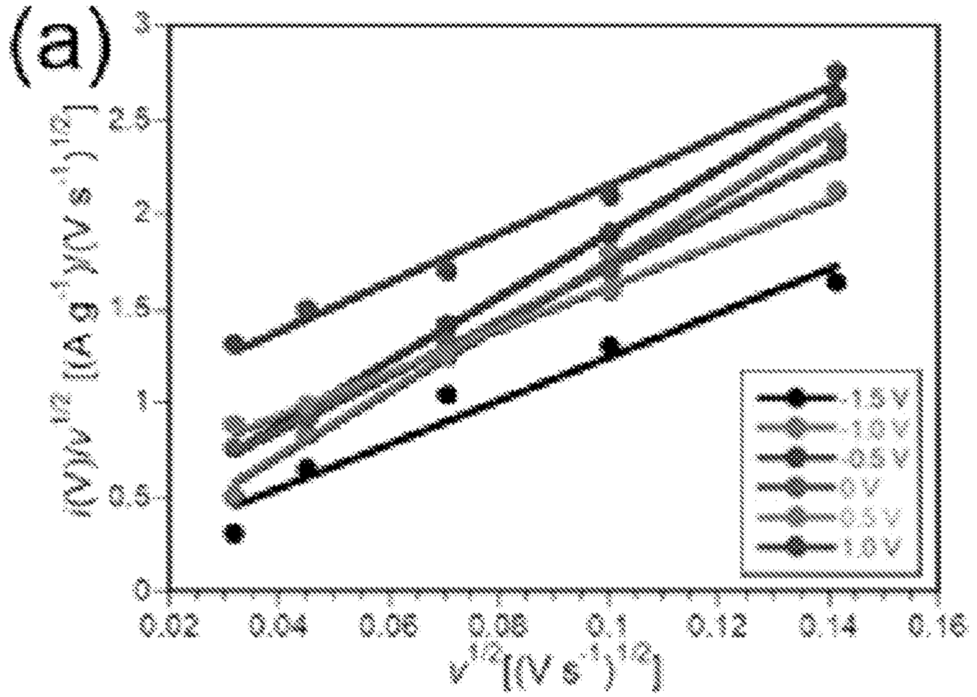
Figure 12B:
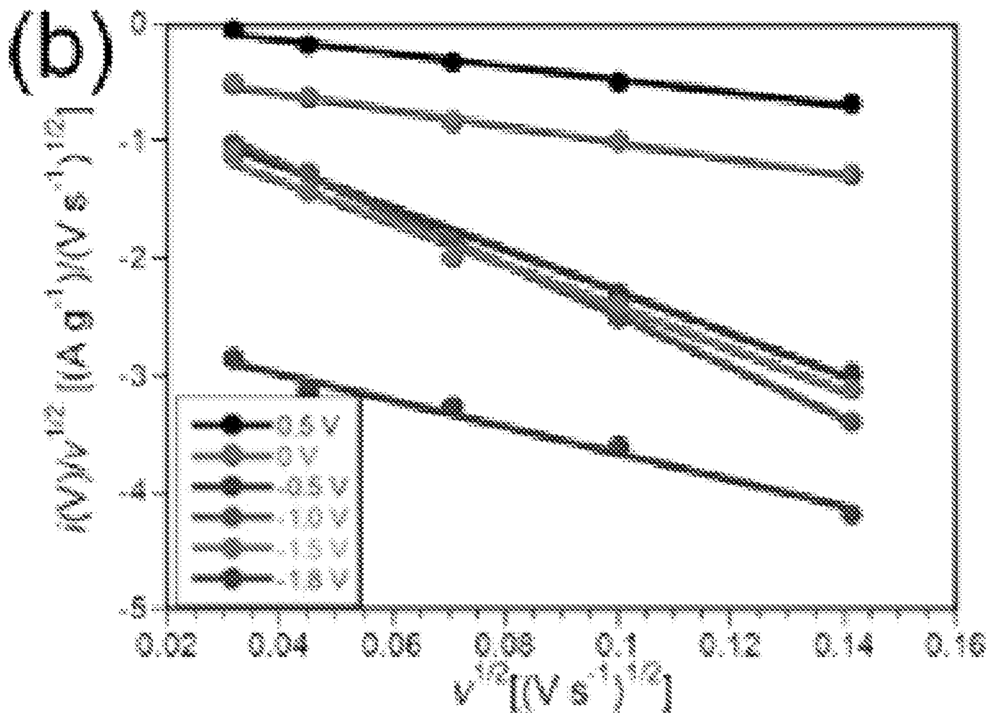
Figure 12C:
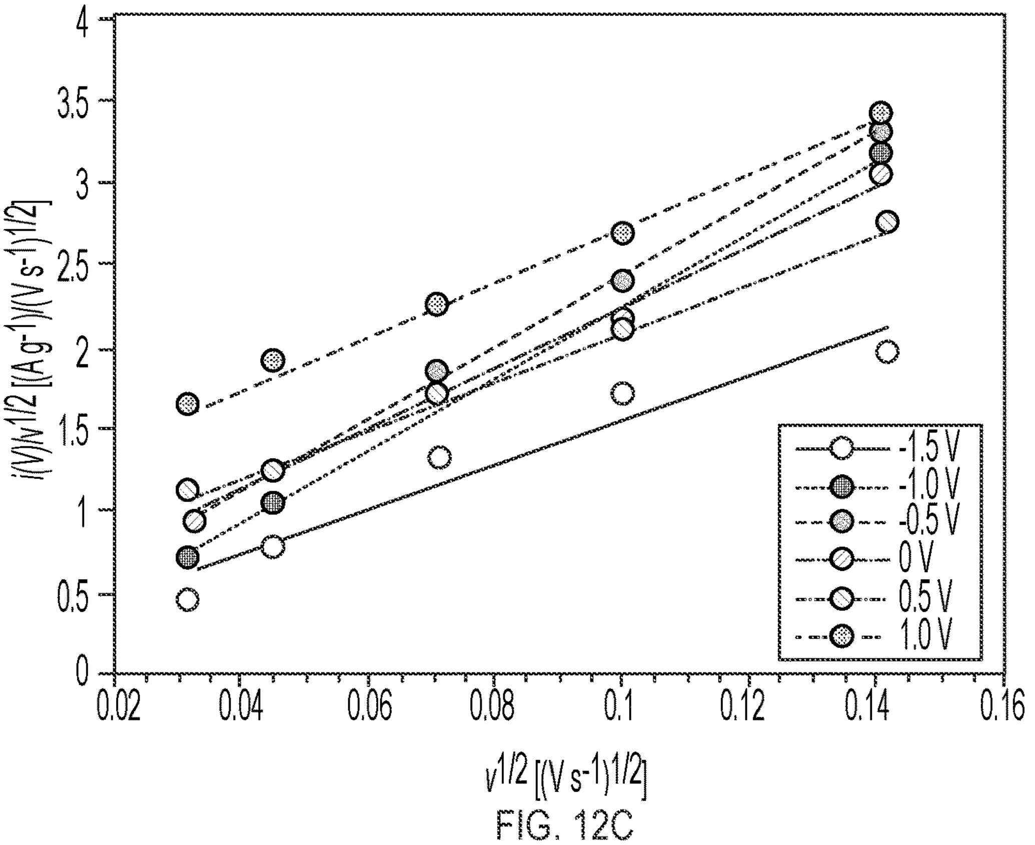
Figure 12D:
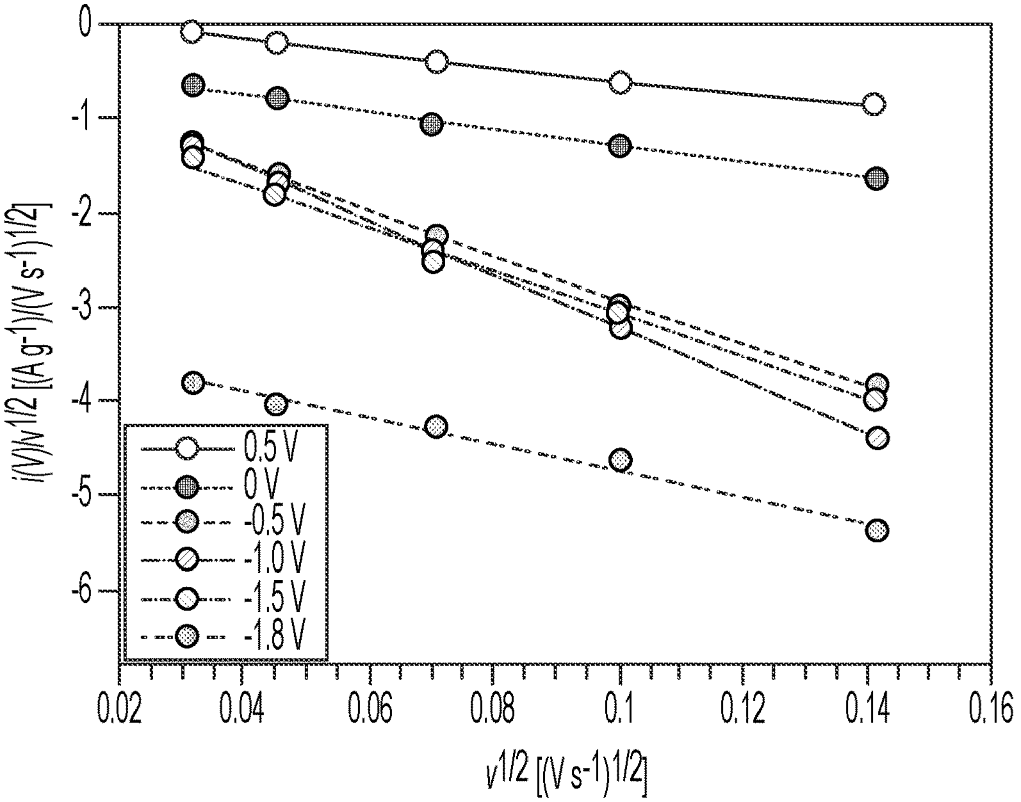
Figure 12E:
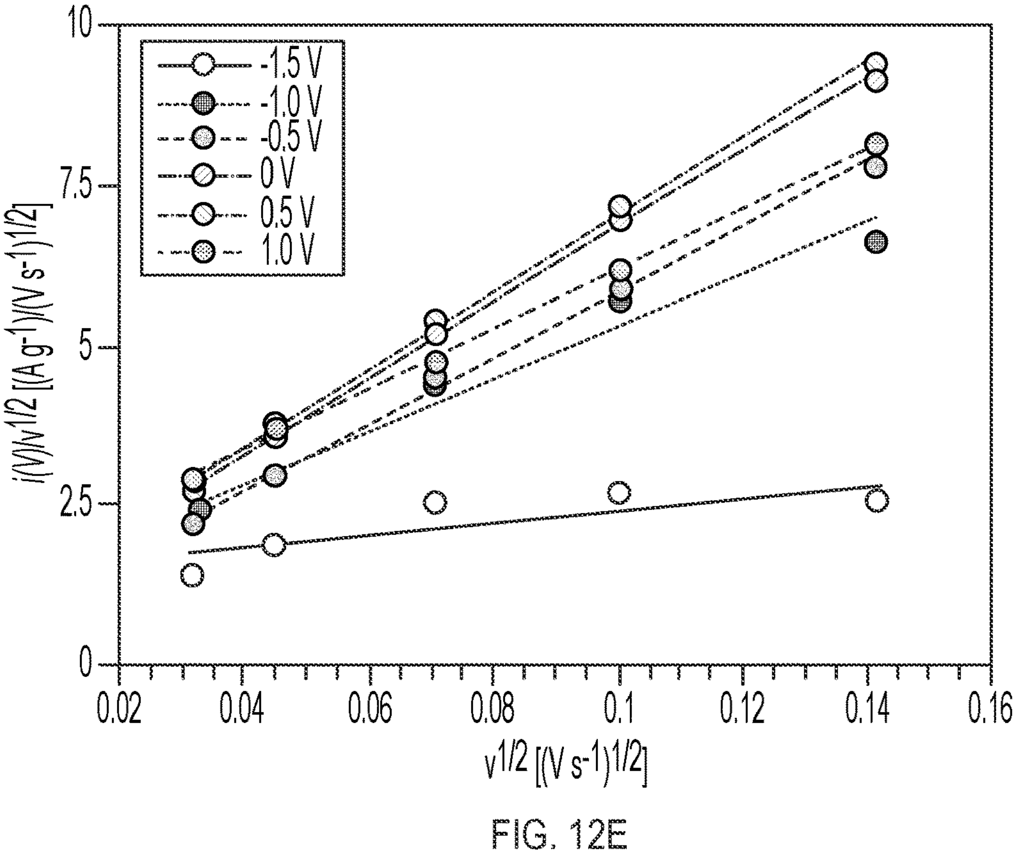
Figure 12F:
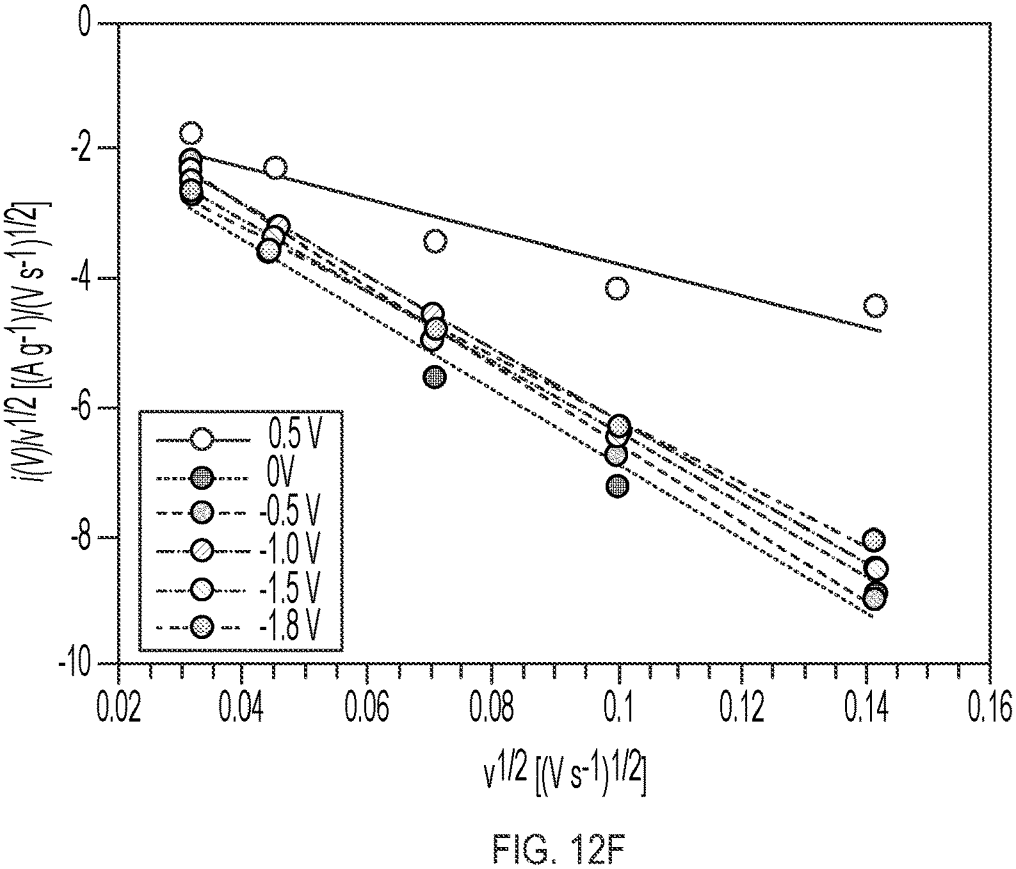
Figure 12G:
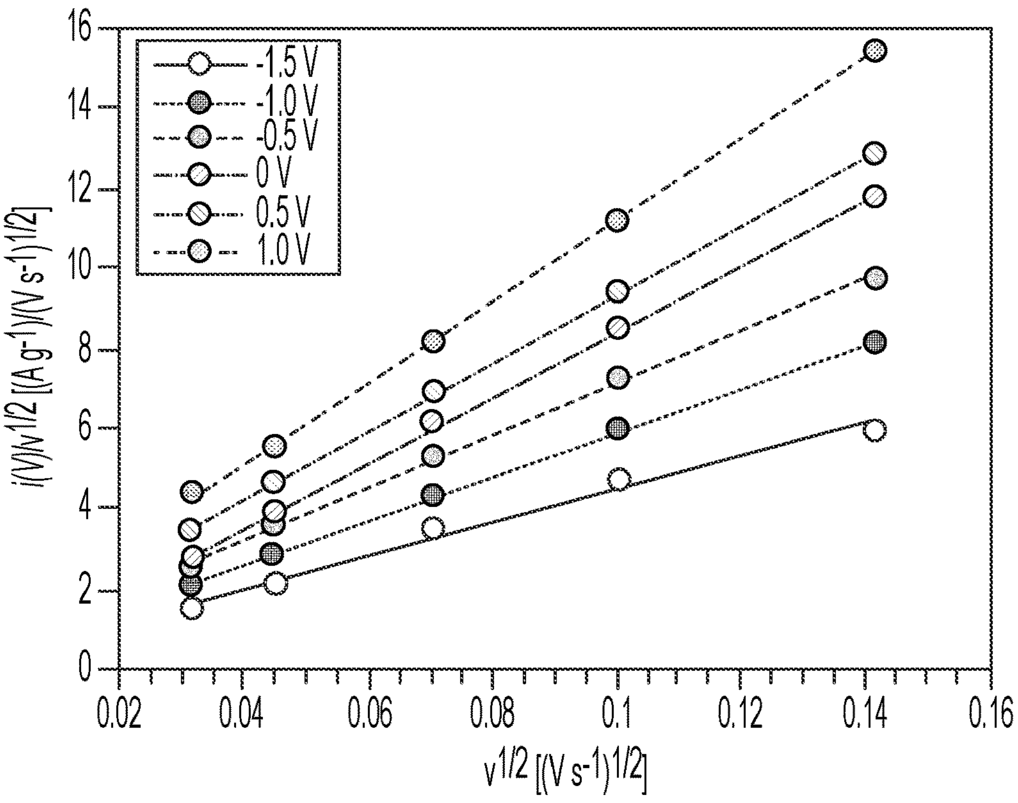
Figure 12H:
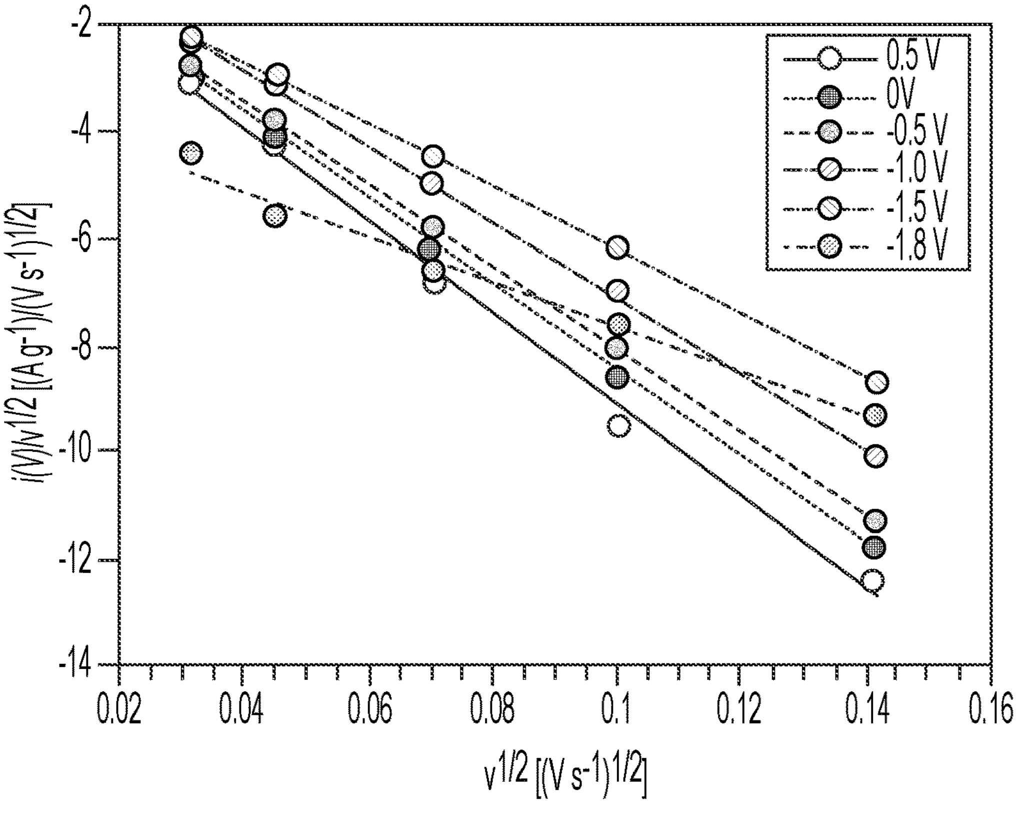
Figure 12I:
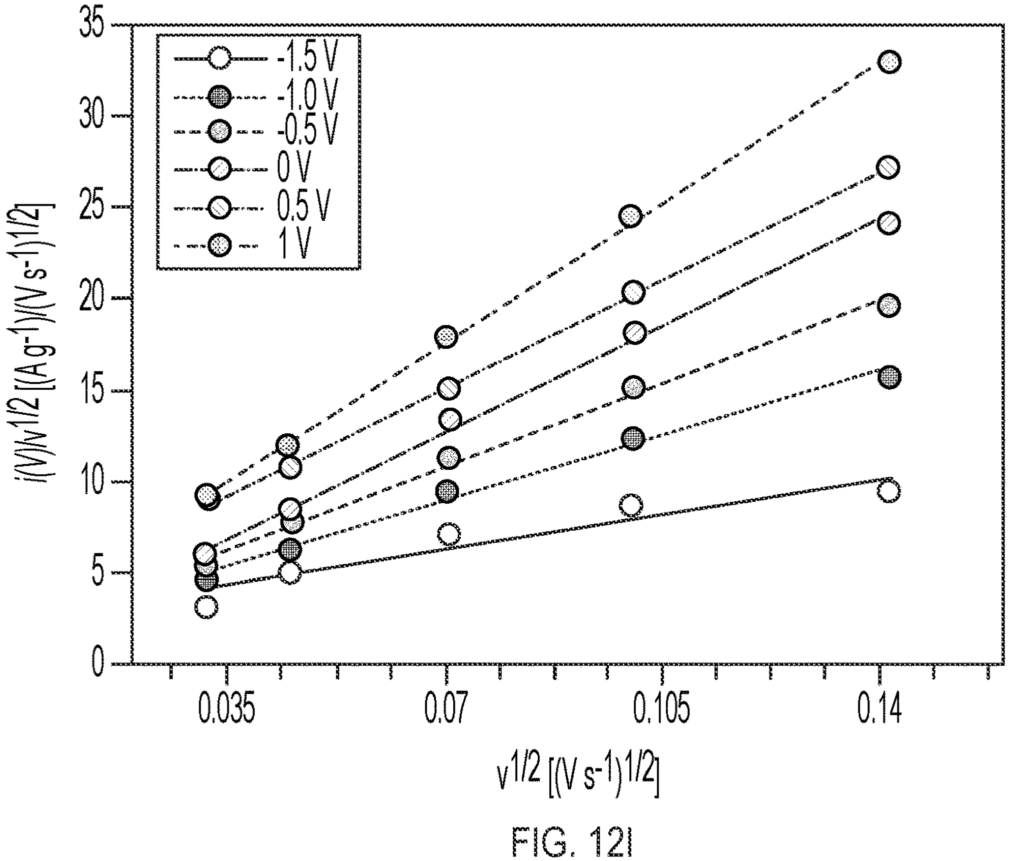
Figure 12J:
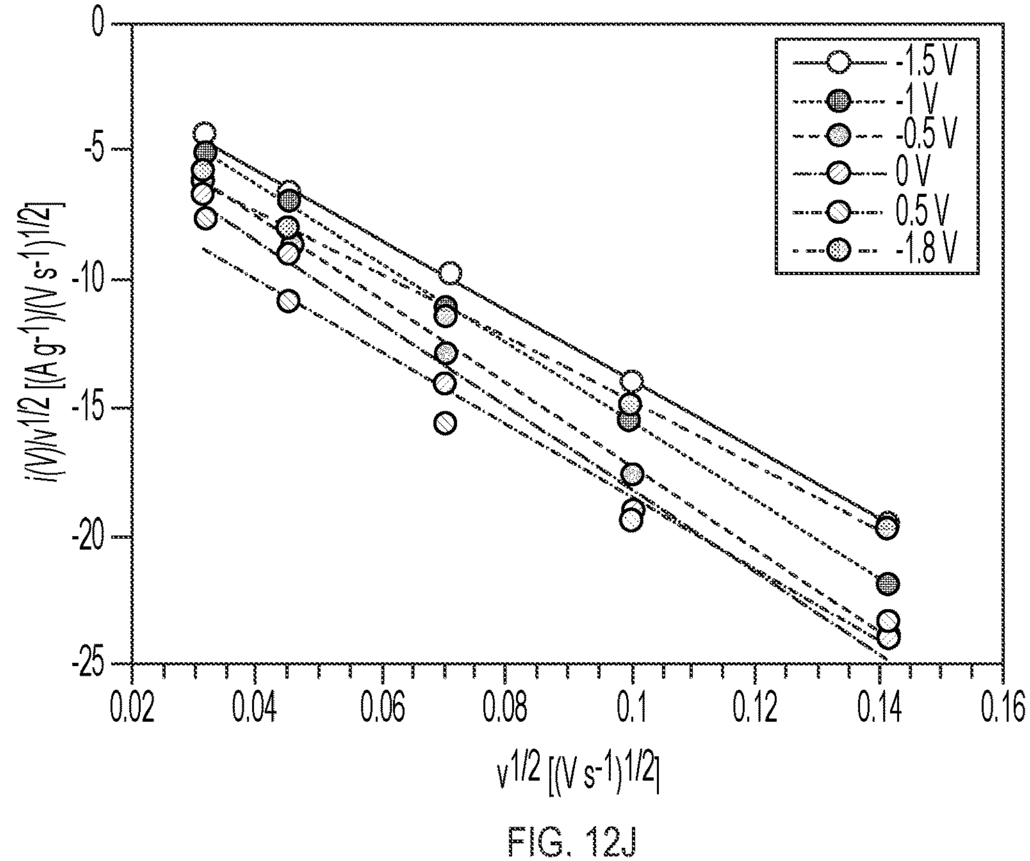
Figure 12K:
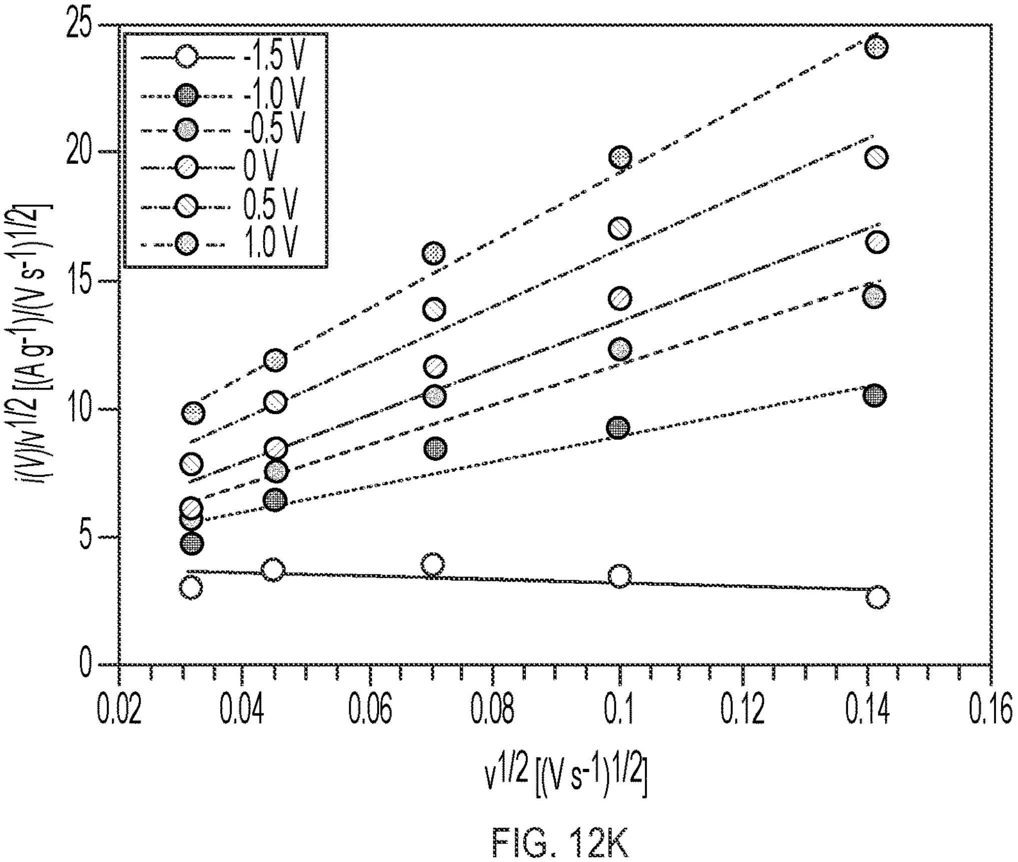
Figure 12L:
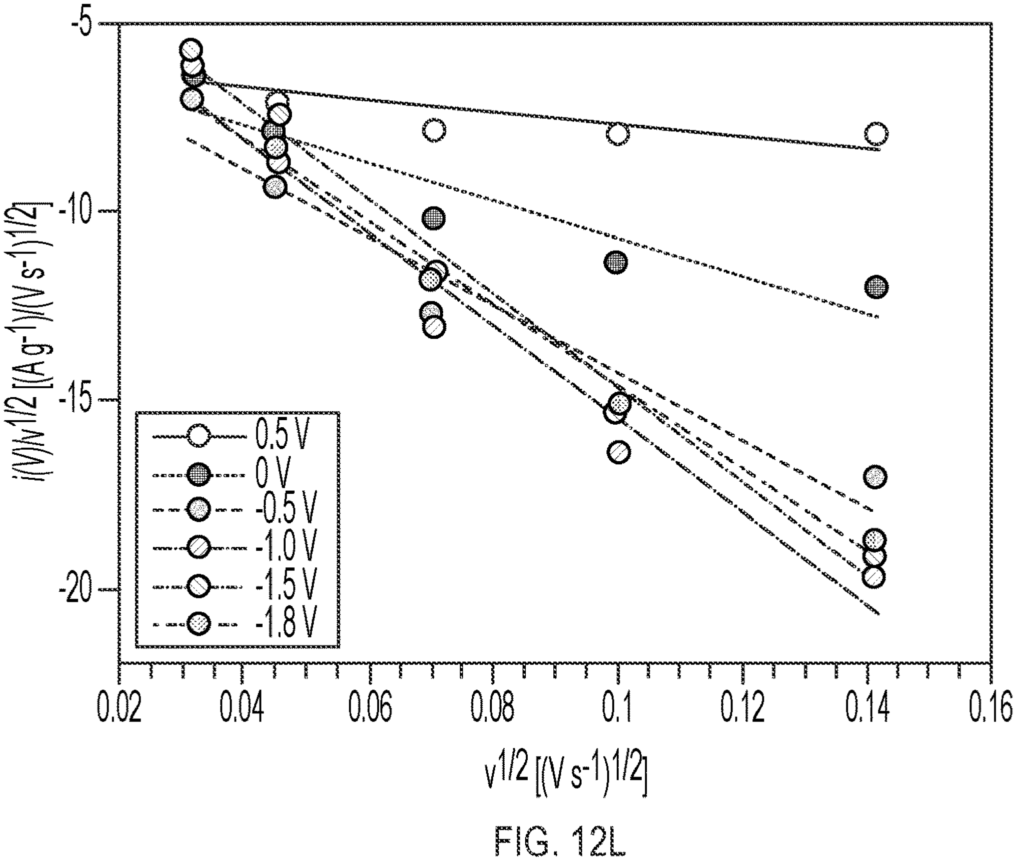
Figure 13A:
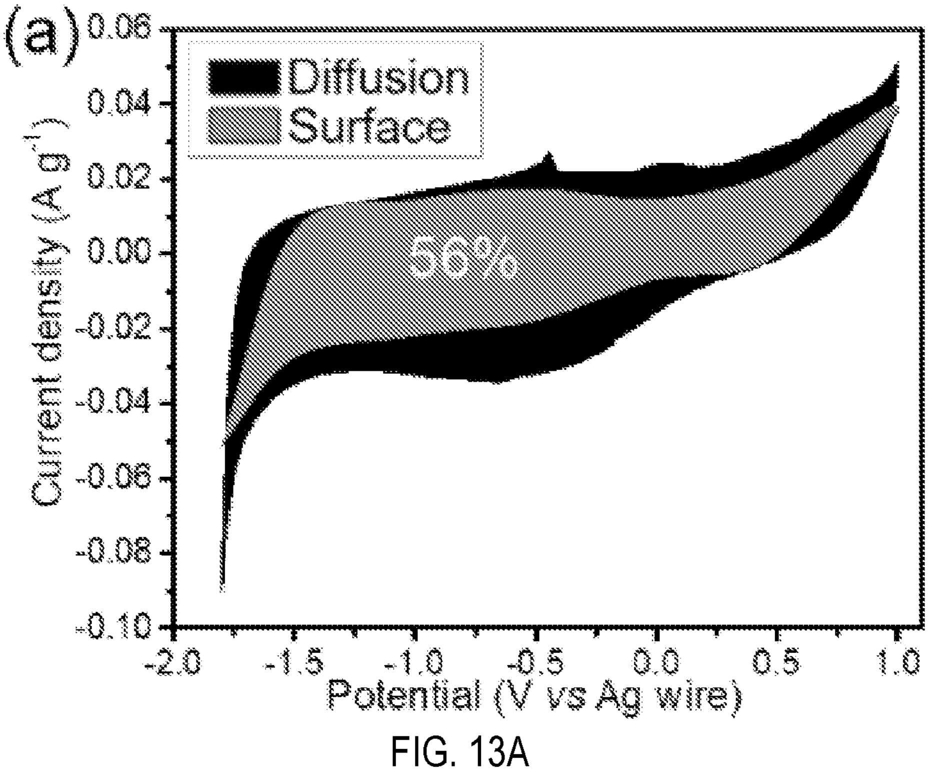
Figure 13B:
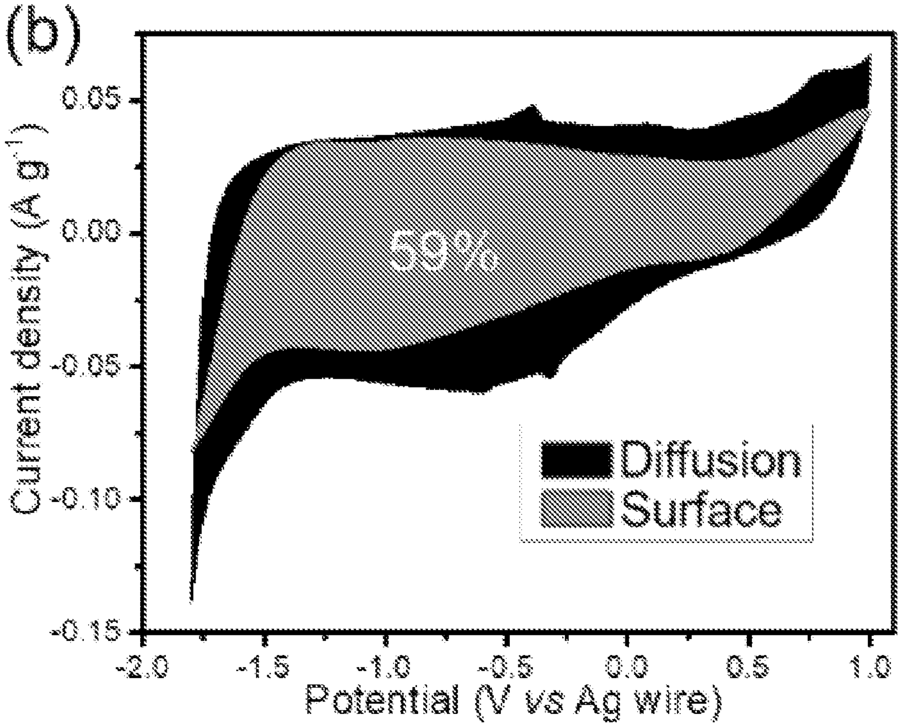
Figure 13C:
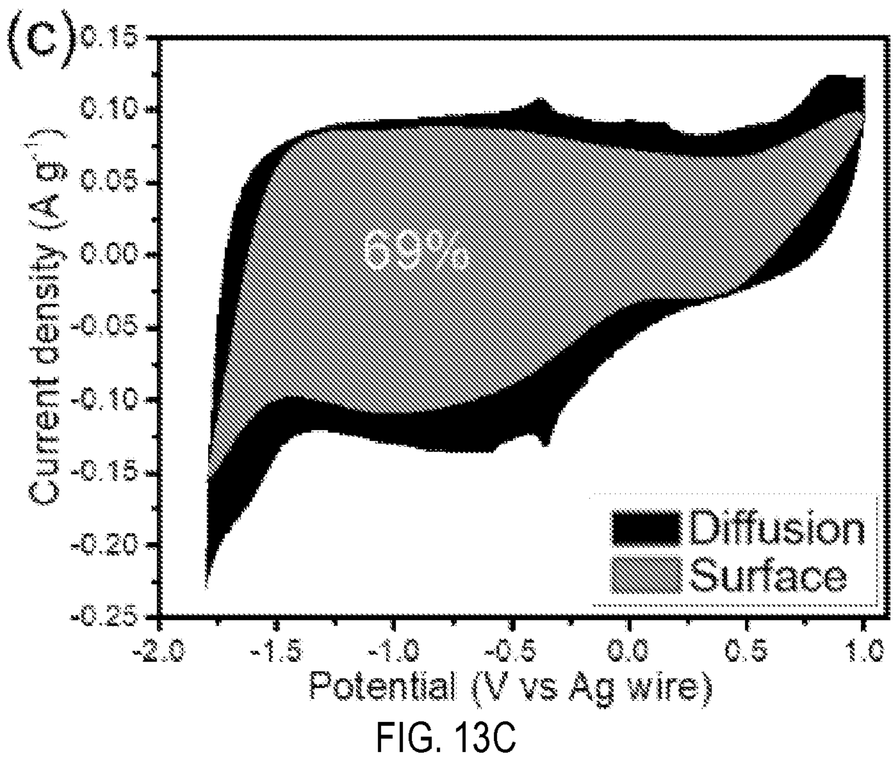
Figure 13D:
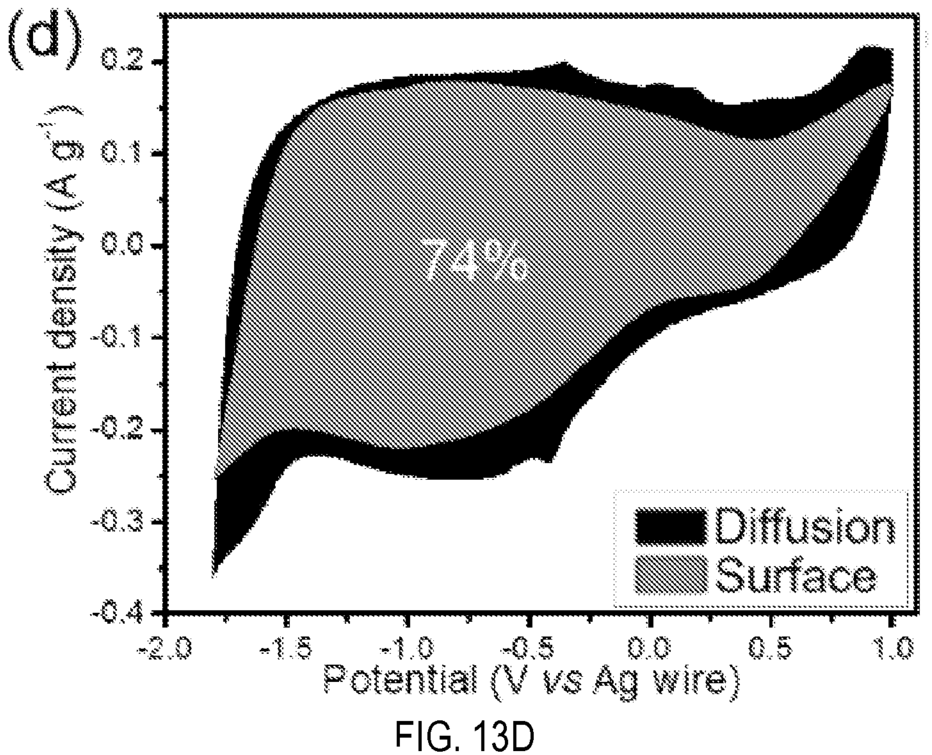
Figure 13E:
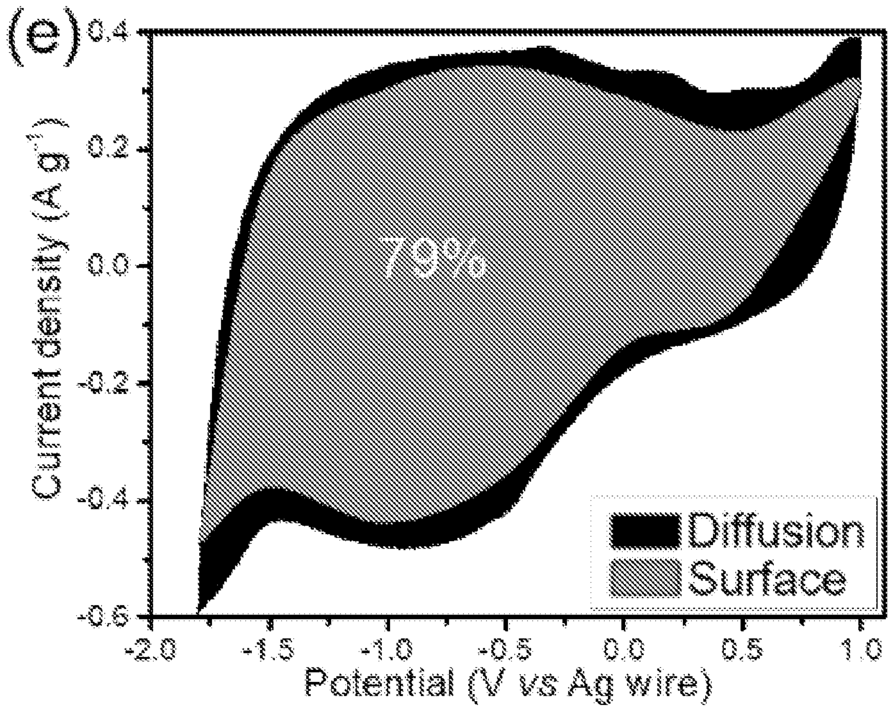
Figure 13F:
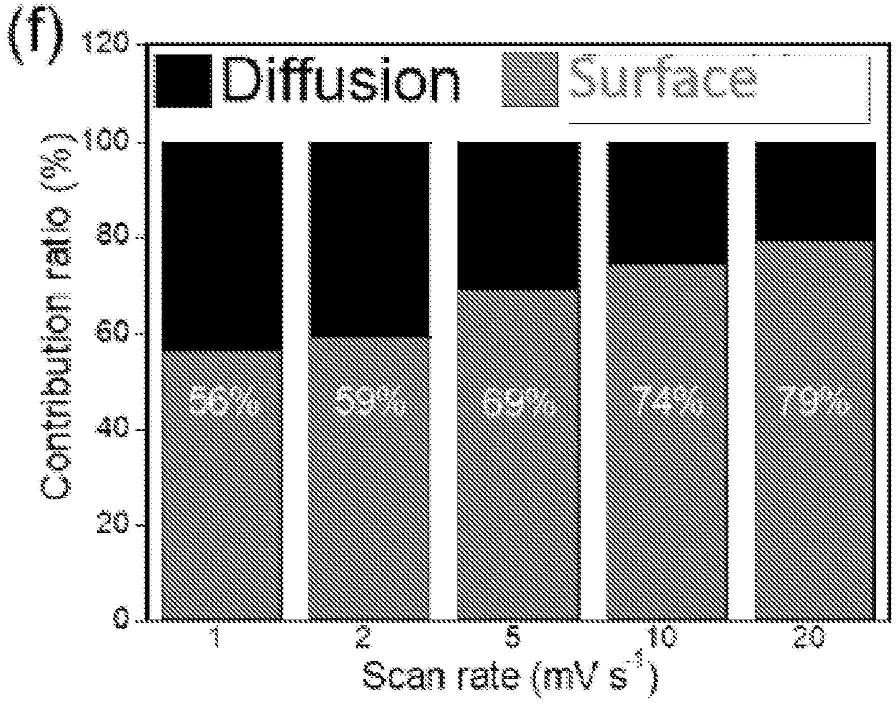
Figure 14A:
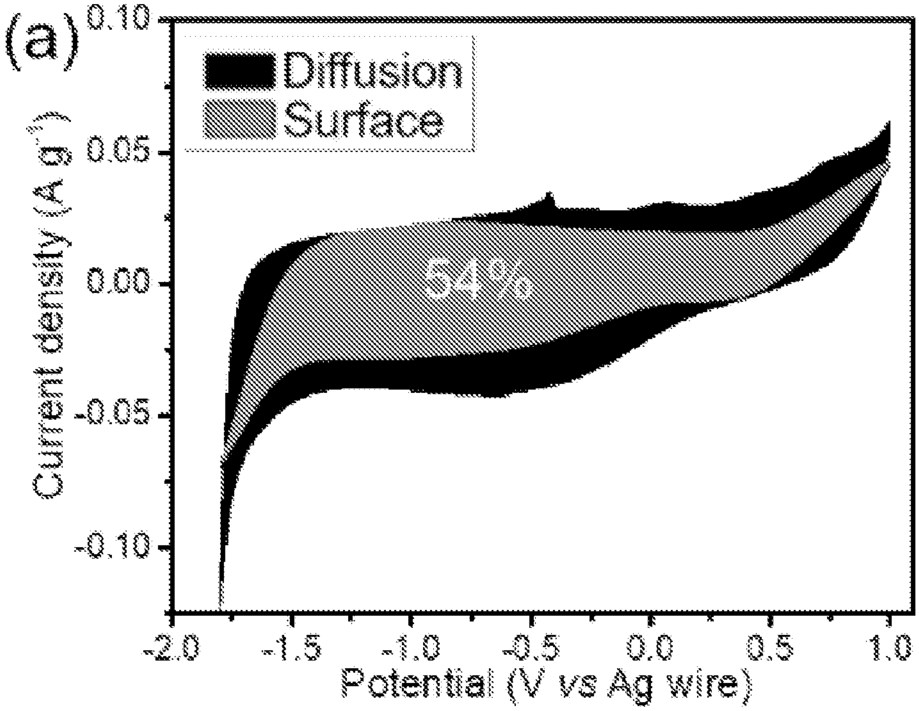
Figure 14B:
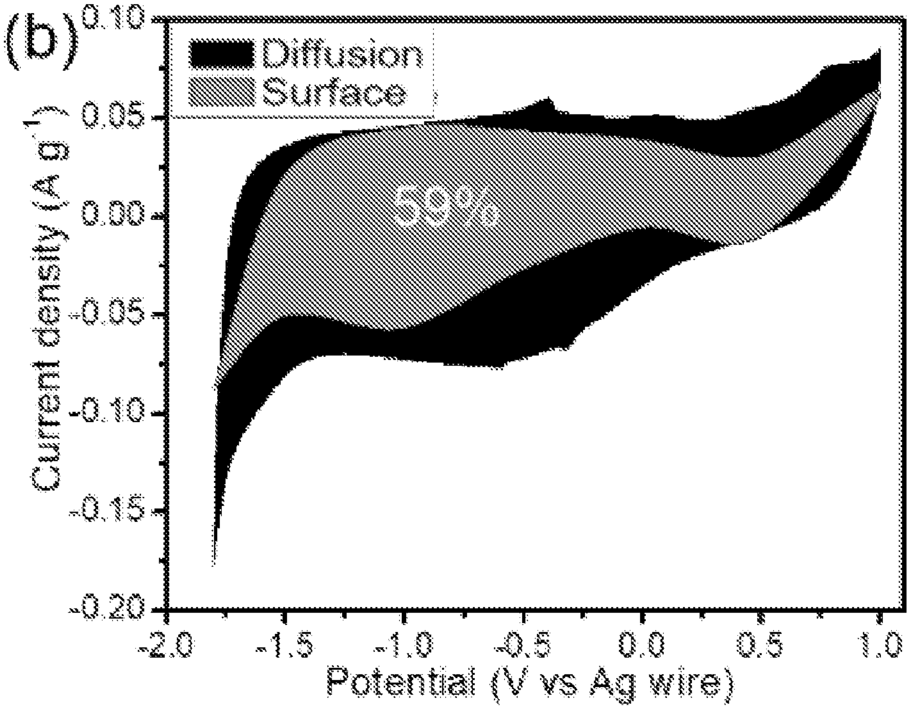
Figure 14C:
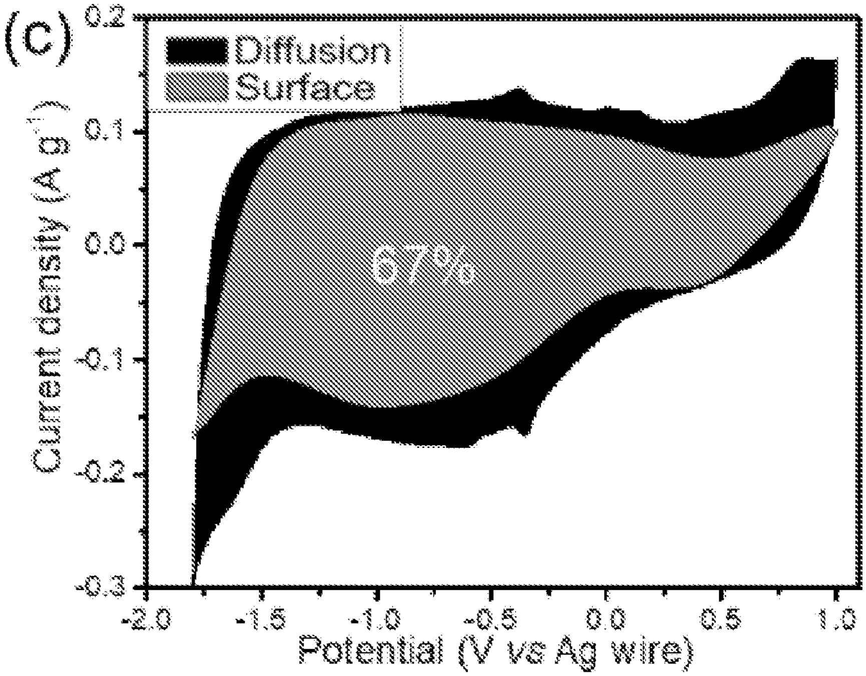
Figure 14D:
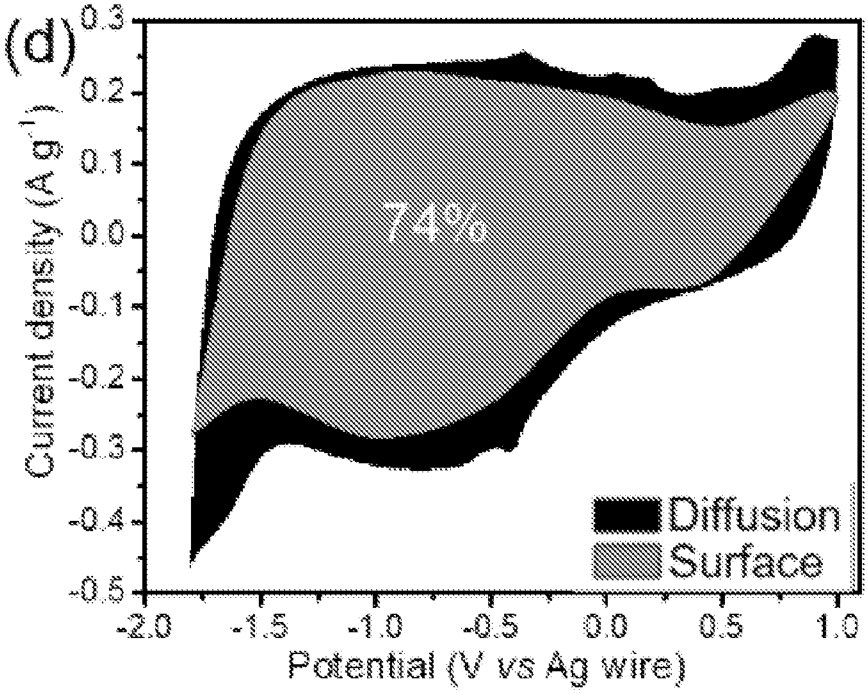
Figure 14E:
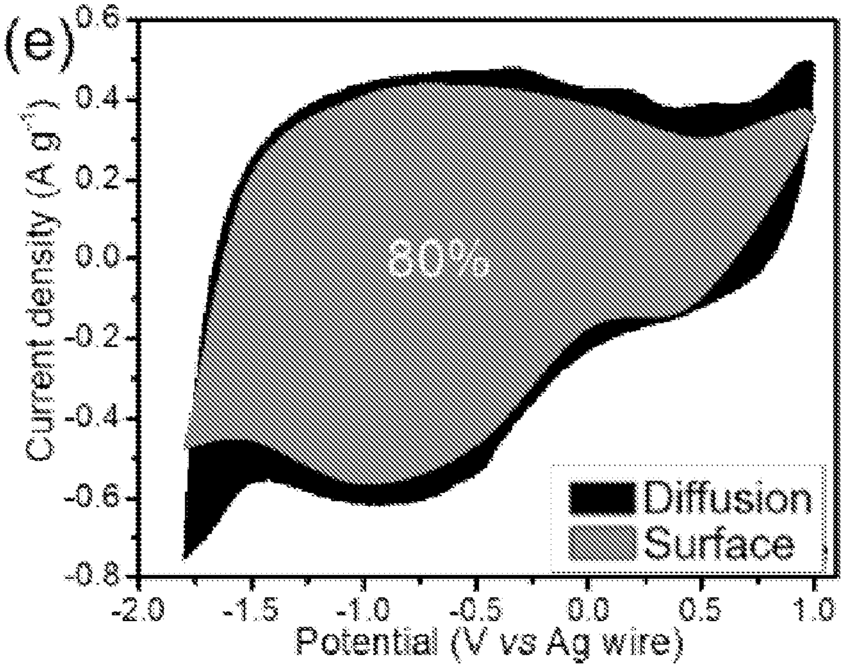
Figure 14F:
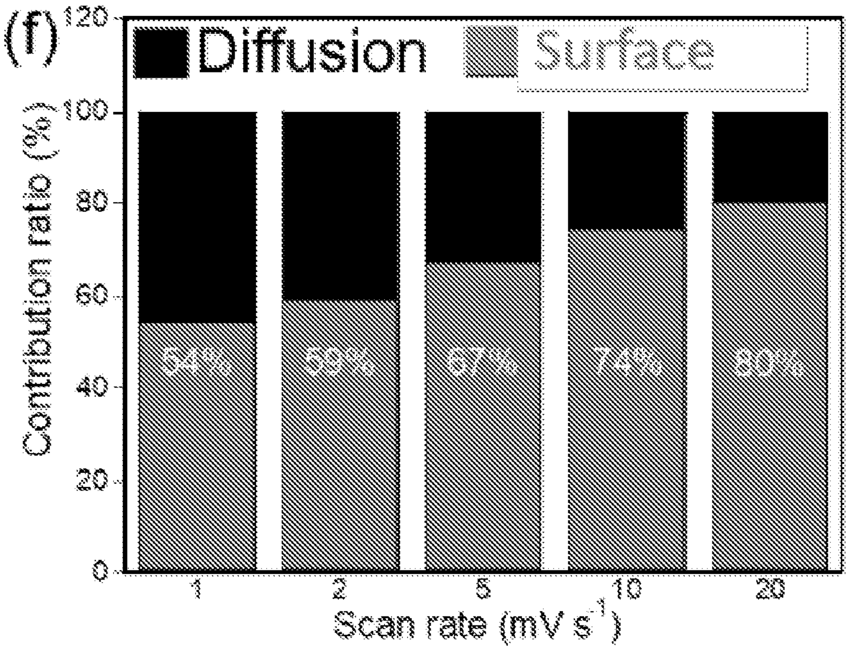
Figure 15A:
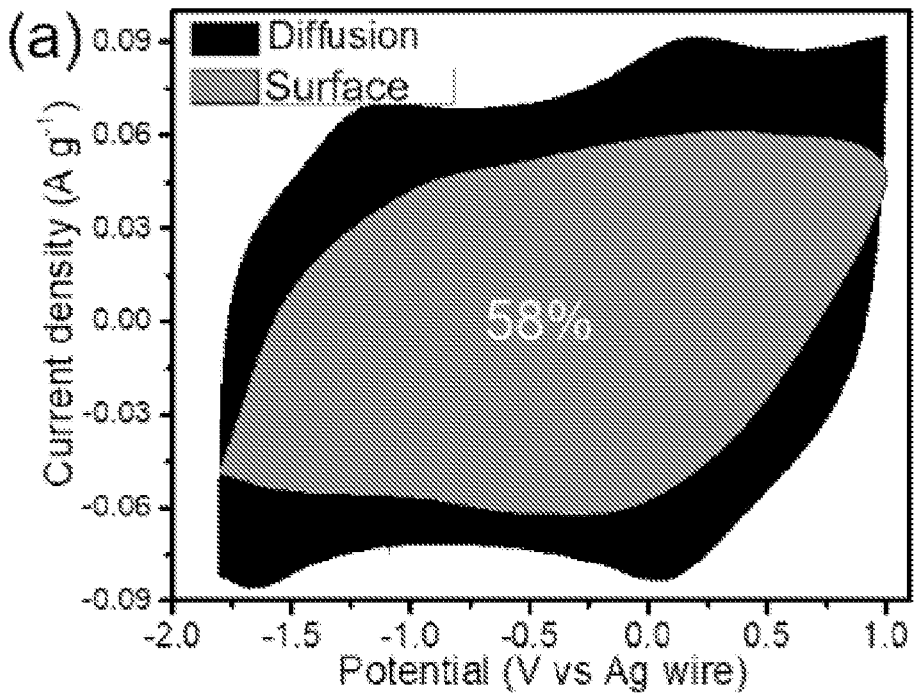
Figure 15B:
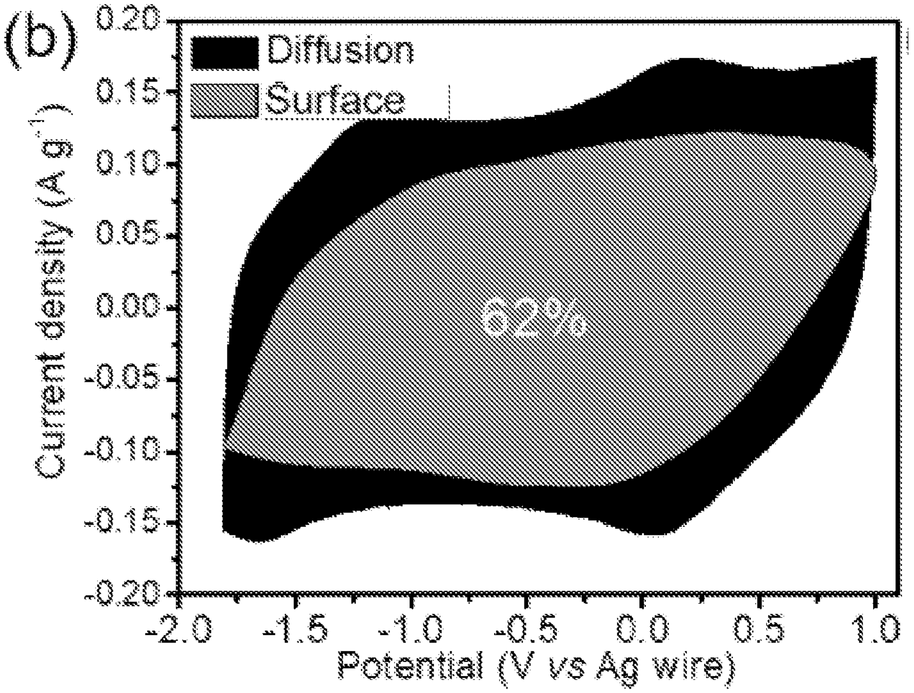
Figure 15C:
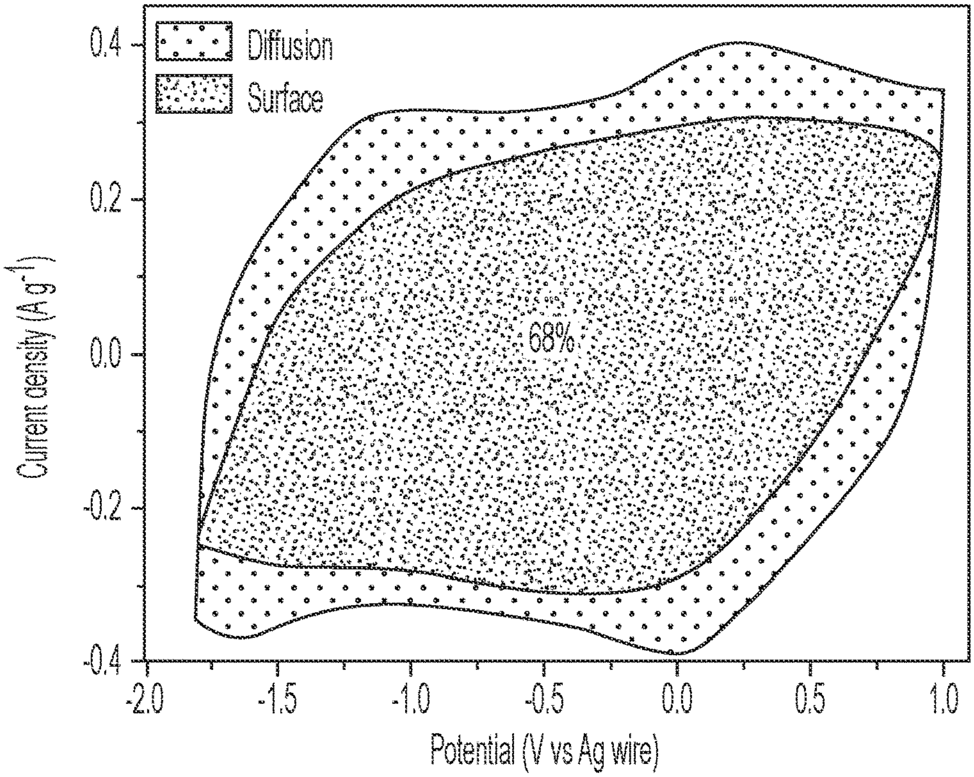
Figure 15D:
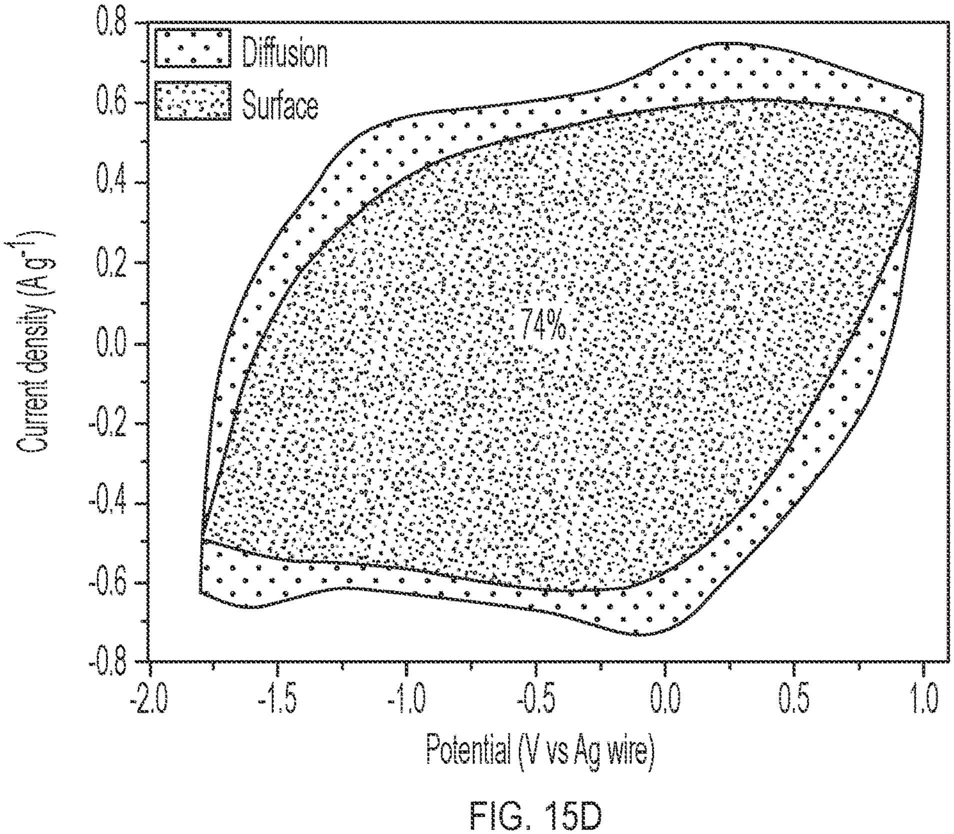
Figure 15E:
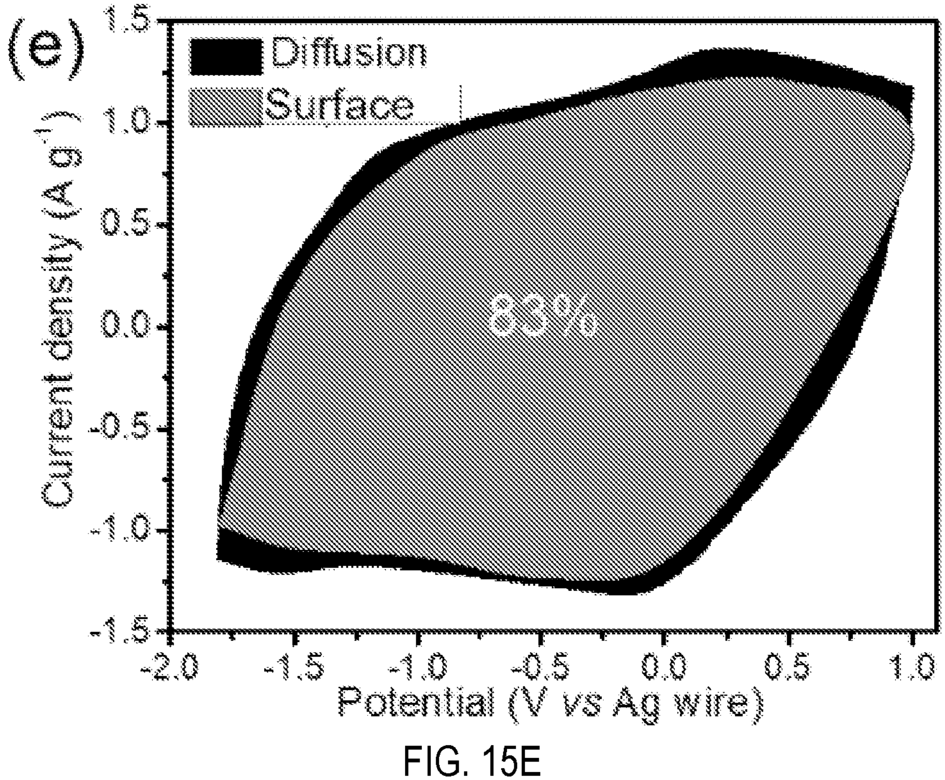
Figure 15F:
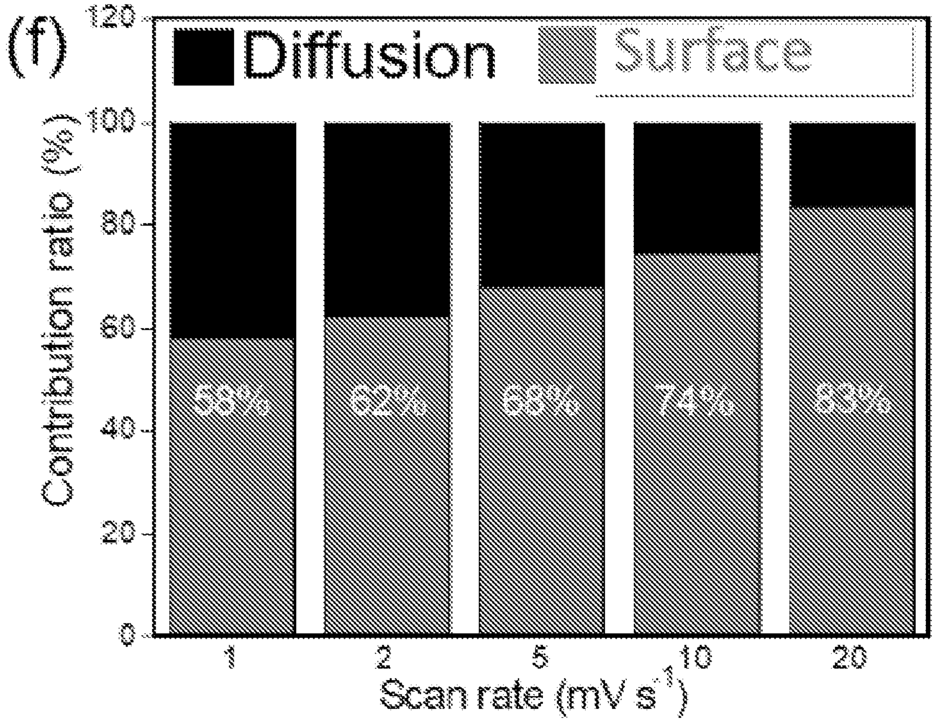
Figure 16A:
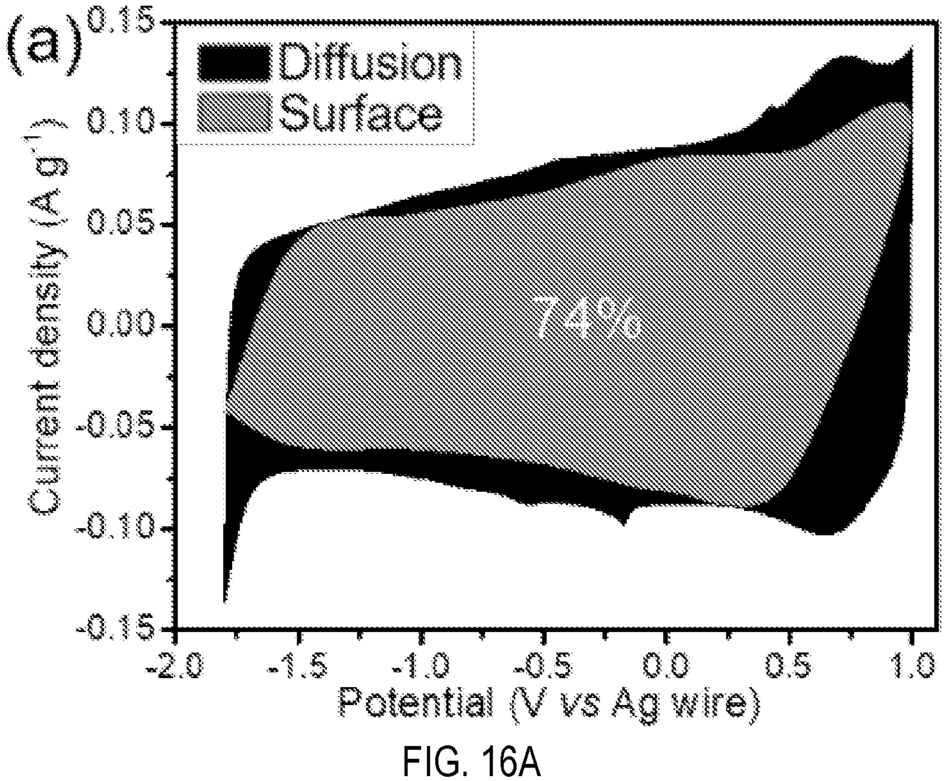
Figure 16B:
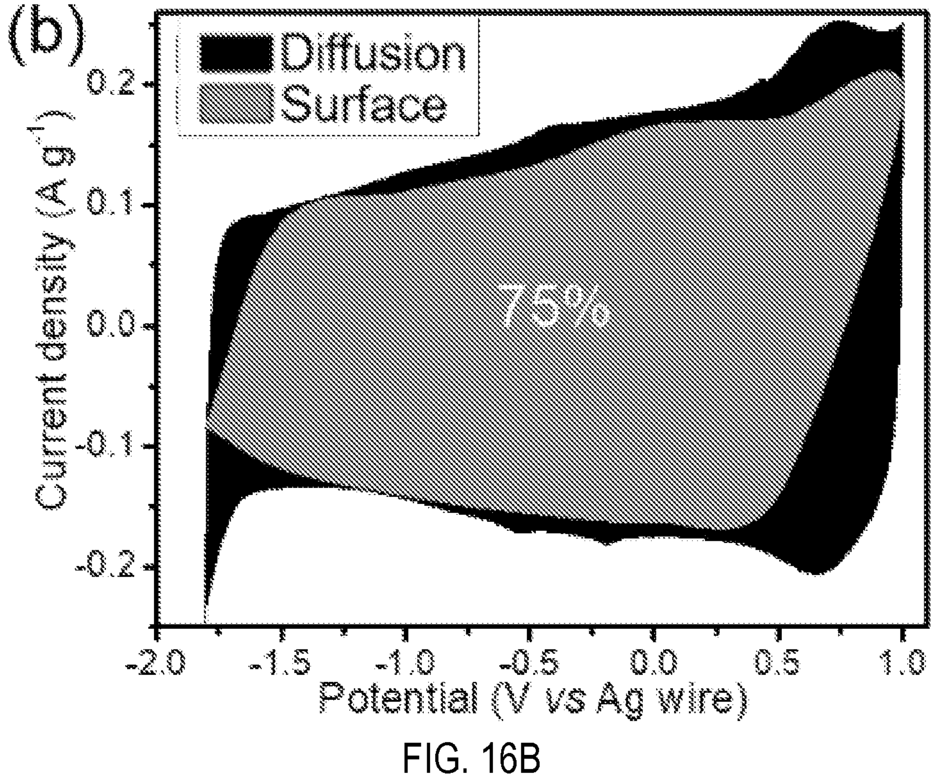
Figure 16C:
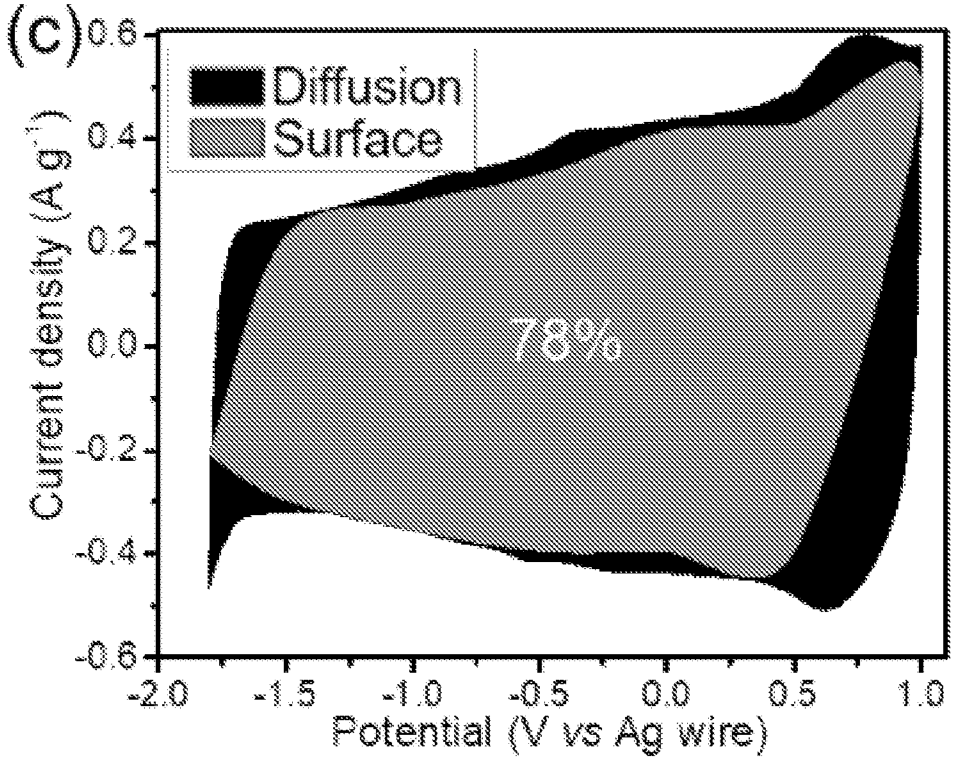
Figure 16D:
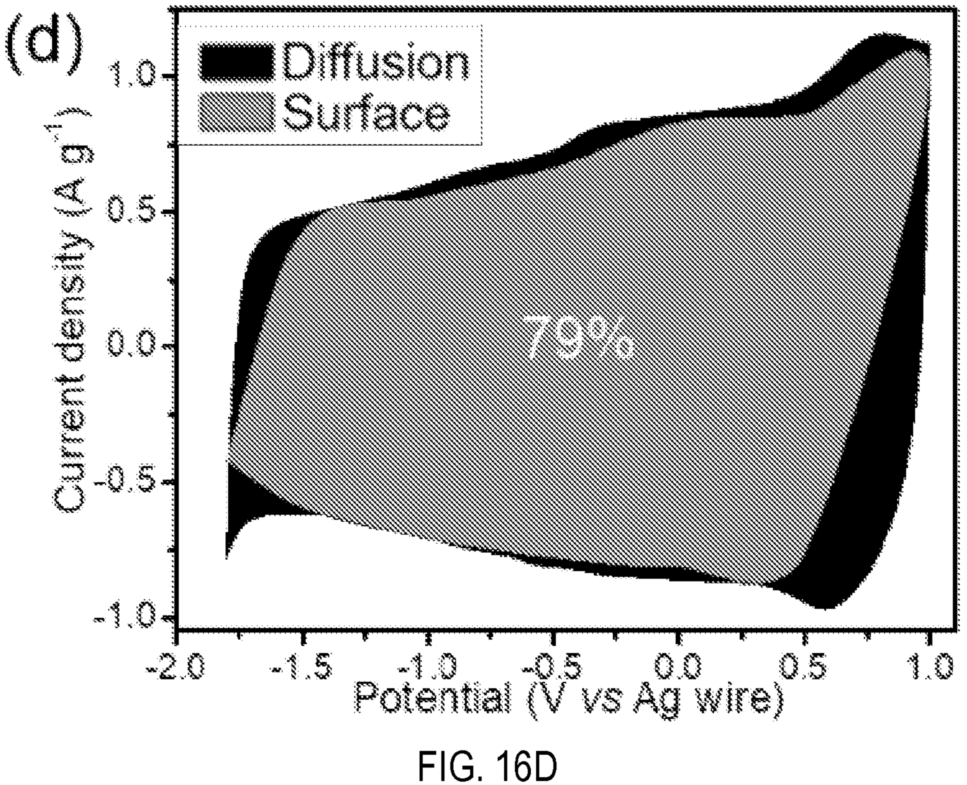
Figure 16E:
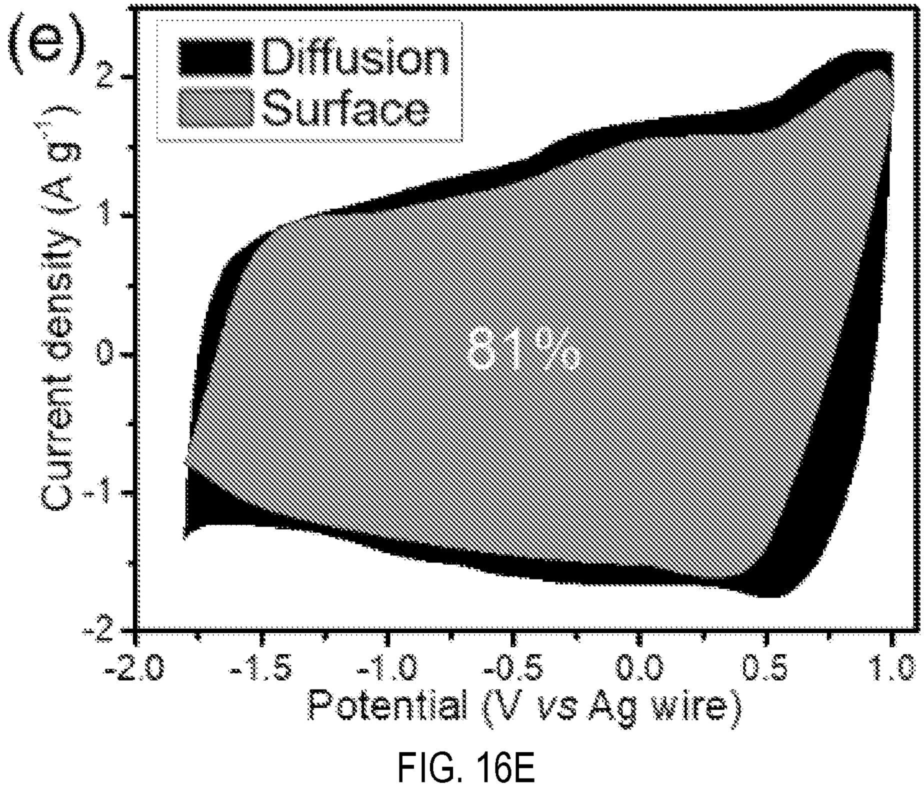
Figure 16F:
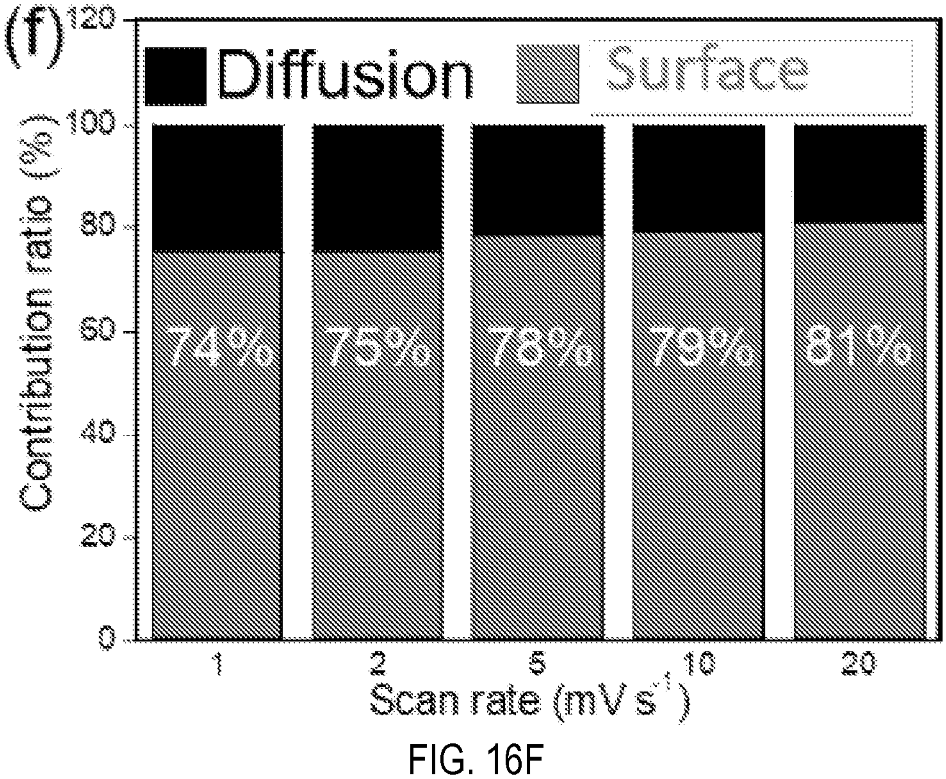
Figure 17A:
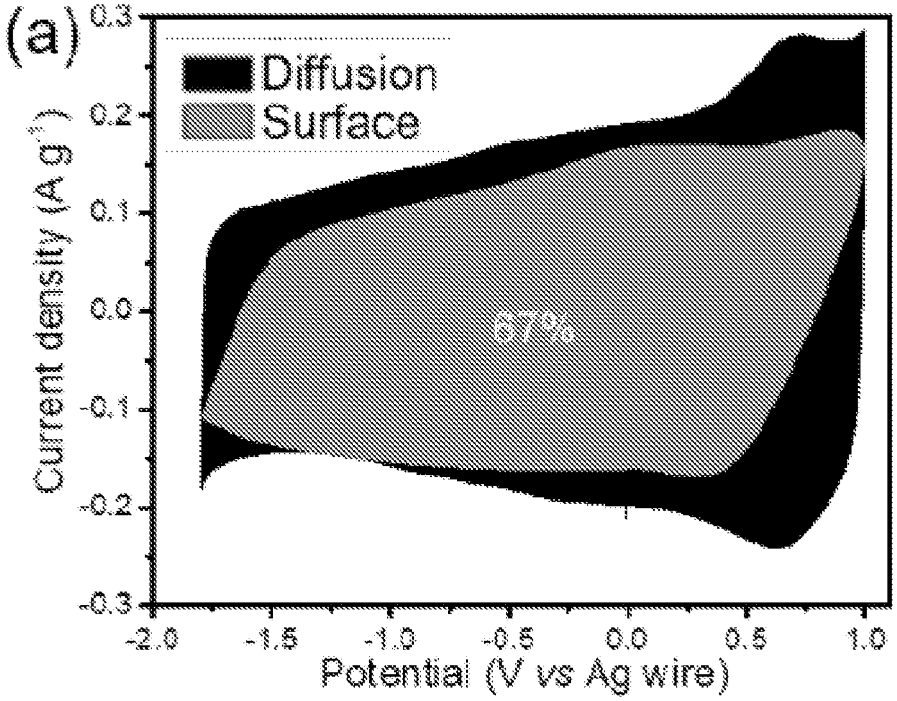
Figure 17B:
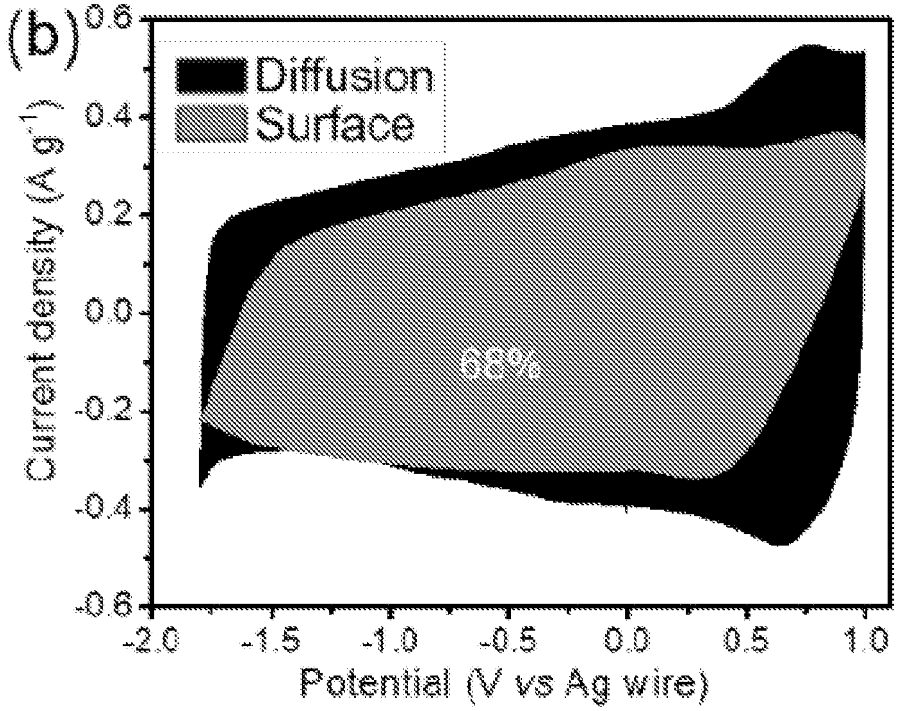
Figure 17C:
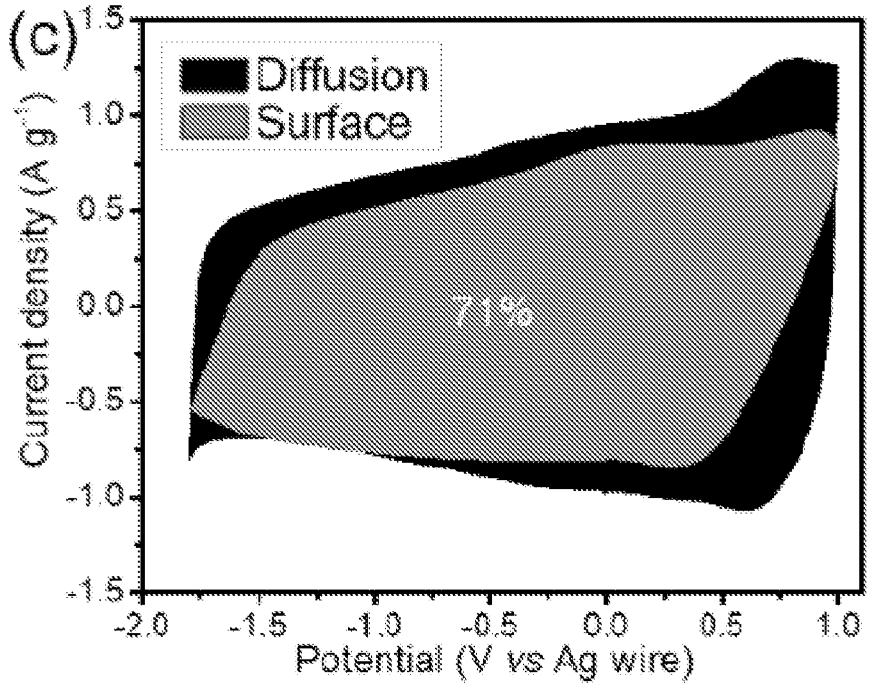
Figure 17D:
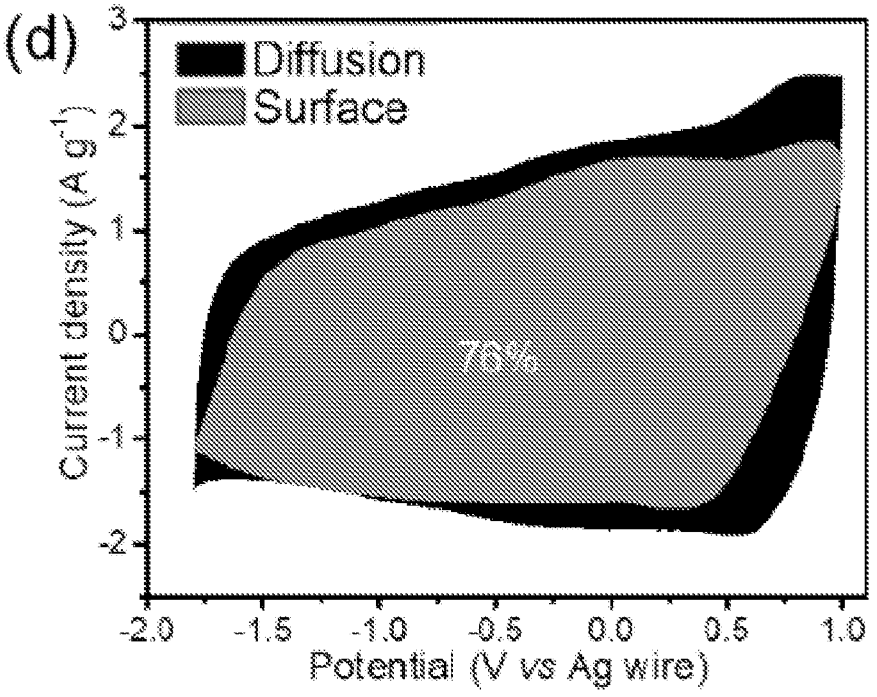
Figure 17E:
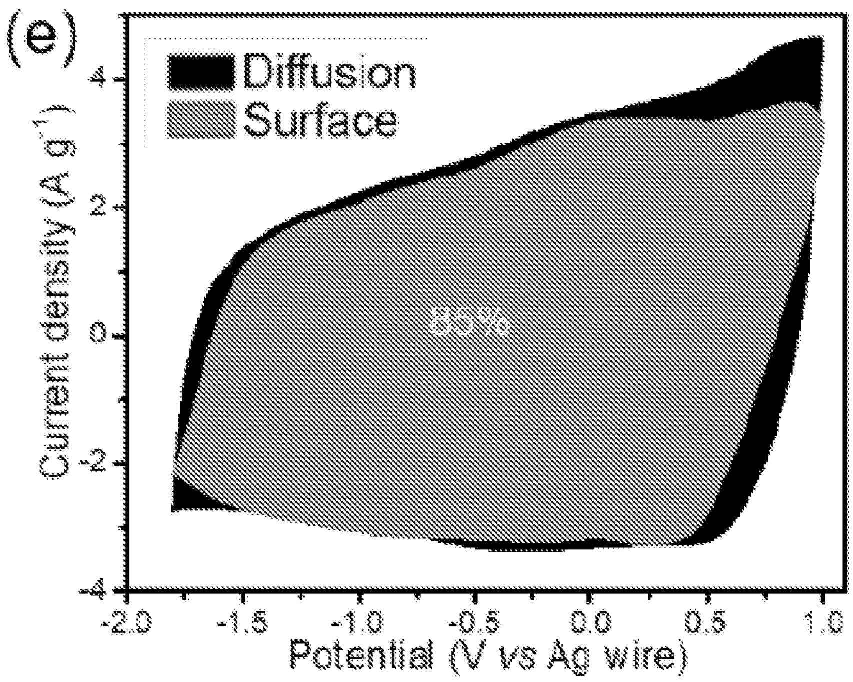
Figure 17F:
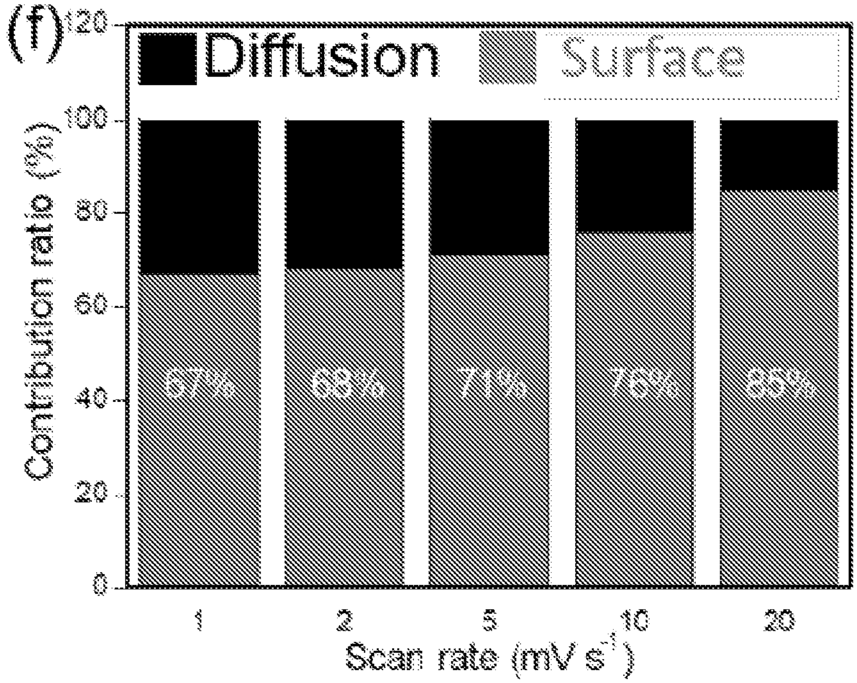
Figure 18A:
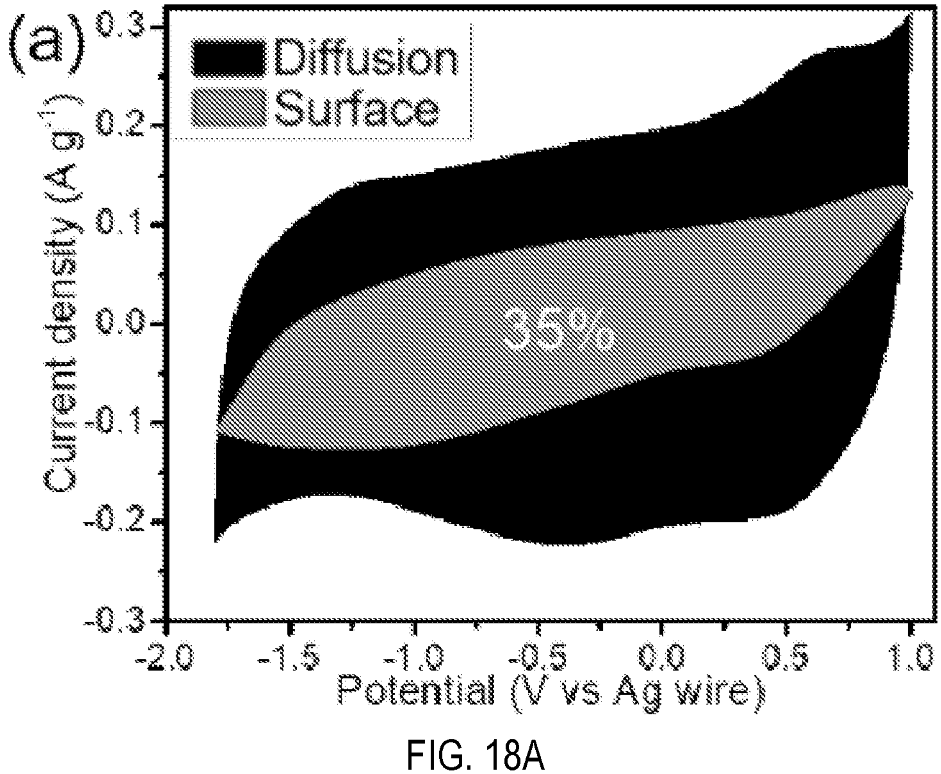
Figure 18B:
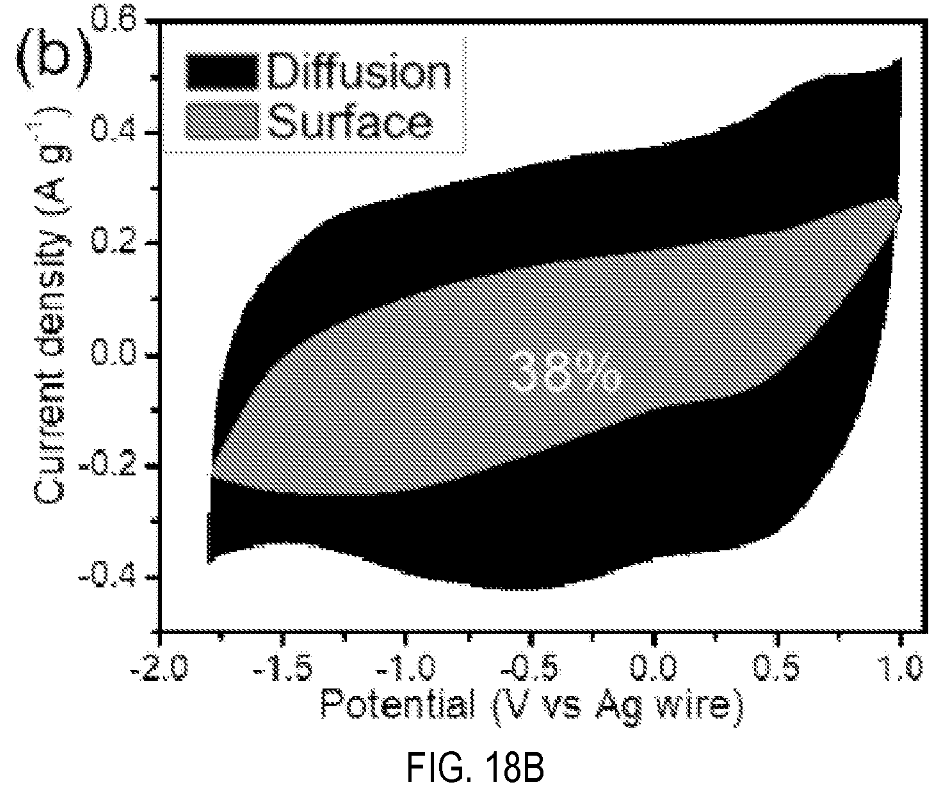
Figure 18C:
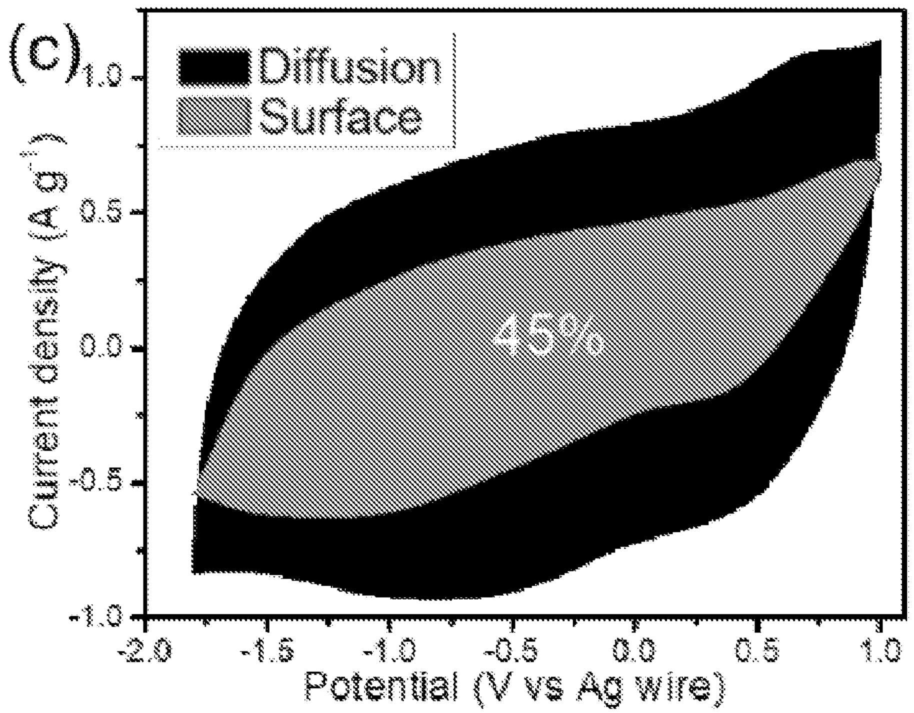
Figure 18D:
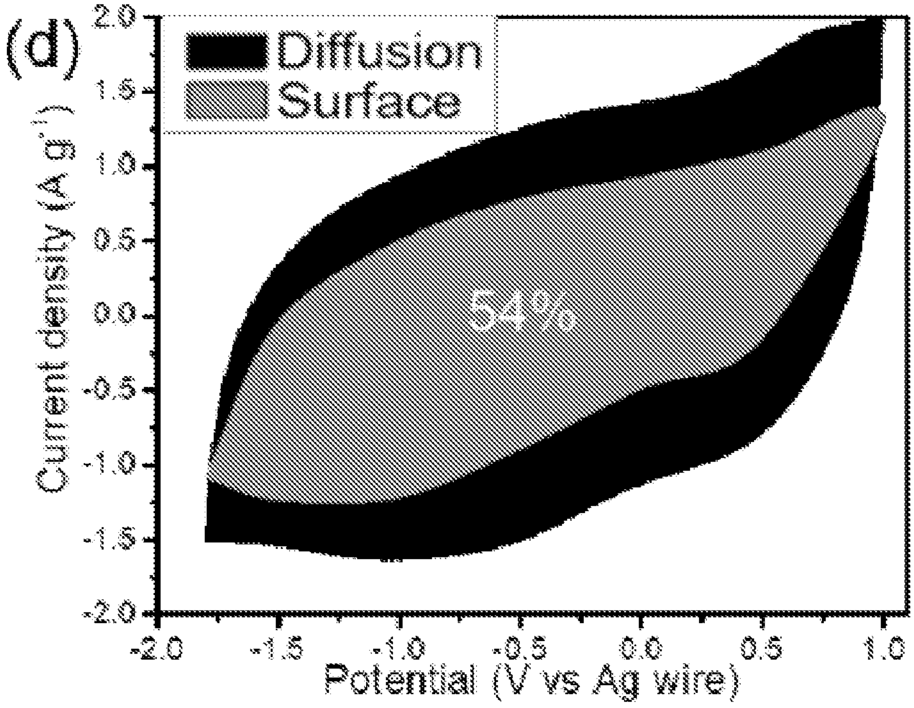
Figure 18E:
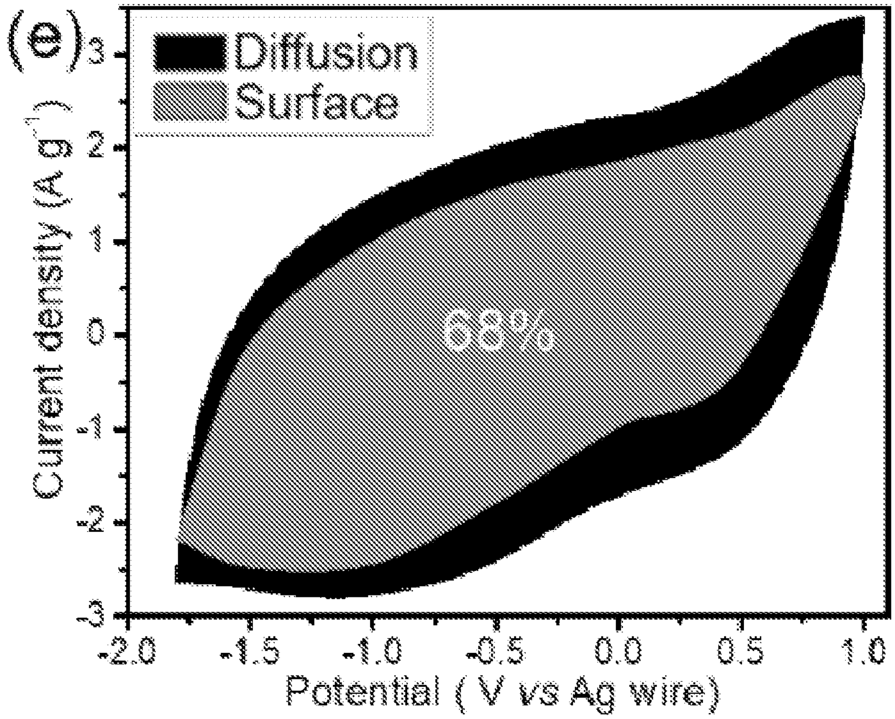
Figure 18F:
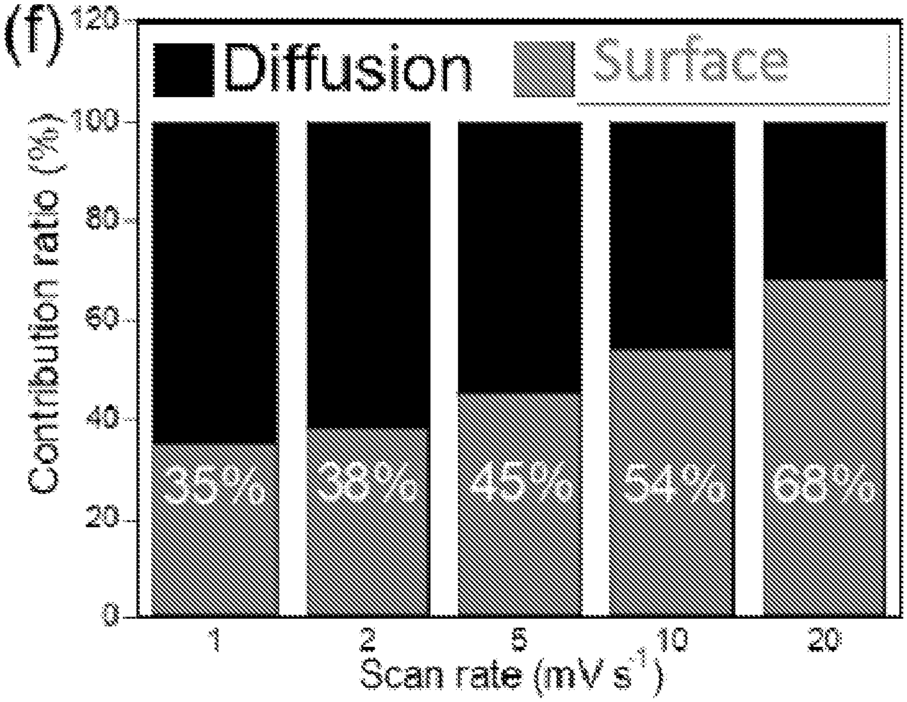

FIGS. 11A-11B. Determination of employed scan rates to calculate two types of contribution. (a) and (b) Plots of $i(V)/v^{1/2}$ versus $v^{1/2}$ for the anodic sweep at scan rates from 1 to 100 mV $s^{-1}$ and from 1 to 20 mV $s^{-1}$, respectively.

FIGS. 12A-12L. (a)-(l) Plots of $i(V)/v^{1/2}$ versus $v^{1/2}$ for the anodic and cathodic sweep of $Ti_3C_2T_x$, $Ti_3C_2$-C6, $Ti_3C_2$-C8, $Ti_3C_2$-C10, $Ti_3C_2$-C12, and $Ti_3C_2$-C16, at scan rates from 1 to 20 mV $s^{-1}$, respectively.

FIGS. 13A-13F. (a)-(e) Capacitive charge storage contribution for pristine $Ti_3C_2T_x$ at scan rates from 1 to 20 mV $s^{-1}$, respectively. (f) Separation of the contributions from surface and diffusion-controlled processes for $Ti_3C_2T_x$ at different scan rates.

FIGS. 14A-14F. (a)-(e) Capacitive charge storage contribution for $Ti_3C_2$-C6 at scan rates from 1 to 20 mV $s^{-1}$, respectively. (f) Separation of the contributions from surface and diffusion-controlled processes for $Ti_3C_2$-C6 at different scan rates.

FIGS. 15A-15F. (a)-(e) Capacitive charge storage contribution for $Ti_3C_2$-C8 at scan rates from 1 to 20 mV $s^{-1}$, respectively. (f) Separation of the contributions from surface and diffusion-controlled processes for $Ti_3C_2$-C8 at different scan rates.

FIGS. 16A-16F. (a)-(e) Capacitive charge storage contribution for $Ti_3C_2$-C10 at scan rates from 1 to 20 mV $s^{-1}$, respectively. (f) Separation of the contributions from surface and diffusion-controlled processes for $Ti_3C_2$-C10 at different scan rates.

FIGS. 17A-17F. (a)-(e) Capacitive charge storage contribution for $Ti_3C_2$-C12 at scan rates from 1 to 20 mV $s^{-1}$, respectively. (f) Separation of the contributions from surface and diffusion-controlled processes for $Ti_3C_2$-C12 at different scan rates.

FIGS. 18A-18F. (a)-(e) Capacitive charge storage contribution for $Ti_3C_2$-C16 at scan rates from 1 to 20 mV $s^{-1}$, respectively. (f) Separation of the contributions from surface and diffusion-controlled processes for $Ti_3C_2$-C16 at different scan rates.

Figure 19A:
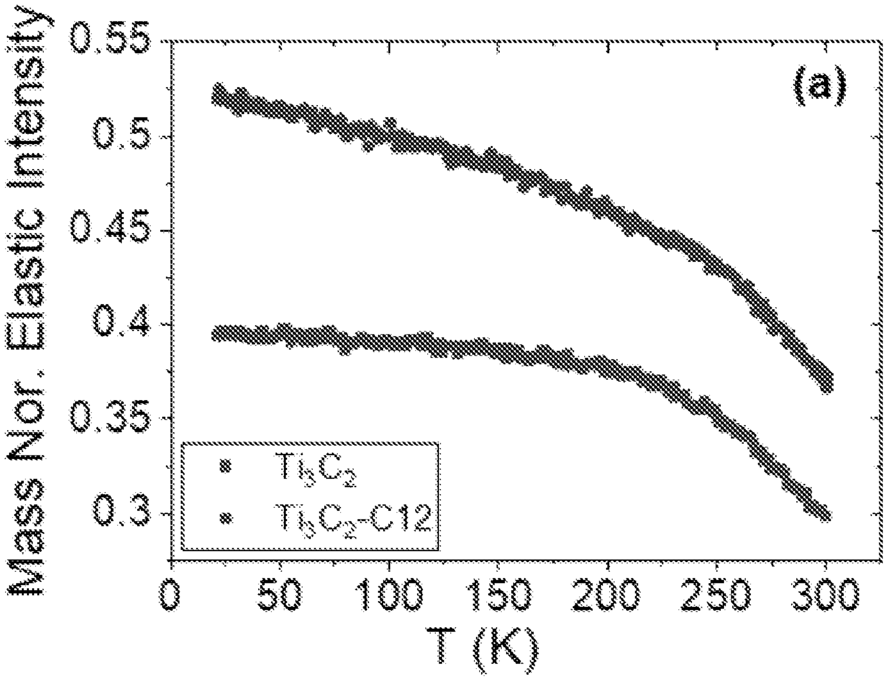
Figure 19B:
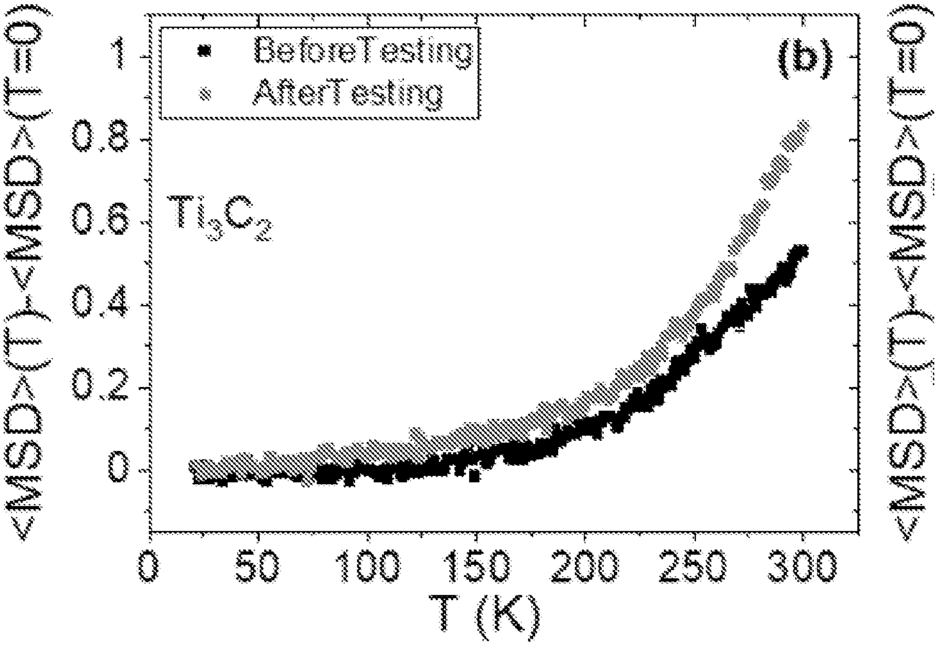
Figure 19C:
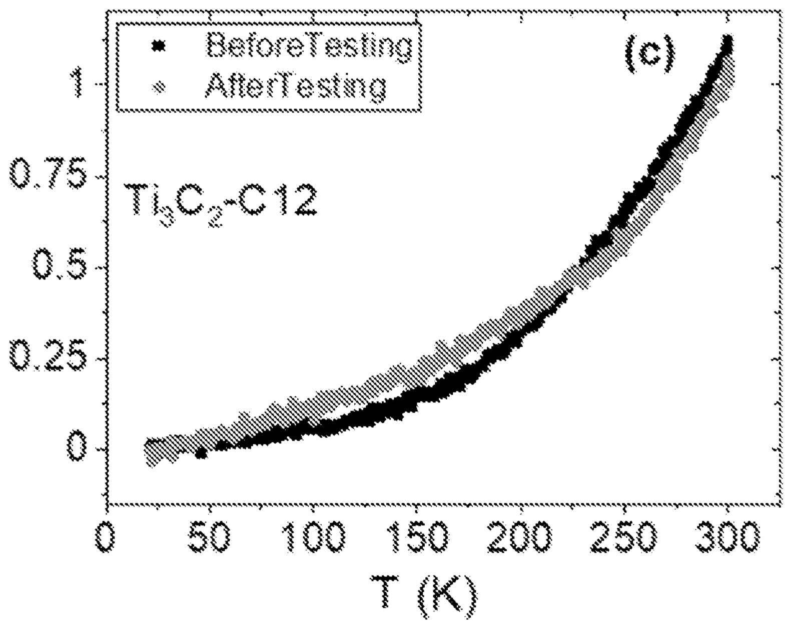

FIGS. 19A-19C. (a) A comparison between the mass normalized elastic intensities for $Ti_3C_2T_x$ and $Ti_3C_2$-C12 electrodes after the negative charging. (b) Mean-squared atomic displacements derived from the elastic intensities for $Ti_3C_2T_x$ electrode before and after the electrochemical testing. (c) Mean-squared atomic displacement derived from the elastic intensity for $Ti_3C_2$-C12 electrode before and after the electrochemical testing.

Figure 20:
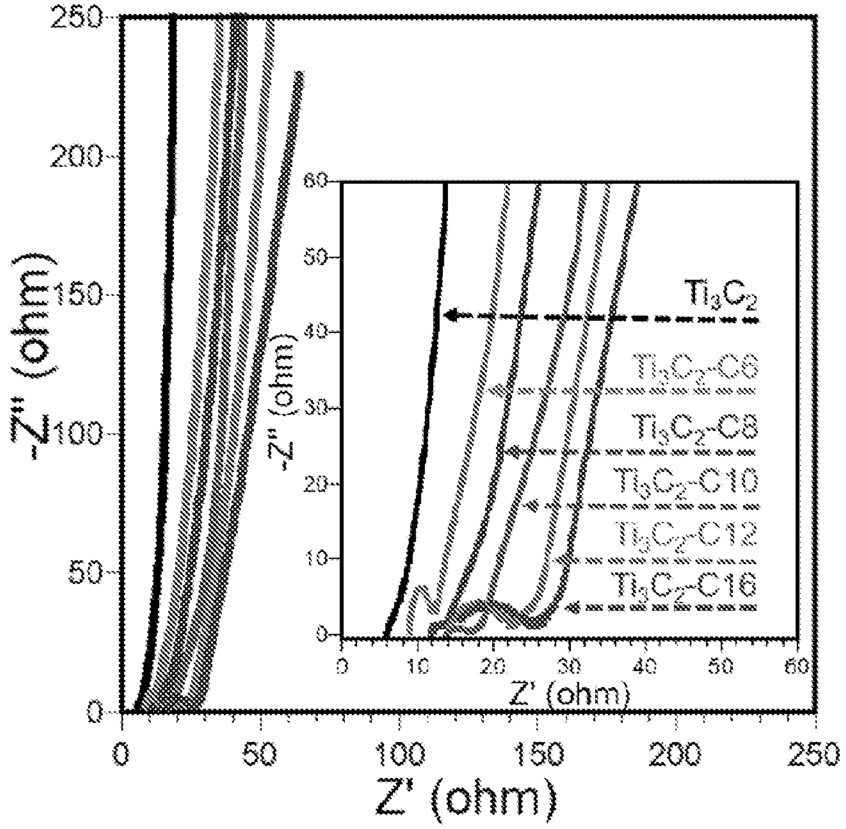

FIG. 20. Nyquist plots of alkylammonium cations intercalated $Ti_3C_2T_x$ electrodes at open circuit potential with 1 M EMIMTFSI in ACN electrolyte.

Figure 21:
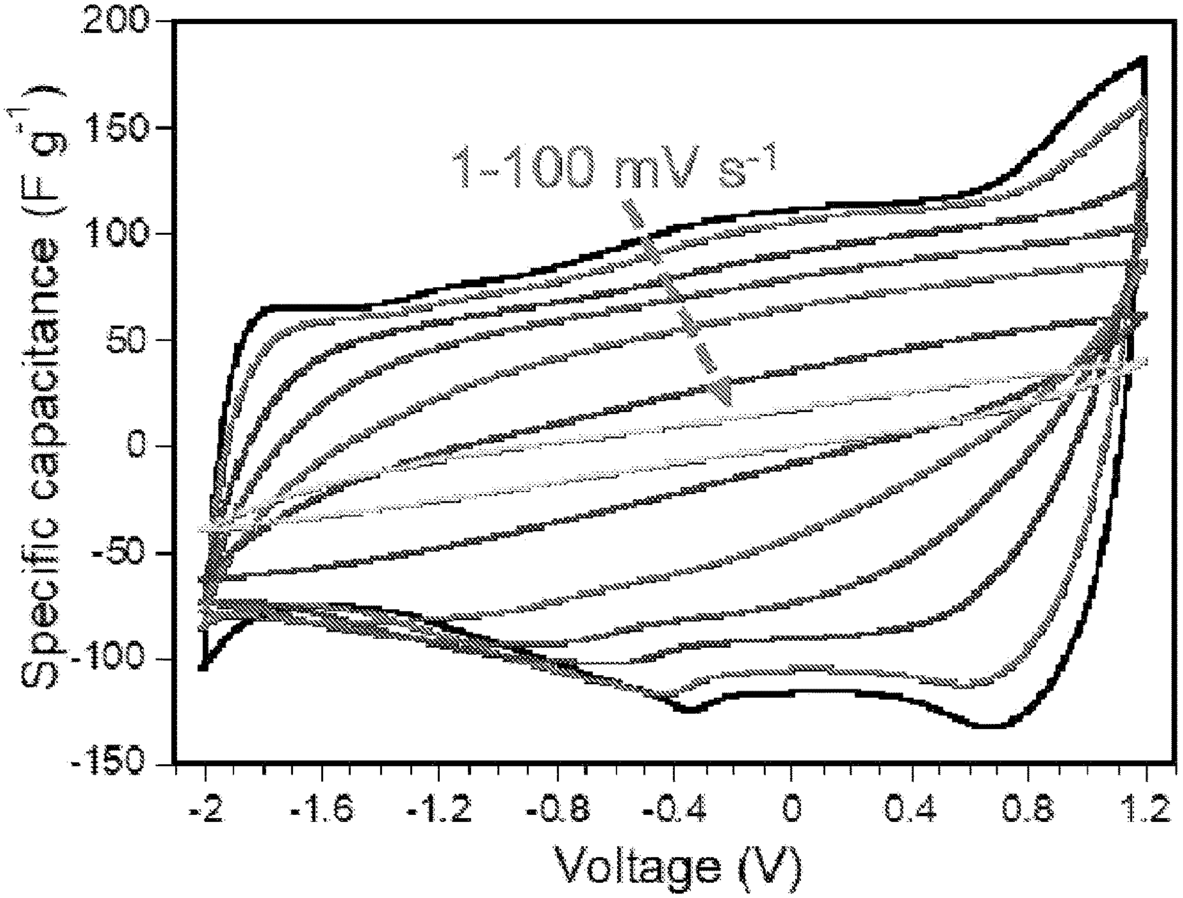

FIG. 21. Three-electrode CV curves of $Ti_3C_2$-C12 electrode in neat EMIMTFSI electrolyte. The scan rates from the outer cycle to the inner cycle are 1, 2, 5, 10, 20, 50, and 100 mV $s^{-1}$.

Figure 22A:
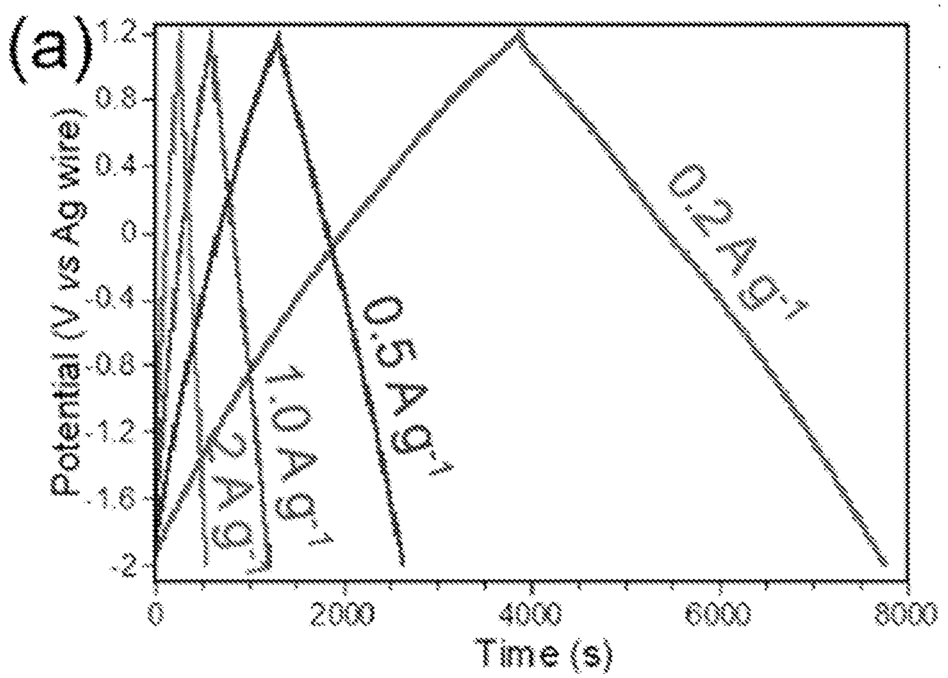
Figure 22B:
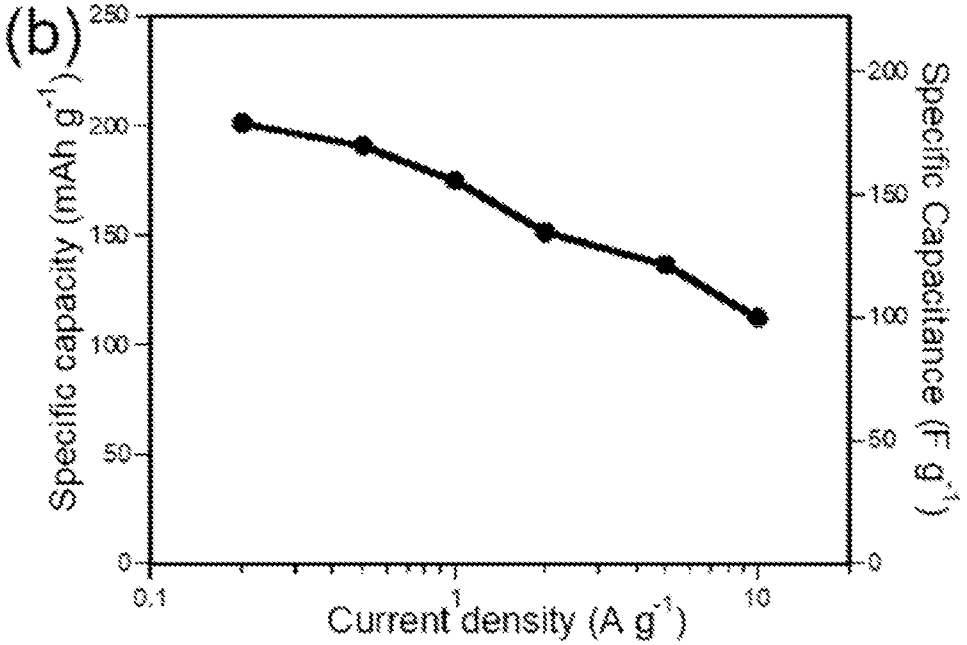

FIGS. 22A-B. (a) Galvanostatic charge-discharge profiles of $Ti_3C_2$-C12 electrode with different current densities in neat EMIMTFSI electrolyte. (b) Specific capacity of $Ti_3C_2$-C12 electrode at different current densities.

Figure 23:
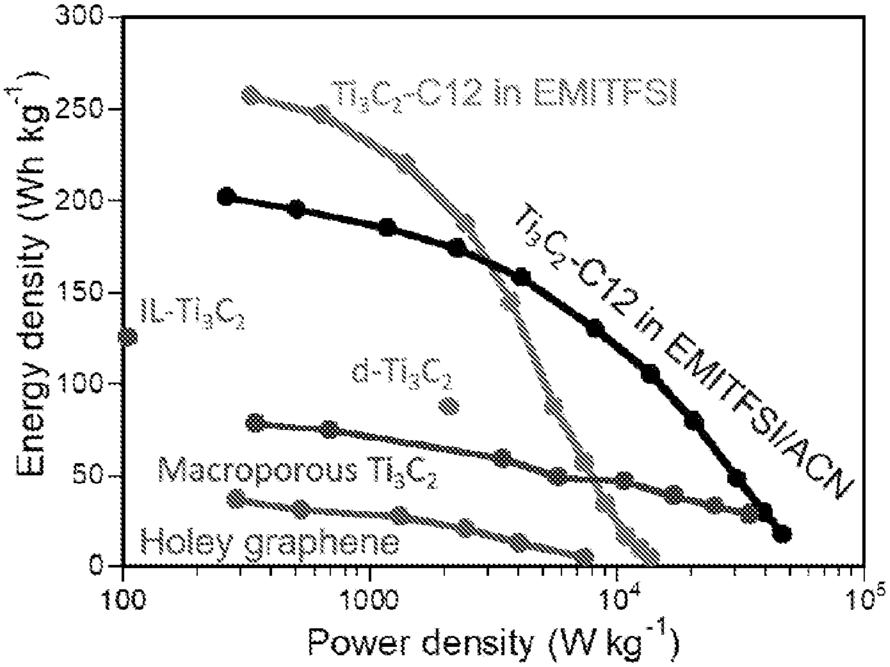

FIG. 23. Ragone plot of $Ti_3C_2$-C12 in EMIMTFSI/ACN and neat EMIMTFSI electrolytes. The mass is based on the active materials (i.e., electrode weight without binder).

Figure 24:
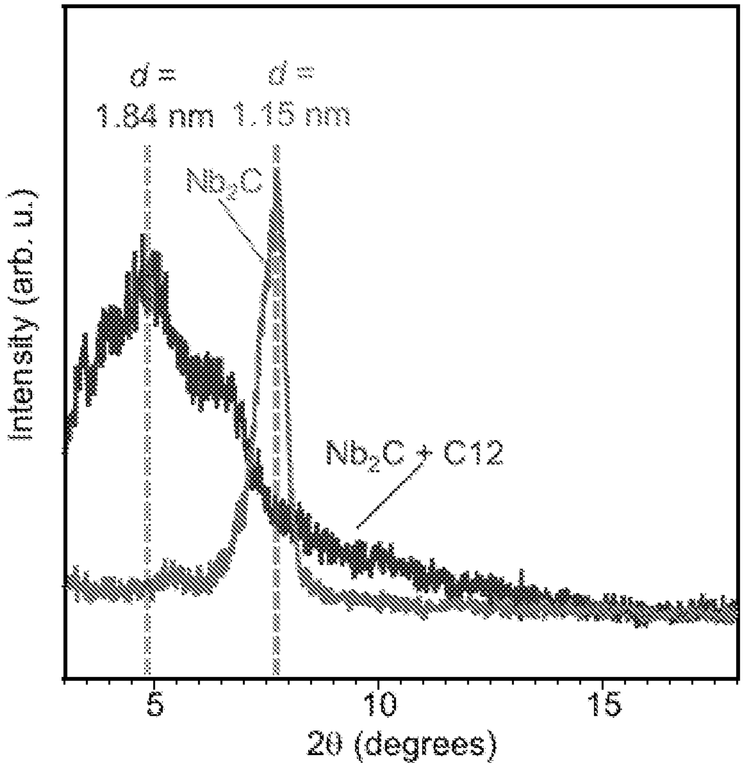

FIG. 24. $C_{12}$ intercalation in $Nb_2CT_x$ MXene resulted in a shift in the 002 diffraction from a 2θ of about 7.7° to 4.8°. This change corresponds to an increase in the d-spacing from 1.15 nm to 1.84 nm.

Figure 25A:
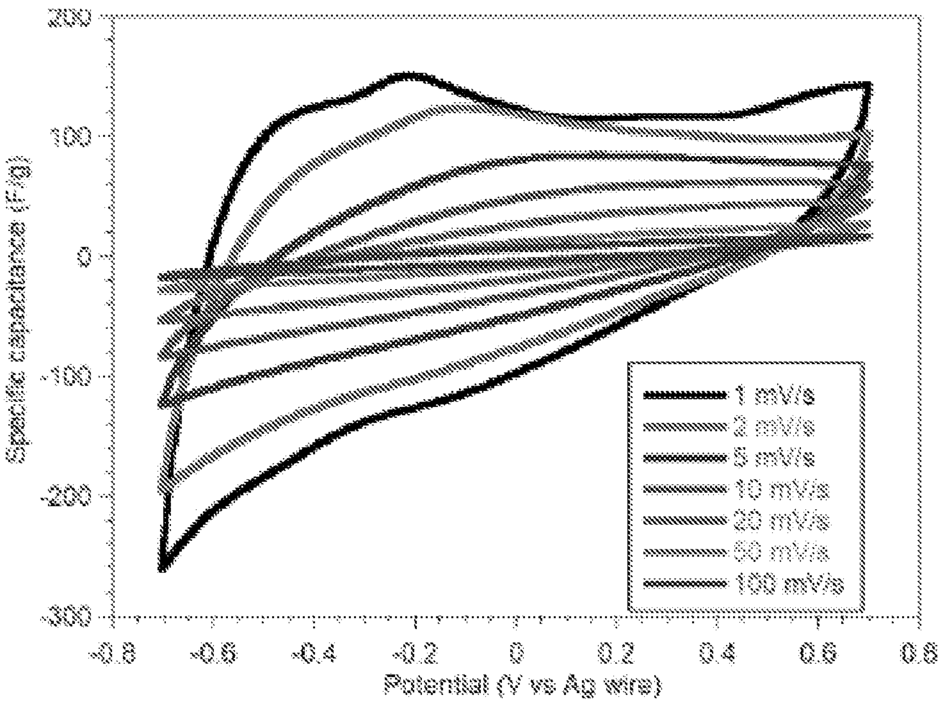
Figure 25B:
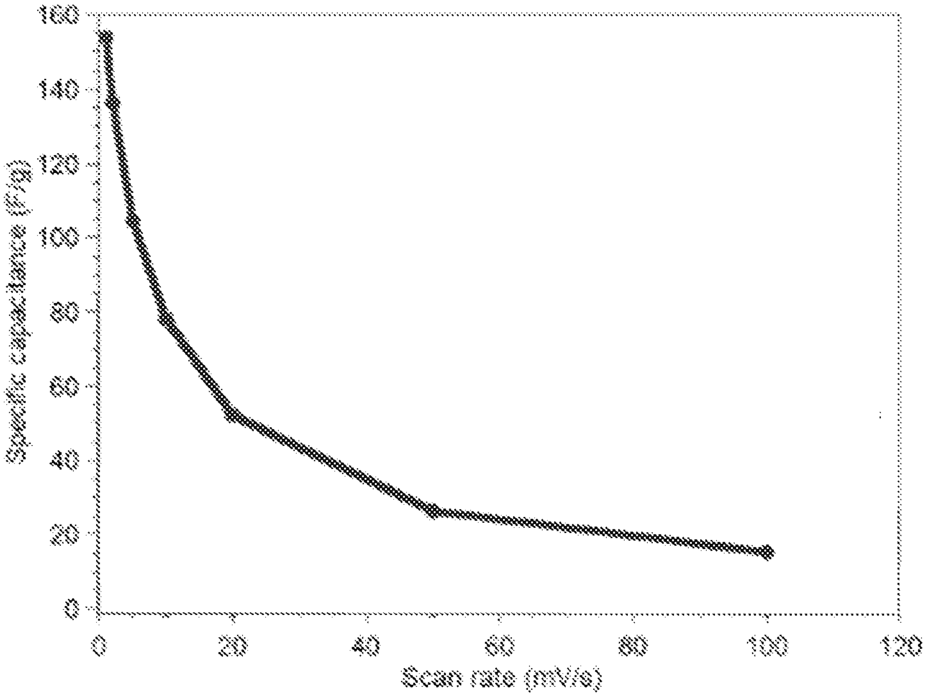

FIGS. 25A and 25B. (A) CV curves and (B) specific capacitance of $Ti_3C_2T_x$-C12 in protic ionic liquids of a blend of 1-butylimidazole (BuIM) and bis(trifluoromethanesulfonyl)imide ($HNTf_2$) solution in a molar ratio of 0.8:0.2. The CV curves were performed in a window of −0.8 to 0.8 V vs. Ag wire at scan rates of 1 mV $s^{-1}$, 2 mV $s^{-1}$, 5 mV $s^{-1}$, 10 mV $s^{-1}$, 20 mV $s^{-1}$, 50 mV $s^{-1}$, and 100 mV $s^{-1}$ from the outer cycle to the inner cycle respectively.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Detailed Description.

The present disclosure provides new and improved supercapacitors using improved electrode materials in various room-temperature ionic liquids (RTILs) that addresses one or more of the technical issues discussed above. Considering the specific energy equation for capacitors, $E=\frac{1}{2}CV^2$ (where E is specific energy; C is the specific capacitance; and V is the operating voltage window), it is believed that expansion of the voltage window is an effective approach to significantly improve the energy density.

The inventors of the present disclosure surprisingly discovered that that an optimal interlayer spacing (d-spacing) can be developed in MXenes for fast transport of large ions (beyond protons) that enables high power with high energy considering the larger voltage window offered by both organic and RTIL electrolytes. The effect of interlayer spacing (d-spacing) on the overall electrochemical performance of MXene electrodes in RTIL was studied by intercalating different chain length alkylammonium (AA) cations into $Ti_3C_2T_x$, producing different d-spacing. 1 M EMIMTFSI/ACN and neat EMIMTFSI RTIL ionic liquid were employed as electrolytes in three-electrode cells. The inventors surprisingly found that the AA-cation-intercalated $Ti_3C_2T_x$ unexpectedly yields much higher specific capacitances, specific energy/power and cycling stability than previously reported in 1 M EMIMTFSI/ACN electrolyte and neat EMIMTFSI RTIL electrolyte. Specifically, dodecyltrimethylammonium intercalated $Ti_3C_2T_x$ ($Ti_3C_2$-C12) can deliver a large specific capacitance of 257 F $g^{-1}$ (1428 mF $cm^{-2}$ and 492 F $cm^{-3}$) in neat EMIMTFSI electrolyte. These values are much higher than any other report for MXene in RTIL and even higher than carbon-based materials. In addition, excellent cycling performance was achieved at current densities of 1.0 and 5.0 A $g^{-1}$. The inventors developed a supercapacitor electrode with unexpectedly superior electrochemical performance in RTIL by unlocking the interlayer spacing, which opens the door for high performance energy storage devices.

One aspect of the disclosure provides a supercapacitor comprising: an electrode comprising an electrode material, the electrode material comprising: $M_{n+1}X_nT_x$ layers having interlayers therebetween, wherein the M is selected from the group of Group 3, 4, 5, 6, and 7 transition metals and a combination thereof, wherein X is C, N, or a combination thereof, wherein n is 1, 2, 3, or 4, wherein $T_x$ comprises a termination group independently selected from the group of alkoxide, alkyl, carboxylate, halide, fluorine (F), chlorine (Cl), hydroxide, hydride, oxide, sub-oxide, nitride, subnitride, sulfide, sulfonate, thiol, and a combination thereof; and an intercalant located in at least a portion of the interlayers. The supercapacitor further comprises an electrolyte comprising a room temperature ionic liquid (RTIL).

As used herein, the terms "room temperature ionic liquid" or "RTIL" or "RTILs" refer to organic salts that are liquid at or below 100° C., and are composed entirely of cations and anions (i.e., free of any additional solvents) (Welton, Chem. Rev. 1999, 99: 2071-2083; and Welton, Coord. Chem. Rev. 2004, 248:2459-2477). The RTILs can have a unique combination of liquid properties, such as very low volatility, relatively low viscosity, high thermal stability, low flammability, high ionic conductivity, tunable polar solvation and transport properties, and/or in some cases, even catalytic properties.

In embodiments, the RTIL is liquid at about room temperature of 25±5° C., or near-ambient temperature, or at a temperature of about −20-100° C., about −10-100° C., about 0-100° C., about 10-100° C., about 15-100° C., or about 20-100° C. In embodiments, the RTIL can also have very low vapor pressure at about room temperature of 25±3° C. In embodiments, the RTIL can also have high ionic conductivity higher than about 0.1 S/cm, about 1 S/cm, about 10 S/cm, about 100 S/cm, about 200 S/cm, about 300 S/cm, about 500 S/cm, about 1000 S/cm, or even about 10,000 S/cm. In embodiments, the RTIL can also have high electrochemical stability window.

In embodiments, each of the $M_{n+1}X_nT_x$ layers has two opposite surfaces or faces, and the termination groups $T_x$ may be independently present on one or both surfaces of each of the $M_{n+1}X_nT_x$ layers. As is well known in the art, depending on the types of the MXene materials ($M_{n+1}X_nT_x$) and the methods of preparing the MXene material, the termination groups $T_x$ and the number of termination groups on the surfaces of each of the $M_{n+1}X_nT_x$ layers may change. For example, when preparing the $Ti_3C_2T_x$ material (the MXene material) by etching the aluminum (Al) from a MAX material, titanium aluminum carbide ($Ti_3AlC_2$), using fluoridic acids, for example aqueous HF derived from mixtures of alkali fluoride salts and mineral acids, the termination groups may comprise one or more of hydroxide, oxide, and fluoride.

As used herein, the term "a MAX material" or "a MAX phase material" is a common term in the art, which refers to layered, hexagonal carbides and nitrides which have the general formula of $M_{n+1}AX_n$, (MAX) where n is in a range of 1 to 4, and M is selected from the group of Group 3, 4, 5, 6, and 7 transition metals and a combination thereof as defined above, A is an A-group (mostly IIIA and IVA, or groups 13 and 14) element such as Al, Si, Ge, Ga, Sn, Cd, Sn, or In, and X is either carbon and/or nitrogen as defined above.

In embodiments, the intercalant comprises an alkyl-ammonium (AA) cation, a cationic polymer, a nanoparticle, a nanosheet, a quantum dot, or a combination thereof.

In embodiments, the intercalant can comprise an alkyl-ammonium (AA) cation. In embodiments, the AA cation has a cation size in a range of about 0.1-20 nm, about 0.3-12 nm, about 0.3-2 nm, or 0.3-1.3 nm.

In embodiments, the alkyl-ammonium (AA) cation has a structure of Formula 1, wherein each of $R_1$, $R_2$, $R_3$ and $R_4$ is independently a $C_1$-$C_{50}$ alkyl or H. In embodiments, each of $R_1$, $R_2$, $R_3$, and $R_4$ is independently a $C_1$-$C_{50}$ alkyl having a structure of $C_nH_{2n+1}$, wherein n is in a range of 1-50, 1-40, 1-30, 1-20, or 1-18. In embodiments, $R_1$, $R_2$, $R_3$, and $R_4$ each have different alkyl chain lengths. In embodiments, all $R_1$, $R_2$, $R_3$, and $R_4$ are the same alkyl. In embodiments, three of the $R_1$, $R_2$, $R_3$, and $R_4$ are the same and the other one is different. In embodiments, two of the $R_1$, $R_2$, $R_3$, and $R_4$ are the same and the other two are different. In embodiments, $R_1$, $R_2$, and $R_3$ are methyl, and $R_4$ is selected from the group of methyl, ethyl, propyl, butyl, pentyl, hexyl, heptyl, octyl, nonyl, decyl, undecyl, dodecyl, dodecyl, tridecyl, tetradecyl, pentadecyl, hexadecyl, heptadecyl, and octadecyl. In embodiments, $R_1$, $R_2$, and $R_3$ are methyl, and $R_4$ is selected from the group of hexyl, heptyl, octyl, nonyl, decyl, undecyl, dodecyl, dodecyl, tridecyl, tetradecyl, pentadecyl, hexadecyl, heptadecyl, and octadecyl.

Formula 1

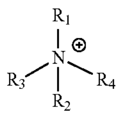

In embodiments, the alkyl-ammonium (AA) cation comprises one or more cations having a formula $[(CH_3)_3NC_nH_{2n+1}]^+$, wherein n is in a range of 1-50, 2-40, 3-30, 4-25, 6-22, 8-20, 10-18, 10-16, or 12-14. Non-limiting examples of the alky group may include hexyl, octyl, decyl, dodecyl, hexadecyl, or a combination thereof. Non-limiting examples of the AA cations may include hexyl-, octyl-, decyl-, dodecyl- and hexadecyl-trimethylammonium, or a combination thereof. In embodiments, the AA cation may comprise dodecyl-trimethylammonium having a structure of $[(CH_3)_3NC_{12}H_{25}]^+$. The AA cation can be provided with an anion to provide charge neutrality. The anion is not particularly limited. Suitable anions can include chloride, bromide, fluoride, or acetate.

In embodiments, the intercalant can comprise a nanoparticle having an average particle size in a range of about 0.1-50 nm, about 0.3-20 nm, about 0.3-12 nm, about 0.3-2 nm, about 1-10 nm, or about 0.3-1.3 nm. Non-limiting examples of the nanoparticles may include carbon black nanoparticles, carbon nanotubes, carbon nanofibers, titanium dioxide, silica, fullerenes, or soft nanoparticles such as liposomes, vesicles and nanodroplets.

In embodiments, the intercalant can comprise a quantum dot (QD) having an average diameter in a range of about 0.1-50 nm, about 0.3-40 nm, about 0.3-30 nm, about 0.5-20 nm, about 1-10 nm, about 1-6 nm, about 2-10 nm, or about 2-6 nm. As used herein, "quantum dot" refers to semiconductor particles a few nanometres in size, having optical and electronic properties that differ from those of larger particles as a result of quantum mechanics. When the quantum dots are illuminated by UV light, an electron in the quantum dot can be excited to a state of higher energy. In the case of a semiconducting quantum dot, this process corresponds to the transition of an electron from the valence band to the conductance band. The excited electron can drop back into the valence band releasing its energy as light. Quantum dots have properties intermediate between bulk semiconductors and discrete atoms or molecules. Their optoelectronic properties change as a function of both size and shape. Larger QDs of 5-6 nm diameter emit longer wavelengths, with colors such as orange, or red. Smaller QDs (2-3 nm) emit shorter wavelengths, yielding colors like blue, and green.

In embodiments, the M is selected from the group of Ti, Nb, Sc, V, Cr, Y, Zr, Mo, Hf, Ta, W, and a combination thereof. In embodiments, M is selected from the group of Ti, Nb, Sc, V, Cr, Zr, Mo, Hf, Ta, and a combination thereof. In embodiments, M is selected from Ti, Nb, and a combination thereof. In embodiments, M is Ti. In embodiments, M is Nb.

In embodiments, the $M_{n+1}X_n$ is selected from the group of $Ti_3C_2$, $Nb_2C$, $Sc_2C$, $Ti_2C$, $Ti_2N$, $Ti_2(C_{1-y}N_y)$, $V_2C$, $Cr_2C$, $Zr_2C$, $Zr_2N$, $Hf_2C$, $Ta_2C$, $Mo_2C$, $Ti_3(C_{1-y}N_y)_2$, $V_3C_2$, $Cr_3C_2$, $Zr_3C_2$, $Hf_3C_2$, $Ta_3C_2$, $Mo_3C_2$, $(Mo_{2/3}Ti_{1/3})_3C_2$, $(Cr_{2/3}Ti_{1/3})_3C_2$, $Ti_4N_3$, $Ti_4(C_{1-y}N_y)_3$, $V_4C_3$, $Ta_4C_3$, $(Mo_{1/2}Ti_{1/2})_4C_3$, $Nb_4C_3$, and a combination thereof, wherein y is in a range of 0-1.

In embodiments, the $M_{n+1}X_n$ is selected from the group of $Ti_3C_2$, $Nb_2C$, $Sc_2C$, $Sc_2N$, $Ti_2C$, $Ti_2N$, $V_2C$, $V_2N$, $Cr_2C$, $Cr_2N$, $Zr_2C$, $Zr_2N$, $Nb_2N$, $Hf_2C$, $Hf_2N$, $Ta_2C$, $Mo_2C$, $Ti_3N_2$, $V_3C_2$, $Ta_3C_2$, $Ta_3N_2$, $Mo_3C_2$, $(Cr_{2/3}Ti_{1/2})_3C_2$, $Ti_4C_3$, $Ti_4N_3$, $V_4C_3$, $V_4N_3$, $Ta_4C_3$, $Ta_4N_3$, $Nb_4C_3$, and a combination thereof.

In embodiments, the $M_{n+1}X_n$ comprises $Ti_3C_2$.

In embodiments, the $M_{n+1}X_n$ comprises $Nb_2C$.

In embodiments, the room-temperature ionic liquid (RTIL) comprises an organic cation selected from the group of 1-ethyl-3-methyl imidazolium ($EMIM^+$), 1-alkyl-3-methyl-imidazolium, 1-alkyl-2,3-methyl-imidazolium, tetraalkylammonium, trialkylsulfonium, tetraalkylphosphonium, 1-alkylpyridinium, N-alkyl-N-methyl-morpholinium, 1-alkyl-1-methyl-piperidinium, 1-alkyl-1-methyl-pyrrolidinium, 3-methylpyridinium, 1-methylimidazolium, or a combination thereof. In embodiments, the alkyl is a $C_1$-$C_{50}$ alkyl, a $C_1$-$C_{30}$ alkyl, a $C_1$-$C_{20}$ alkyl, or a $C_1$-$C_{12}$ alkyl.

In embodiments, the alkyl is selected from the group of methyl, ethyl, propyl, butyl, pentyl, hexyl, heptyl, octyl, nonyl, decyl, undecyl, dodecyl, or a combination thereof.

In embodiments, the organic cation of the RTIL has an cation size in a range of about 0.1-20 nm, about 0.2-15 nm, about 0.3-10 nm, about 0.3-3 nm, about 0.3-2 nm, or about 0.3-1.3 nm.

In embodiments, the RTIL comprises an organic anion selected from bis-(trifluoromethylsulfonyl)-imide ($TFSI^-$), dicyanamide ($N(CN)_2^-$), hexafluorophosphate ($PF_6^-$), tetrachloroaluminate, thiocyanate ($SCN^-$), halides, tetrafluoroborate, hexafluorophosphate, tris(pentafluoroethyl)Trifluorophosphate, methanesulfonate, trifluoromethanesulfonate, bis(fluorosulfonyl)imide, alkylsulfate, (fluorosulfonyl)(trifluoromethanesulfonyl) imide, bis(trifluoromethanesulfonyl)imide, dicyanamide, bis (oxalato)borate, or a combination thereof. In embodiments, the alkyl comprises a $C_1$-$C_{50}$ alkyl, a $C_1$-$C_{20}$ alkyl, or a $C_1$-$C_{12}$ alkyl.

In embodiments, the $M_{n+1}X_nT_x$ layers have a d-spacing in a range of about 0.1-20 nm, about 1-20 nm, about 1-12 nm, about 1-10 nm, about 1-8 nm, about 1-6 nm, about 1-5 nm, about 1-4 nm, about 1-3 nm, about 0.9-3 nm, about 1-2.5 nm, about 1-2 nm, about 0.3-3 nm, or about 0.9-2.5 nm. In embodiments, the d-spacing is in a range of about 0.9-3 nm. In general, as the n of the alkylammonium increases, the d-spacing increases. The optimal d-spacing depends on the applications of the intercalated MXene materials. For example, in the supercapacitors of the disclosure, the optimal d-spacing depends on the types of the electrolytes used in the supercapacitor. The d-spacing can be fine-tuned by selecting suitable intercalants. The d-spacing is measured by a typical high-angle annular dark-field (HAADF) scanning transmission electron microscopy (STEM) or X-ray diffraction (XRD).

As used herein, the term "d-spacing" refers to the distance from the center of one $M_{n+1}X_nT_x$ layer to the center of an adjacent $M_{n+1}X_nT_x$ layer, and thus the d-spacing includes half of the upper layer and half of the lower layer and the gallery (interlayer) in between.

In embodiments, the difference in d-spacing, Δd, between pristine $M_{n+1}X_nT_x$ layers and the $M_{n+1}X_nT_x$ layers including the intercalant is in a range of about 0.1-20 nm, about 0.3-12 nm, about 0.3-10 nm, about 0.3-5 nm, about 0.3-4 nm, about 0.3-3 nm, about 0.3-2 nm, about 0.3-1.5 nm, about 0.3-1.4 nm, or about 0.3-1.3 nm.

As used herein, the "pristine $M_{n+1}X_nT_x$ layers" refer to $M_{n+1}X_nT_x$ layers that do not include an intercalant, for example, as prepared either after annealing without moisture or before annealing with moisture.

For example, when pristine $Ti_3C_2T_x$ layers are intercalated with different alkylammonium (AA) cations, the d-spacing is increased to different degrees. The increase of the d-spacing, Δd, is about 3.28 Å, 3.68 Å, 4.78 Å, 11.13 Å and 14.28 Å respectively when the pristine $Ti_3C_2T_x$ layers are intercalated with hexyl-, octyl-, decyl-, dodecyl- and hexadecyl-trimethylammonium, respectively.

In embodiments, the supercapacitor can have a specific capacitance in a range of about 30-500, about 50-300, about 70-300, or about 100-280 F/g at a scan rate in a range of about 1-100 mV/s.

In embodiments, the supercapacitor can have a specific capacitance in a range of about 30-500 F/g at a current density of about 0.1-10 A/g.

In embodiments, the $M_{n+1}X_nT_x$ layers can have $M_{n+1}X_nT_x$ unit cells and the amount of intercalant located in the interlayers of the $M_{n+1}X_nT_x$ layers can be in a range of about 0.01-1, about 0.05-0.5, or about 0.1 intercalant cations per $M_{n+1}X_nT_x$ unit cell.

In embodiments, the $M_{n+1}X_n$ can comprise $Ti_3C_2$, the $Ti_3C_2T_x$ layers can have $Ti_3C_2T_x$ unit cells, and the amount of intercalant located in the interlayers of the $Ti_3C_2T_x$ layers can be in a range of about 0.01-1, about 0.05-0.5, or about 0.1 intercalant cations per $Ti_3C_2T_x$ unit cell.

In embodiments, the intercalant can comprise the alkylammonium (AA), and the AA located in the interlayers of the $Ti_3C_2T_x$ layers can be in an amount of about 0.1 AA cations per $Ti_3C_2T_x$ unit cell.

In embodiments, the room temperature ionic liquid (RTIL) comprises 1-ethyl-3-methyl imidazolium bis-(trifluoromethylsulfonyl)-imide (EMIMTFSI).

In embodiments, the electrolyte further comprises a solvent. In embodiments, the solvent comprises acetonitrile (ACN).

In embodiments, the $M_{n+1}X_n$ can comprise $Nb_2C$, the $Nb_2CT_x$ layers can have $Nb_2CT_x$ unit cells, and the amount of intercalant located in the interlayers of the $Nb_2CT_x$ layers can be in a range of about 0.01-1, about 0.05-0.5, or about 0.1 intercalant (cations) per $Nb_2CT_x$ unit cell.

In embodiments, the intercalant can comprise the alkylammonium (AA), and the amount of AA located in the interlayers of the $Nb_2CT_x$ layers can be about 0.01-1, about 0.05-0.5, or about 0.1 AA (cations) per $Nb_2CT_x$ unit cell. In embodiments, the AA cations located in the interlayers of the $Nb_2CT_x$ layers is in an amount of about 0.1 AA cations per $Nb_2CT_x$ unit cell.

In embodiments, the room temperature ionic liquid (RTIL) comprises a blend of 1-butylimidazole (BuIM) and bis(trifluoromethanesulfonyl)imide ($HNTf_2$) solution.

In embodiments, a molar ratio of the 1-butylimidazole (BuIM) to the bis(trifluoromethanesulfonyl)imide ($HNTf_2$) is in a range of about 0.6:0.4 to 0.9:0.1, about 0.7:0.3 to 0.9:0.1, or about 0.8:0.2.

In embodiments, the molar ratio of the 1-butylimidazole (BuIM) to the bis(trifluoromethanesulfonyl)imide ($HNTf_2$) is about 0.8:0.2.

In embodiments, the $M_{n+1}X_nT_x$ layers can comprise $Ti_3C_2T_x$ layers, the intercalant can comprise the alkyl-ammonium (AA) cations, and the electrode material can comprise $Ti_3C_2T_x$ layers having interlayers therebetween; and alkyl-ammonium (AA) cations located in the interlayers, wherein $T_x$ comprises the termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof. In embodiments, the RTIL comprises 1-ethyl-3-methyl imidazolium bis-(trifluoromethylsulfonyl)-imide (EMIMTFSI). In embodiments, the electrolyte further comprises a solvent. In embodiments, the solvent comprises acetonitrile (ACN).

In embodiments, the RTIL can comprise a blend of 1-butylimidazole (BuIM) and bis(trifluoromethanesulfonyl) imide ($HNTf_2$) solution in a molar ratio in a range of about 0.7:0.3 to 0.9:0.1, or about 0.8:0.2.

In embodiments, the $M_{n+1}X_nT_x$ layers can comprise $Nb_2CT_x$ layers, the intercalant can comprise the alkyl-ammonium (AA) cations, and the electrode material can comprise $Nb_2CT_x$ layers having interlayers therebetween; and alkyl-ammonium (AA) cations located in the interlayers, wherein $T_x$ comprises the termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof.

In embodiments, the RTIL comprises 1-ethyl-3-methyl imidazolium bis-(trifluoromethylsulfonyl)-imide (EMIMTFSI). In embodiments, the electrolyte further comprises a solvent. In embodiments, the solvent comprises acetonitrile (ACN).

In embodiments, the RTIL comprises a blend of 1-butylimidazole (BuIM) and bis(trifluoromethanesulfonyl)imide ($HNTf_2$) solution in a molar ratio in a range of about 0.7:0.3 to 0.9:0.1, or about 0.8:0.2.

In embodiments, the RTIL comprises an organic cation, and the electrode material further comprises the organic cation located in at least a portion of the interlayers of the $M_{n+1}X_nT_x$ layers. The organic cations of the RTIL can intercalate into and out of the interlayers of the $M_{n+1}X_nT_x$ layers during discharging and charging. During charging of the supercapacitor, a portion of the organic cations of the RTIL may be transported out of the interlayers of the $M_{n+1}X_nT_x$ layers (e.g., de-intercalate) and a portion of the organic cations of the RTIL may stay in the interlayers of the $M_{n+1}X_nT_x$ layers. During discharging of the supercapacitor, organic cations of the RTIL may intercalate into the interlayers of the $M_{n+1}X_nT_x$ layers. Thus, the transport of the organic cations of the RTIL in the electrolyte of the supercapacitor is a reversible intercalation/de-intercalation of the organic cations process during the charging and discharging process of the electrode. In embodiments, the organic cations reside in very tight confinement in-between the interlayers of the $M_{n+1}X_nT_x$ layers, much tighter than a typical inter-stack space in MXene materials.

In embodiments, the density of the organic cation of the RTIL located in the interlayers of the $M_{n+1}X_nT_x$ layers is in a range of about 50-1500 kg/$m^3$, about 50-1000 kg/$m^3$, about 100-500 kg/$m^3$, or about 200-500 kg/$m^3$.

In embodiments, the RTIL comprises an organic anion, and the electrode material further comprises the organic anion located in the interlayers of the $M_{n+1}X_nT_x$ layers. In embodiments, the electrode material further comprises the organic anion located in the interlayers of the $M_{n+1}X_nT_x$ layers.

In embodiments, the density of the organic anion located in the interlayers of the $M_{n+1}X_nT_x$ layers is in a range of about 50-2000 kg/$m^3$, about 100-1500 kg/$m^3$, 300-1000 kg/$m^3$. Similarly, the transport of the organic anions of the RTIL in the electrode of the supercapacitor is a reversible intercalation/de-intercalation process during the charging and discharging process of the electrode.

In embodiments, the electrode comprises about 4.0-7.0, about 4.5-6.0, or about 5.0-5.5 mg/$cm^2$ of the electrode material.

Another aspect of the disclosure provides a method of preparing a supercapacitor, the method comprising: incorporating into an electrode an electrode material comprising $M_{n+1}X_nT_x$ layers having interlayers therebetween and an intercalant located in at least a portion of the interlayers, wherein M is selected from the group of Group 3, 4, 5, 6, and 7 transition metals and a combination thereof, wherein X is C, N, or a combination thereof, wherein n is 1, 2, 3, or 4, wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof; incorporating the electrode into the supercapacitor; and incorporating an electrolyte comprising a room-temperature ionic liquid (RTIL) into the supercapacitor.

In embodiments, the method further comprises preparing the electrode material through an ionic exchange approach, an electrochemical approach, or a thermochemical approach.

In embodiments, the method further comprises preparing the electrode material through an ionic exchange approach by reacting the intercalant with an $M_n$+$1X_{nTx}$-containing material to form the intercalant-intercalated $M_{n+1}X_nT_x$ and thus form the electrode material.

In embodiments, the $M_n$+$1X_{nTx}$-containing material is a Li-intercalated $M_{n+1}X_nT_x$ material comprising $M_{n+1}X_nT_x$ layers having interlayers therebetween and $Li^+$ located in the interlayers of the $M_{n+1}X_nT_x$ layers.

In embodiments, the method further comprises preparing the Li-intercalated $M_{n+1}X_nT_x$ material comprising reacting a pristine $M_{n+1}X_nT_x$ material with HF and LiCl in an aqueous solution to form the Li-intercalated $M_{n+1}X_nT_x$ material.

In embodiments, incorporating the electrode material into the electrode comprises i) coating a substrate with the electrode material to form the electrode; or ii) rolling the electrode material to form a free-standing or self-supported electrode. The substrate can be any suitable substrate, such as plastic, glass or metal etc. In embodiments, the rolling comprises rolling using a glass cylinder.

In embodiments, the self-supported electrode substantially consists of the electrode material. In embodiments, the self-supported electrode has no additives and also no binders. In some embodiments, the self-supported electrode has about 1-15 wt. %, about 2-10 wt. %, about 3-8 wt. %, about 4-6 wt. %, or about 5 wt. % of polytetrafluoroethylene (PTFE) as a binder. The thickness of the self-supported electrode is about 10-100 μm, about 20-80 μm, about 30-70 μm, about 40-60 μm, or about 50 μm.

Figure 1B:
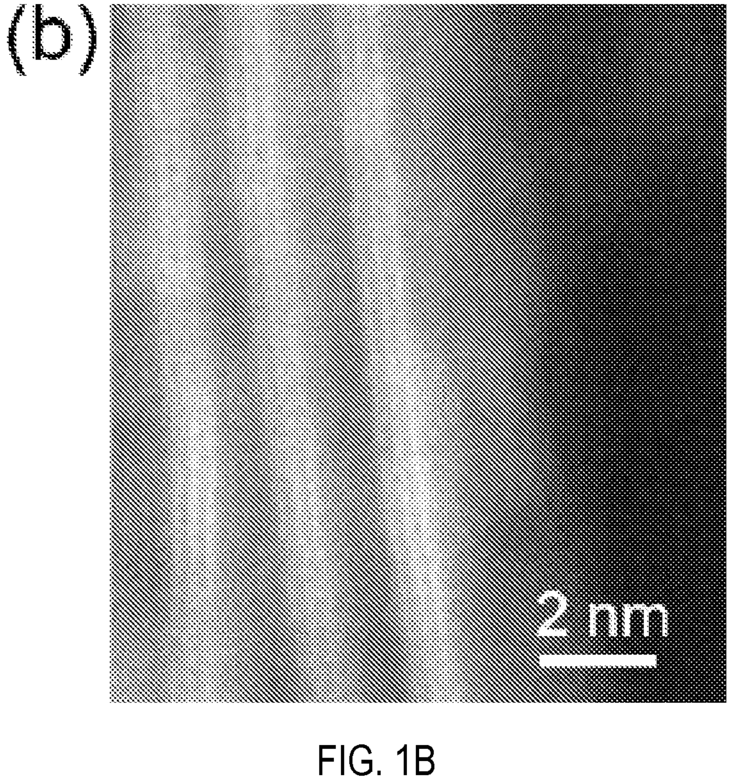

As detailed in Examples 1-2 and shown in FIG. 5, a solution of HF and LiCl was used as the etchant to remove Al from $Ti_3AlC_2$, and allow for the intercalation of $Li^+$ ions to intercalate into the layers of $Ti_3C_2T_x$, yielding Li-intercalated $Ti_3C_2T_x$. When alkylammonium (AA) cations were introduced into the system, $Li^+$ and AA cations are exchanged with each other, leading to AA-cations-intercalated $Ti_3C_2T_x$ multilayer MXenes (denoted AA-$Ti_3C_2$). The different AA cations, $[(CH_3)_3NC_nH_{2n+1}]^+$, used are denoted as C6, C8, C10, C12 and C16 according to the n values (6, 8, 10, 12 and 16, respectively). Successful synthesis of the multilayer MXenes is confirmed by the layered morphologies of $Ti_3C_2T_x$ and $Ti_3C_2$-C12, as shown in FIG. 6. The expanded interlayer spacing from pristine MXene to intercalated MXene, Δd, can be calculated based on X-ray diffraction data, as shown in FIGS. 1A and 7. As shown in FIG. 7, mainly 002 peaks are visible for all the AA-$Ti_3C_2$ after vacuum-filtration drying, indicating the materials still maintain a crystalline structure while all the MAX phase peaks vanished, indicating successful etching of Al from $Ti_3AlC_2$ and conversion of MAX phase into MXene. As shown in FIG. 1A, 002 peaks shift to lower angles with increasing the n, indicating a larger interlayer spacing. It was found that the longer the chain lengths of the intercalating AA cations, the larger the d-spacing of intercalated MXene. The expanded interlayer spacings relative to pristine $Ti_3C_2T_x$, Δd, were calculated to be about 3.28, 3.68, 4.78, 11.13, and 14.28 Å for $Ti_3C_2$-C6, $Ti_3C_2$-C8, $Ti_3C_2$-C10, $Ti_3C_2$-C12, and $Ti_3C_2$-C16, respectively. FIG. 1B shows a typical high-angle annular dark-field (HAADF) scanning transmission electron microscopy (STEM) image of $C_{12}$ intercalated $Ti_3C_2T_x$ MXene that exhibits layered structures and much larger d-spacings of 1.8 nm (FIG. 8A). This agrees well with the XRD results after vacuum annealing, as shown in FIG. 8B (since TEM images are recorded under high vacuum, it is reasonable to compare to the vacuum annealed sample). Thermogravimetric analysis (TGA) was used to quantify the content of AA in MXene (FIG. 9 and analysis in Table S1), and the inventors found that regardless of the AA cation chain length, about 0.1 cations were intercalated per $Ti_3C_2OF$ unit cell. It is worth noting that one MXene unit cell has two galleries (interlayers) which means that one AA cation per interlayer space every twenty units is sufficient to induce significant expansion in the d-spacing without crowding the volume between the layers.

Figure 1C:
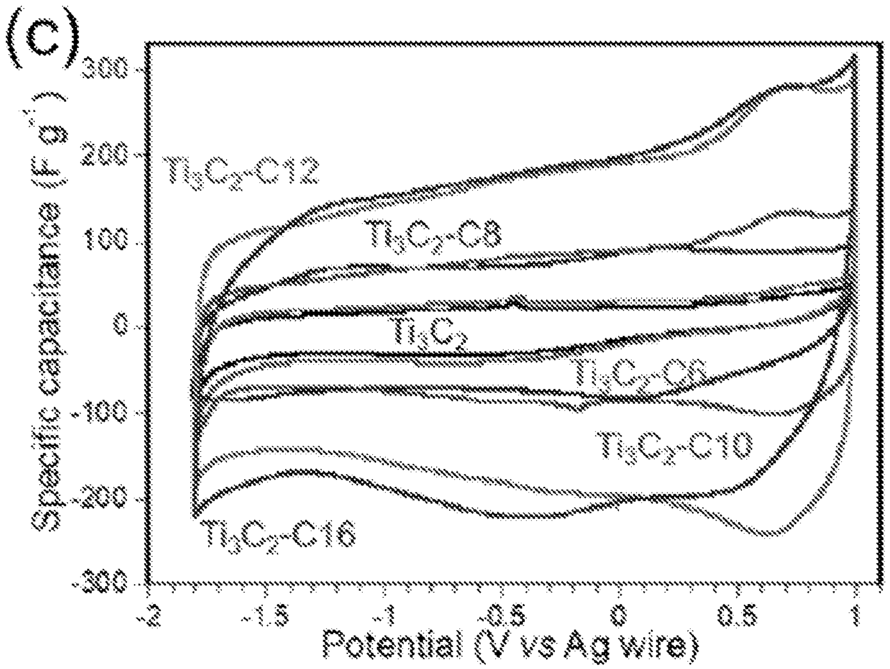

To investigate the d-spacing effect on the electrochemical performance, cyclic voltammetry (CV) was conducted using pristine $Ti_3C_2$ and AA-$Ti_3C_2$ free-standing electrodes as working electrodes in a three-electrode system with 1 M EMITIFSI in ACN as the electrolyte, as shown in FIG. 10. CV tests were performed in a potential window of −1.8 to 1.0 V vs. Ag wire, which is significantly broader than the operating windows of aqueous electrolytes, such as sulfuric acid. All the CV curves show shapes slightly deviated from the conventional rectangular shape of electric double layer capacitive behavior, with broad, electrochemically reversible redox peaks. For comparison, CV curves of pristine $Ti_3C_2T_x$ and AA-$Ti_3C_2$ electrodes at a scan rate of 1 mV $s^{-1}$ are also shown in FIG. 1C. It is noted that $Ti_3C_2$-C12 and $Ti_3C_2$-C16 have comparable CV areas, but much larger CV areas than those of the pristine $Ti_3C_2T_x$, $Ti_3C_2$-C6, $Ti_3C_2$-C8 and $Ti_3C_2$-C10, reflecting that $Ti_3C_2$-C12 and $Ti_3C_2$-C16 exhibit much higher specific capacitances than other samples studied in the disclosure. The specific capacitances were calculated from the anodic scan and presented in FIG. 1D. The capacitance of pristine $Ti_3C_2T_x$ was found to be 23 F $g^{-1}$ which is comparable to what was previously reported for pristine MXene in EMIMTFSI/CAN. Despite having Δd of about 3.28 Å, $Ti_3C_2$-C6 did not exhibit any meaningful increase in the capacitance compared to pristine $Ti_3C_2T_x$. This suggests that an increase of 3.28 Å was not sufficient to allow more $EMIM^+$ to intercalate between the layers. However, it is believed that such an increase would be sufficient to allow an increase in a smaller RTIL cation to intercalate into the MXene structure. Moving from $C_6$ to $C_8$ and a corresponding Δd of about 3.68 Å, there is almost a doubling of capacitance. Increasing the d-spacing further with C10 (Δd about 4.78 Å) also resulted in an increase in the capacitance. When Δd reached 11.13 Å in $Ti_3C_2$-C12, the capacitance was 185 F $g^{-1}$ at 1 mV $s^{-1}$. This value is 8 times higher than the capacitance observed in pristine $Ti_3C_2T_x$.

As used herein, the terms "pristine $Ti_3C_2T_x$" and "pristine $Ti_3C_2$" refer to $Ti_3C_2T_x$ layers that do not include an intercalant, for example, as prepared either after annealing without moisture or before annealing with moisture, and are used interchangeably in the disclosure.

Figure 1D:
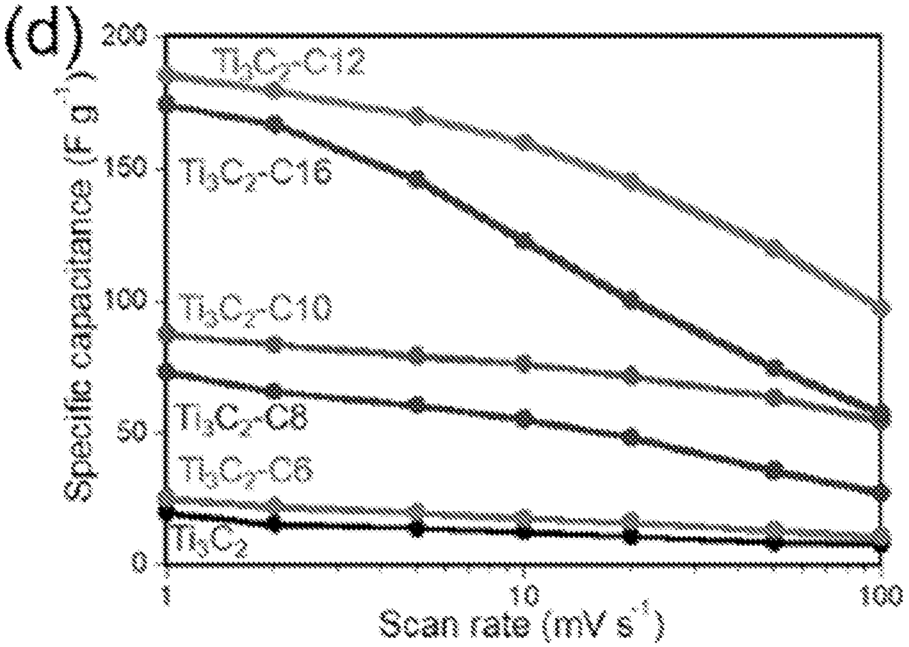
Figure 1E:
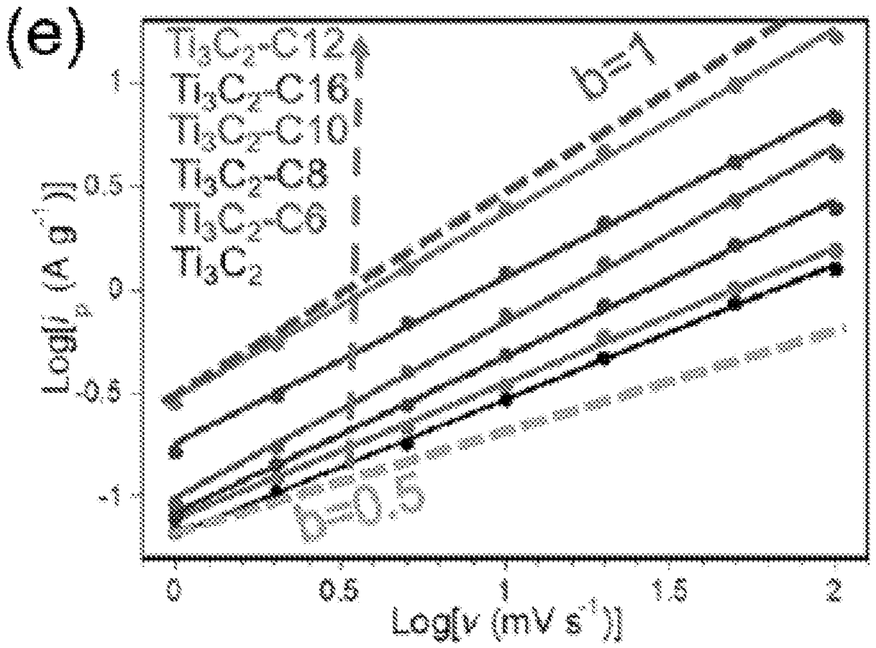

Surprisingly, a further increase in the d-spacing achieved by intercalating $C_{16}$ resulted in a lower capacitance than that in $Ti_3C_2$-C12. $Ti_3C_2$-C12 showed the highest specific capacitance of all the other tested samples. Even at a high scan rate of 100 mV $s^{-1}$, $Ti_3C_2$-C12 exhibits a larger specific capacitance of 98 F $g^{-1}$ than other samples. While not wishing to be bound by theory, it is believed that the increase in capacitance with increasing d-spacing from pristine $Ti_3C_2T_x$ to $Ti_3C_2$-C12 can be explained by the more open pathways available for the intercalation of large $EMIM^+$ (0.7 nm) that enable access to more active sites of MXenes between the layers rather than the outer area of the multilayer particles. Even though $Ti_3C_2$-C16 shows a larger interlayer spacing than $Ti_3C_2$-C12, the capacitance is slightly lower for the former which suggests that a saturation of ions that can be stored was achieved for $Ti_3C_2$-C12 and the larger chain length of $C_{16}$ may negatively affect the possible sites for $EMIM^+$. Further, the longer chain length causes a charge-transfer resistance (for more details see EIS section in Example 12) and longer ion diffusion pathway, and this can be seen clearly by the faster drop in capacitance with increasing scan rate for $Ti_3C_2$-C16 compared to $Ti_3C_2$-C12 (FIG. 1D). In addition, the nature of the pre-intercalated AA might have an effect on the electrochemical performance of $EMIM^+$ between the layers of MXenes, as discussed in the molecular dynamics calculations section.

Figure 1F:
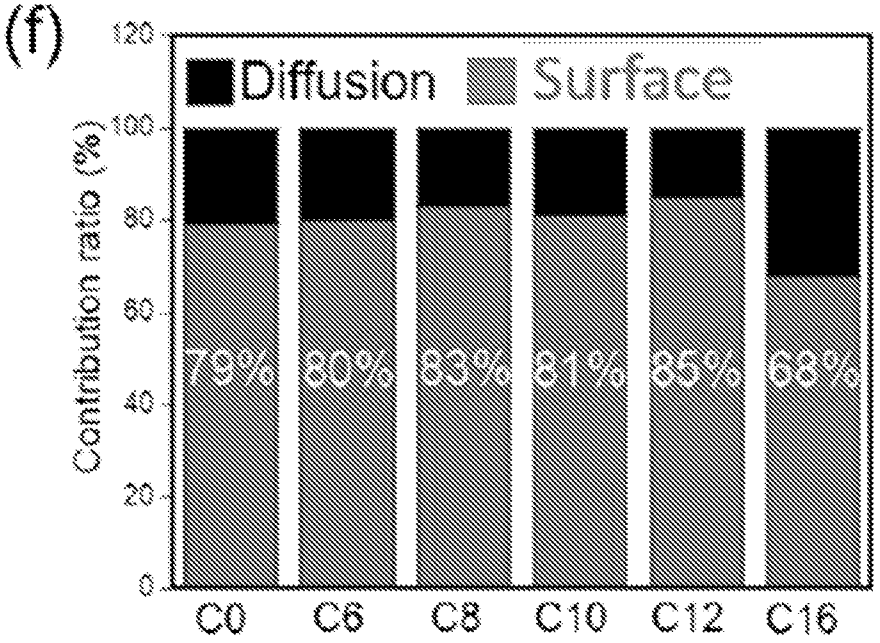

Generally, the total amount of charge stored in an electrode is contributed by a combination of surface-controlled and diffusion-controlled processes. As displayed in FIG. 1E, the b values (see more details in Example 11) were calculated to be about 0.64, 0.66, 0.73, 0.85, 0.93, and 0.81 for $Ti_3C_2$, $Ti_3C_2$-C6, $Ti_3C_2$-C8, $Ti_3C_2$-C10, $Ti_3C_2$-C12 and $Ti_3C_2$-C16, respectively. The b value is near 1 for $Ti_3C_2$-C12 from 1 to 100 mV $s^{-1}$, demonstrating the electrochemical mechanism is a surface-controlled process. Taken together, the total charge stored in an electrode can be classified into two components: the diffusion-controlled contribution and surface contribution, which includes both the electrochemical double-layer capacitance (EDLC) and pseudocapacitance (more details are given under the capacitive and diffusive section in the Example 11). As shown in FIG. 1F, using the convention introduced by Dunn et al, the surface-controlled contribution for $Ti_3C_2$-C12 is almost 85% at a scan rate of 20 mV $s^{-1}$, demonstrating surface-controlled behavior is the dominant electrochemical process. Moreover, it is noted that the surface-controlled contribution for $Ti_3C_2$-C12 (FIG. 17) increases with increasing scan rate, from about 67% to about 85%, revealing that the surface-controlled contribution covers a significant proportion of the total capacitance at high scan rate. Based on this kinetics response and the lack of potential dependence of the current, while not wishing to be bound by theory, the inventors believe that charge is stored primarily by a surface-controlled mechanism with some diffusion-controlled contribution. However, since the surface-controlled capacitance (see FIGS. 12-18) increases with increasing the ion accessible surface area, there should be an optimum interlayer spacing to unlock the interlayer spacing of MXene to host the $EMIM^+$ and achieve high specific capacitance in addition to provide high specific power. In the disclosure, the $Ti_3C_2$-C12 electrode with the optimum expanded interlayer spacing, Δd=11.13 Å, exhibits the largest specific capacitance of 185 F $g^{-1}$ in 1 M EMIMFTSI/ACN electrolyte.

Figure 2A:
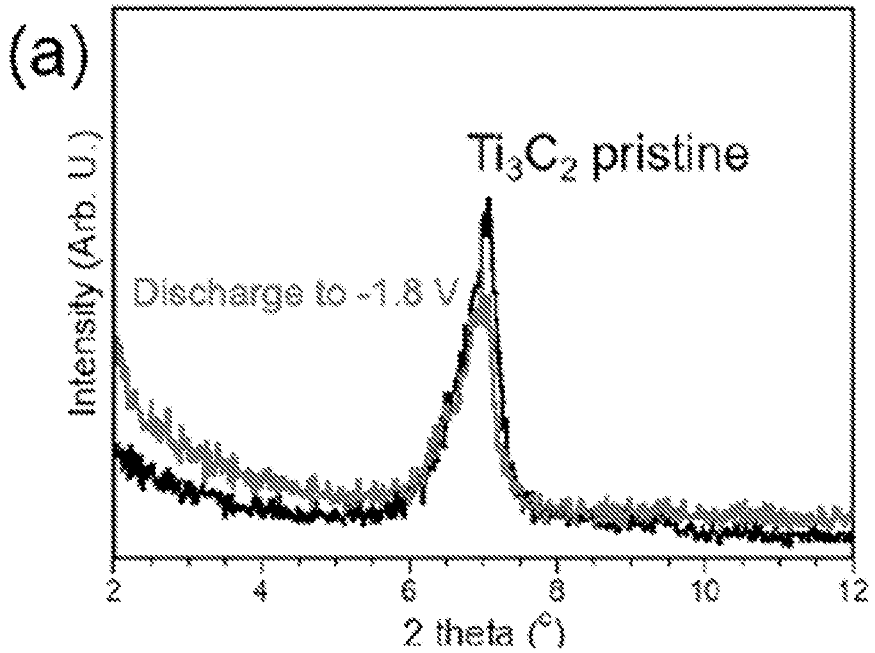

To further understand the charge storage mechanism, ex situ XRD measurements were performed on pristine $Ti_3C_2T_x$ and $Ti_3C_2$-C12 electrodes before and after discharging. As shown in FIG. 2A, there is no obvious peak shift for the pristine $Ti_3C_2T_x$ after discharging to −1.8 V, revealing that $EMIM^+$ does not intercalate in-between the layers of the pristine $Ti_3C_2T_x$. A clear 002 peak shift towards lower angles (2θ of 3.94°) can be clearly seen for the $Ti_3C_2$-C12 electrode (FIG. 2B) when it was discharged to −1.8 V vs. Ag. The shift in 2θ corresponds to 2.2 Å of further increase in the d-spacing reaching a total d-spacing of 24.27 Å. When the same electrode was recharged back to 1.0 V vs. Ag, the 002 peak almost returned to its original position, indicating a reversible intercalation/de-intercalation process. These ex-situ XRD results confirm that the significantly higher capacitance of $Ti_3C_2$-C12 compared to pristine $Ti_3C_2T_x$ arises from the reversible $EMIM^+$ intercalation in the former. The small change in the d-spacing, during cycling of $Ti_3C_2$-C12 does not correspond to the size of $EMIM^+$ which is not surprising since the layers have been already spaced with the AA C-12 pillars.

The dynamics of cations confined in $Ti_3C_2T_x$ and $Ti_3C_2$-C12 MXenes upon electrochemical cycling was investigated using elastic and quasi-elastic neutron scattering (QENS). The elastic scattering intensities (FIG. 19A) obtained from the samples after testing do not show any sharp melting-freezing transition, suggesting that $EMIM^+$ ions reside in a very tight confinement, much tighter than a typical inter-stack space in MXene of ca. 10 nm as reported by Osti et al., The presence of bulk-like liquids would show a sharp transition in the elastically-scattered neutron intensity measured as a function of temperature. In earlier attempts to intercalate $EMIM^+$ ions between $Ti_3C_2T_x$ layers, it was found that the cations were not inside the layers. They were residing elsewhere, e.g., between the MXene stacks, where the confinement is not as tight as between the layers, and exhibiting a diffusivity half of the bulk value. A similar observation regarding ca. 50% bulk diffusivity was also made for water molecules confined in the inter-stack spaces in pristine and metal ion intercalated MXenes. However, in the present disclosure, the absence of steps on the fixed window scan (FIG. 19A) confirms that the cations are in a tight, intra-layer, confinement. Ex-situ XRD (FIG. 2A) of pristine $Ti_3C_2T_x$ does not show any increase in d-spacing during the cathodic scan. Therefore, the small capacitance from electrochemical measurements (23 F $g^{-1}$) means that $EMIM^+$ ions are stored somewhere in the sample, but not in the interlayer space: most likely, at the outer surface of MXene and in narrow inter-stack spaces. In $Ti_3C_2$-C12, there is an increase in d-spacing after the addition of the C12-ammonium cation. Therefore, in addition to the inter-stack space, most $EMIM^+$ ions enter in between the layers, contributing heavily to the elastic scattering intensity. This increase is revealed in the mass-normalized elastic intensities presented in FIG. 19A. Furthermore, the mean-squared displacement (MSD) presented in FIGS. 19B and 19C clearly demonstrate faster dynamics in both MXene samples after discharging to −1.8 V since more ions present derived by electrochemical potential.

Figure 2B:
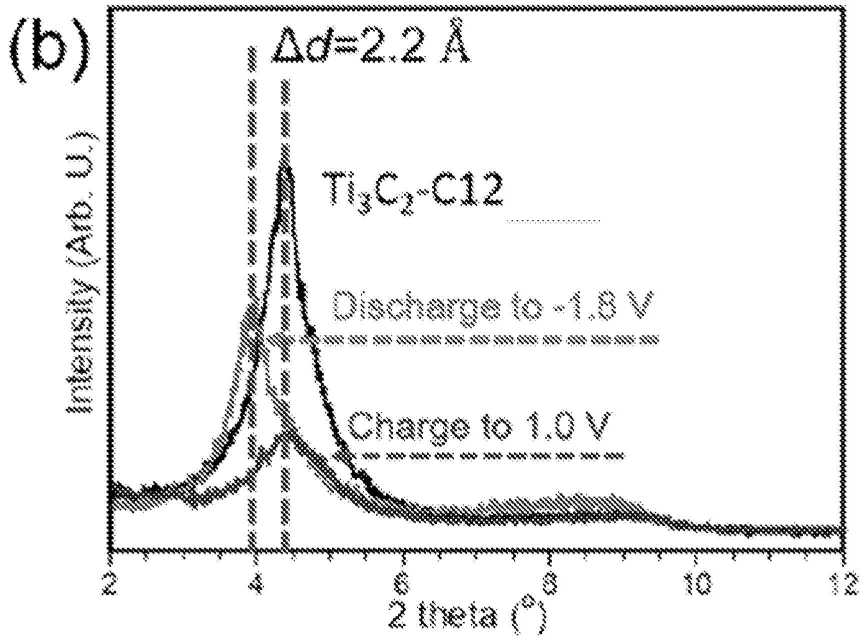
Figure 2C:
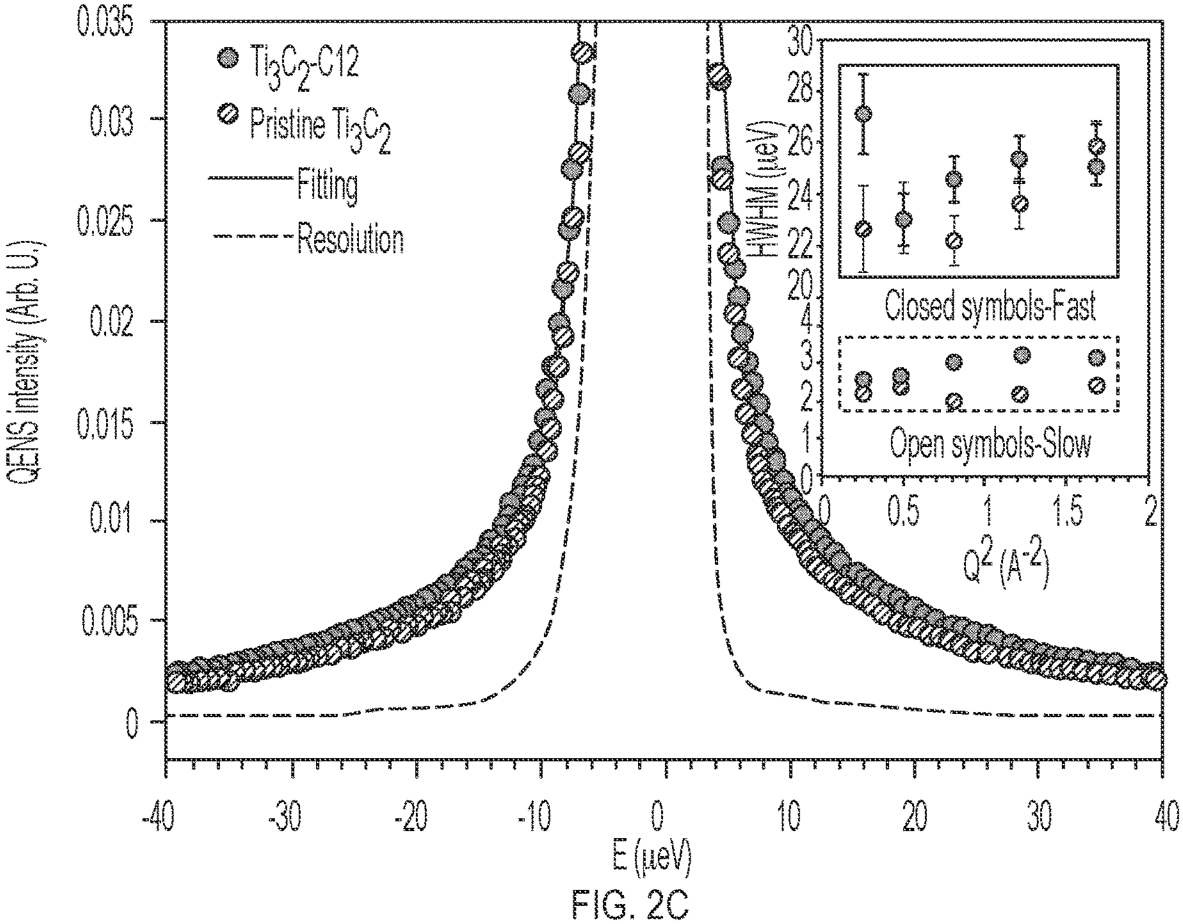

Representative QENS spectra collected from both $Ti_3C_2T_x$ and $Ti_3C_2$-C12 MXenes after electrochemical measurements are presented in FIG. 2C. They show a significant quasi elastic broadening compared to the resolution from both the samples, however, the broadening is marginally higher for $Ti_3C_2$-C12 MXene. Half width at half maximums (HWHMs) obtained from a sum of two Lorentzian fits (FIG. 2C, inset) is Q-independent, especially for the slow component, suggesting a completely localized motion of the cation. As one can see from the larger HWHM values, the dynamics of the cation in $Ti_3C_2$-C12 is faster with a relaxation time of about 227 ps compared to about 300 ps found for the cation in $Ti_3C_2T_x$ MXene. Since the dynamics of confined fluids in MXenes are found to be morphology dependent, especially on the d-spacing, faster localized mobility of ions observed in $Ti_3C_2$-C12 might be associated with the larger on average, but wider, distribution of the d-spacing, as illustrated from a broad peak observed in XRD (FIG. 2A). Importantly, the cations in either of the two samples do not show any evidence of the long-range translational diffusion, suggesting that their diffusivities are too slow for the resolution limit of the spectrometer (ca. $10^{-11}$ $m^2/s$). These results are in agreement with the diffusion coefficients estimated from electrochemical impedance spectroscopy (EIS) discussed below. However, the faster localized mobility of ions observed in $Ti_3C_2$-C12 compared to pristine $Ti_3C_2$ is in contrast with the trend for the translational mobility as reflected by ion diffusivity inferred from the EIS results.

Figure 2D:
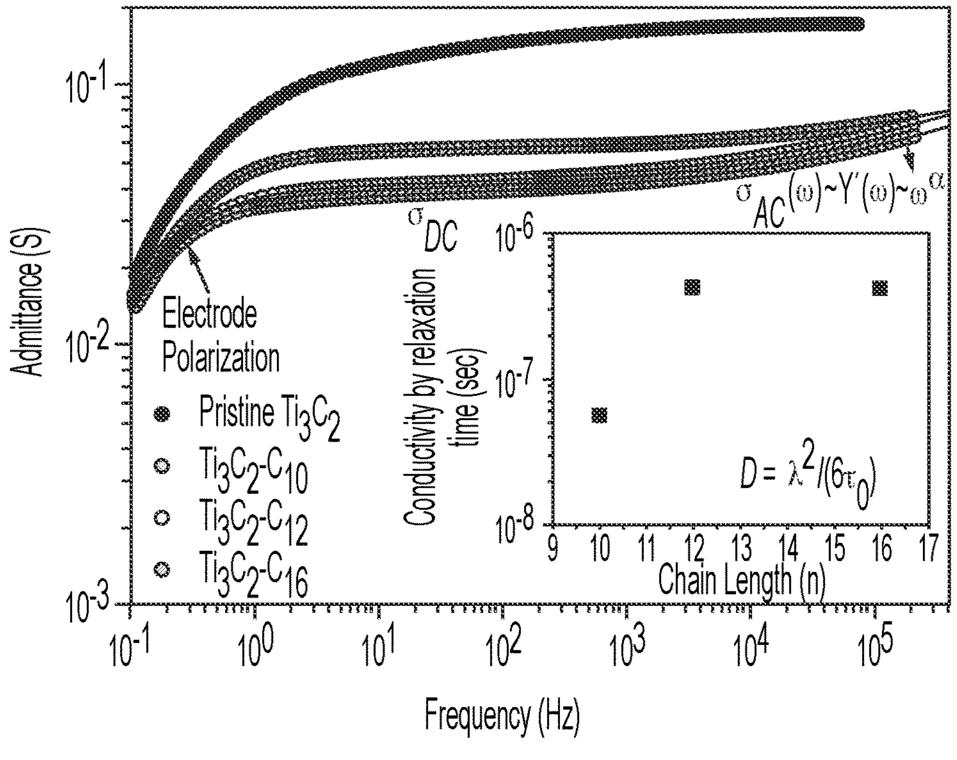

To further investigate the kinetics of AA-$Ti_3C_2$ electrodes, EIS was employed, and Nyquist plots are shown in FIG. 20. A clear AC-DC transition, with a characteristic relaxation time in the range of $10^{-7}$ to $10^{-6}$ s (for details see EIS section in Example 12), was observed in the conductivity spectra for samples with large d-spacings (FIG. 2D). This gives estimates of the diffusion coefficient for these sample in the range of $10^{-15}$ to $10^{-13}$ $m^2/s$. Interestingly, the relaxation dynamic slows down with increasing d-spacing (FIG. 2D inset) that might be ascribed to better intercalation of ions. For the samples with small d-spacing, the EIS spectra show faster diffusion, indicating no or insufficient ion intercalation between the layers, and dominance of surface ion dynamics. These findings are not surprising considering that at small d-spacing like in case of pristine $Ti_3C_2T_x$, $EMIM^+$ does not intercalate between the layers (FIG. 2A) and only is stored at the outer surface of MXene. Therefore, the diffusion is much faster compared to MXene with large d-spacing, like $Ti_3C_2$-C12, where $EMIM^+$ intercalates between the MXene layers resulting in higher capacitance but slower dynamics due to confinement. This also explains the weaker dependence of capacitance on scan rate for MXenes with smaller d-spacing compared to $Ti_3C_2$-$C_{12}$ and $Ti_3C_2$-C16 (FIG. 1D).

Figure 3A:
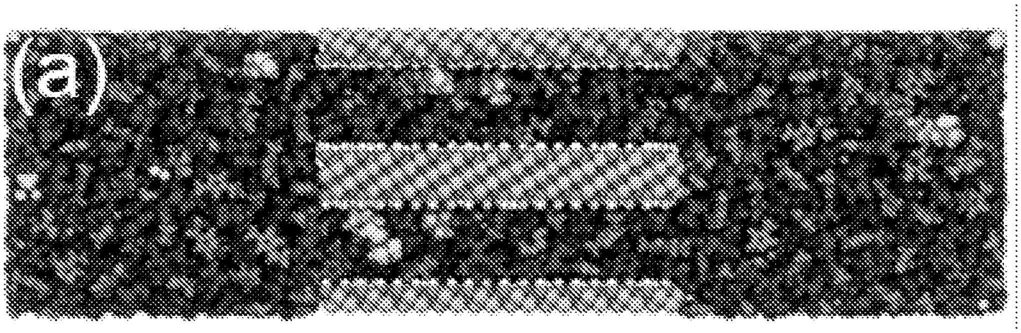
Figure 3B:
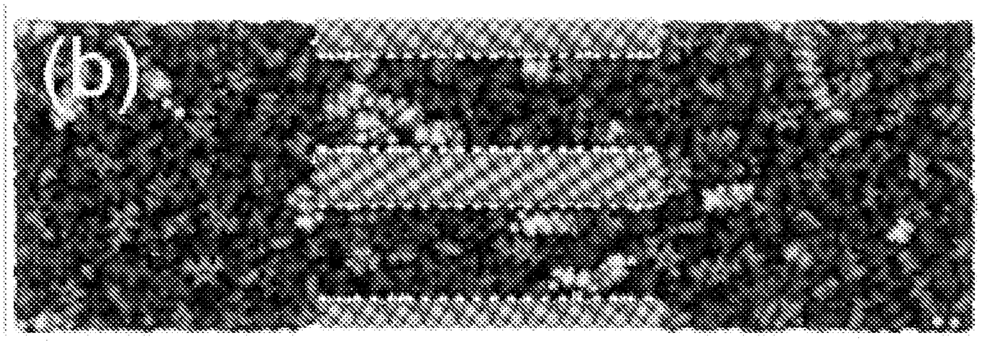
Figure 3C:
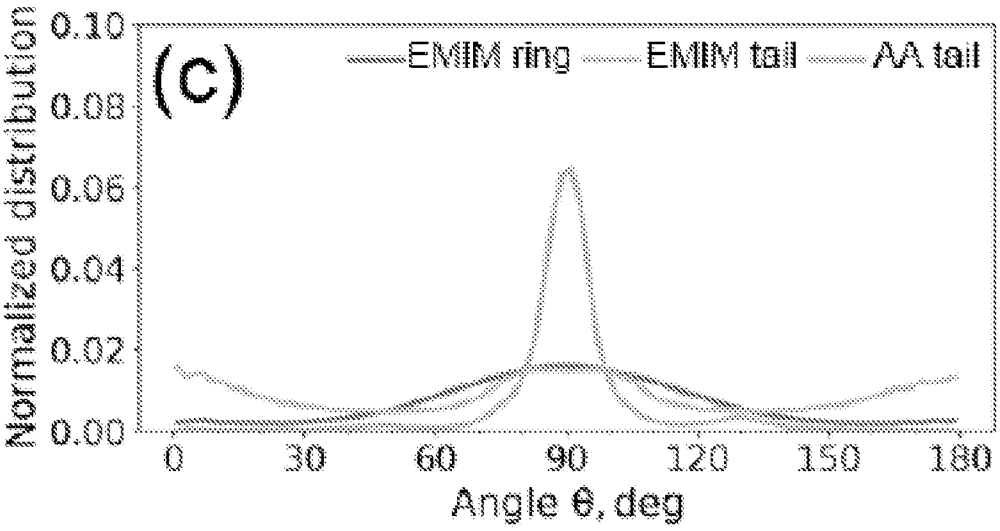
Figure 3D:
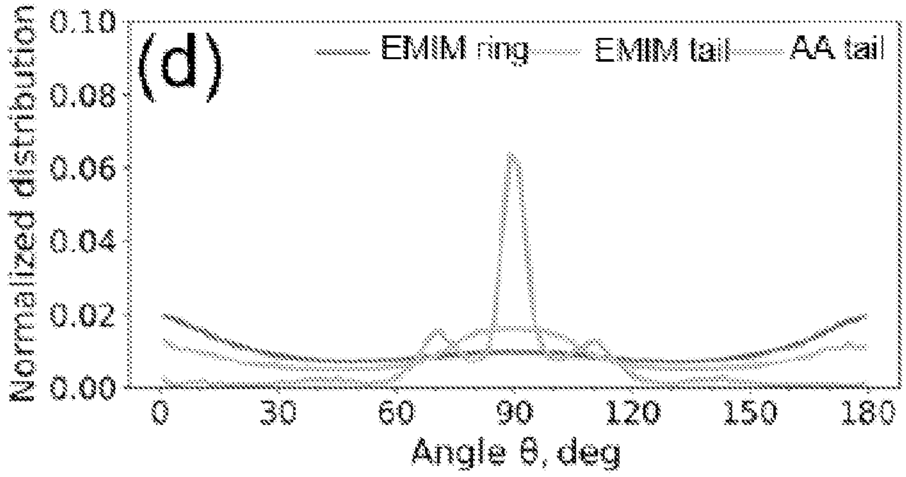

To further elucidate the structure of ions inside the pores, orientation distribution profiles of the ions were calculated through the use of Molecular Dynamics (MD) Analysis and number density profiles were calculated through the use of MDTraj. Snapshots of the $Ti_3C_2(OH)_2$-C12 and $Ti_3C_2(OH)_2$—C16 systems are shown in FIGS. 3A and 3B. Note that although the AA ions were initially placed within the interlayer spacing of the MXenes, several of the ions exited the interlayer spacing during equilibration. Orientation distribution profiles between the normal vector of the MXene walls and vectors drawn for the following groups of atoms are shown in FIGS. 3C and 3D: the ring on $EMIM^+$, the ethyl chain on $EMIM^+$, and the alkyl chain on the AA cation. In the interlayer of $Ti_3C_2(OH)_2$—C12, the rings of $EMIM^+$ display a wide distribution of angles with the surface normal from 30 degrees to 150 degrees. The broad distribution of angles suggests a non-specific orientation of the rings within the interlayer. The alkyl tails of $EMIM^+$ form a distribution of angles with the surface normal around 0, 90, and 180 degrees, suggesting the tail vectors are both parallel and perpendicular with the walls. The C12 vectors primarily display angles at 90 degrees, with much smaller distributions of angles around 45 and 135 degrees. These angles indicate the C12 ions are mostly parallel with the wall, while sometimes also existing in kinked conformations relative to the walls. The orientation of ions within $Ti_3C_2(OH)_2$—C16 show clear differences from $Ti_3C_2(OH)_2$—C12. While the $EMIM^+$ rings show a broad distribution of angles from 30 to 150 degrees, a distribution of angles also exists at 0 and 180 degrees corresponding to the rings laying flat relative to the surface. The alkyl tails of $EMIM^+$ show a similar distribution of angles around 0 and 180 degrees, corresponding to the alkyl chains laying perpendicular to the surface. The C16 ions are arranged in three main orientations at 70, 90, and 110 degrees. The broader orientation profiles within $Ti_3C_2(OH)_2$—C16 are likely due to the wider interlayer spacing.

Figure 3E:
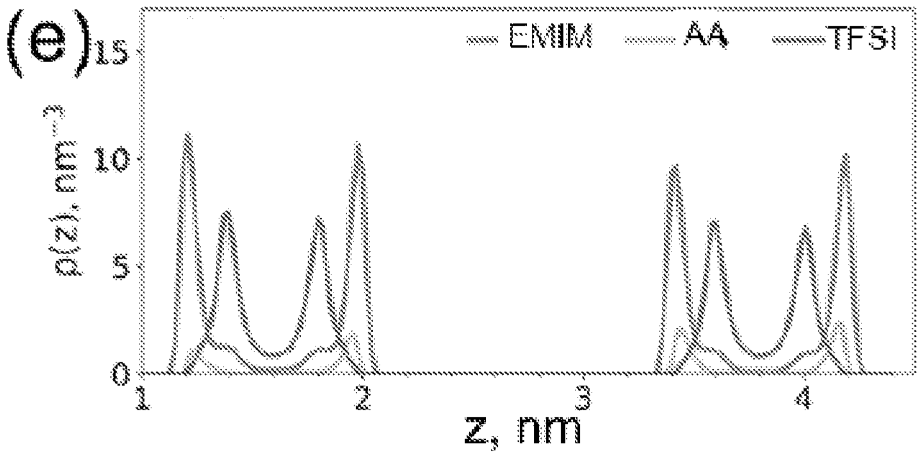
Figure 3F:
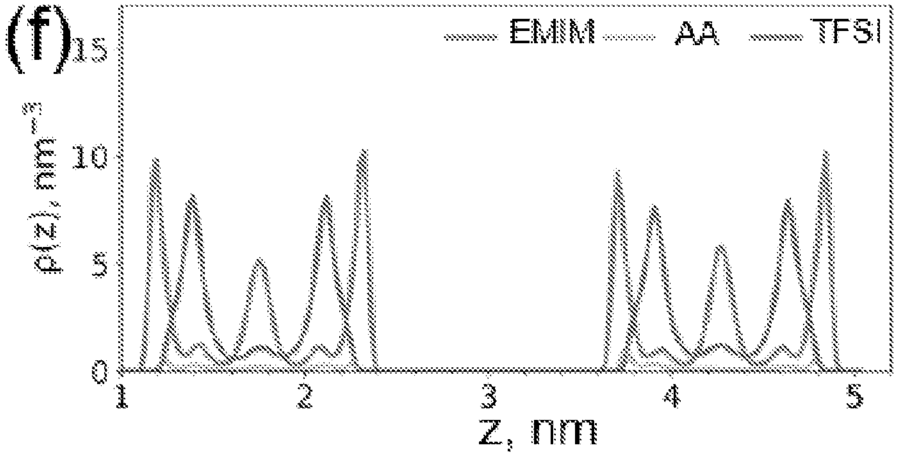
Figure 3G:
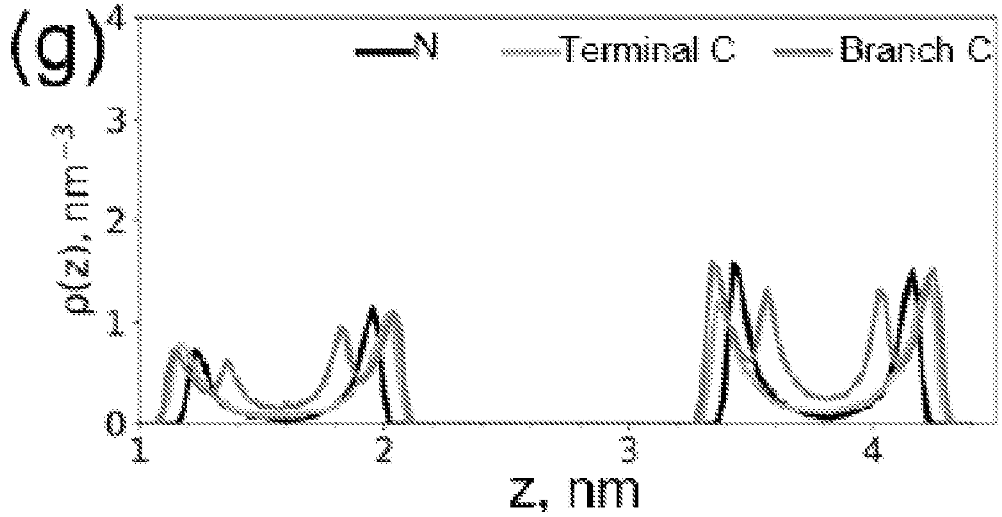
Figure 3H:
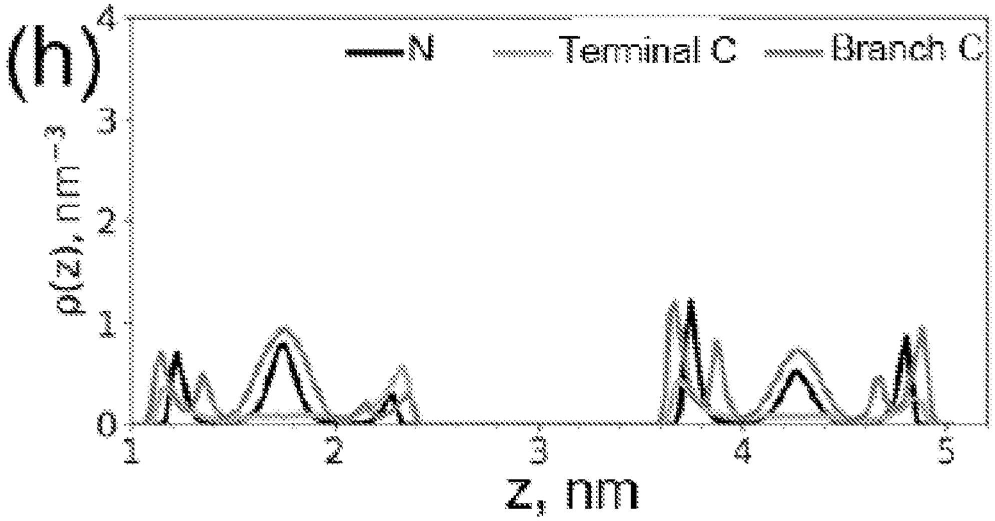

Number density profiles of the ions inside the pores are shown in FIGS. 3E and 3F. In $Ti_3C_2(OH)_2$—C12, $EMIM^+$ and C12 ions are almost exclusively positioned near the walls, while $TFSI^-$ is positioned in two layers in the middle of pore. Due to the wider interlayer spacing, the structure of ions inside $Ti_3C_2(OH)_2$—C16 differs from that of $Ti_3C_2(OH)_2$—C12. While $EMIM^+$ is located near the walls, three distinct layers of cations also exist in the middle of the pore as well as two distinct layers of $TFSI^-$, indicating increased ordering of these ions in this system. To further investigate the structure of the AA ions inside the pores, the number density profiles of the nitrogen, terminal carbon, and branch carbon atoms of the AA ions are shown in FIGS. 3G and 3H. In $Ti_3C_2(OH)_2$—C12, two distinct layers of branch carbons exist near each pore wall. In the middle of these two layers of branch carbons are peaks corresponding to nitrogen and terminal carbon atoms. This result suggests the C12 ions are mostly arranged in two layers parallel with the wall, with the d-spacing large enough to allow for the alkyl chains to move somewhat freely as indicated by the broader peaks of the terminal carbon atoms. While a similar structure exists near the walls in $Ti_3C_2(OH)_2$—C16, the C16 atoms also exist in the middle of the pores. These distributions in the middle of the pore are broader than those near the wall, suggesting more disorder of the C16 ions in this region due to a wider d-spacing and longer alkyl chain length. Because the C16 ions have a higher affinity to stretch across the length of the pore, this may increase the length of the diffusion pathway for EMIM ions resulting in slower diffusivity.

In $Ti_3C_2(OH)_2$—C12, the densities of EMIM and TFSI are 323.2 kg/m$^3$ and 731.9 kg/m$^3$, while the densities of EMIM and TFSI in $Ti_3C_2(OH)_2$—C16 are 360.3 kg/m$^3$ and 840.5 kg/m$^3$. This corresponds to 51.1 EMIM ions and 45.9 TFSI ions in each $Ti_3C_2(OH)_2$—C12 pore and 70.7 EMIM ions and 65.4 TFSI ions in each $Ti_3C_2(OH)_2$—C16 pore over the course of the sampling simulation. The higher densities in $Ti_3C_2(OH)_2$—C16 may result in slower dynamics in comparison to the $Ti_3C_2(OH)_2$—C12 system. However, the inventors cannot make any conclusions of the capacitive performance between the two systems. Nonetheless, there are clear, striking structural differences whose relationship to capacitance and dynamics should be investigated in a subsequent study. Here, based on the structural results, the inventors believe that the density profiles of EMIM$^+$ in $Ti_3C_2(OH)_2$—C12 (FIG. 3E) and $Ti_3C_2(OH)_2$—C16 (FIG. 3F) suggest that the EMIM$^+$ is more structured/ordered in the larger pore, due to the presence of oscillations in the density of EMIM$^+$ in the larger pore. By contrast, in the smaller pore, the EMIM$^+$ are present only at the wall, and not in the middle of the pore. This difference structure provides another possible explanation for the unexpectedly lower diffusivity of EMIM in the larger pore.

To further investigate the electrochemical performance of $Ti_3C_2$-C12 free-standing electrode, neat room temperature ionic liquid EMIMTFSI was employed as electrolyte in a three-electrode cells (activated carbon and Ag wire as counter and reference electrodes, respectively). CV tests were performed in a window of −2 to 1.2 V vs. Ag wire at a scan rate of 1 mV s$^{-1}$, as shown in FIG. 4A. The larger voltage window for neat EMIMTFSI is not surprising considering the higher stability of RTIL than solvents. It is noted that $Ti_3C_2$-C12 shows larger CV area (larger capacitance) in neat EMIMTFSI electrolyte than that in 1 M EMIMTFSI/ACN electrolyte, indicating $Ti_3C_2$-C12 in neat EMIMTFSI electrolyte exhibits larger specific capacitance than that in 1 M EMIMTFSI/ACN electrolyte. Also, the CV shows several reversible broad redox peaks, indicating a pseudocapacitive contribution to the capacitance. As shown in FIG. 4B, $Ti_3C_2$-C12 in neat EMIMTFSI electrolyte exhibited larger specific capacitances than that in 1 M EMIMTFSI/ACN electrolyte between 1 to 20 mV s$^{-1}$ (CVs are shown in FIG. 21). At faster scan rates, $Ti_3C_2$-C12 in 1 M EMIMTFSI/ACN showed larger specific capacitances than in neat EMIMTFSI. This, in part, can be related to the higher viscosity of neat EMIMTFSI than that of 1 M EMIMTFSI in ACN, causing slower ion transport. With lower scan rates, there is more time for ion transport throughout the volume of the electrode. The largest specific capacitance of 257 F g$^{-1}$ (1428 mF cm$^{-2}$ and 492 F cm$^{-3}$) can be obtained at 1 mV s$^{-1}$, which is much larger than those of previous reports of MXenes and carbon-based materials using ionic liquid electrolytes. To the best of the inventors' knowledge, the specific areal capacitance of 1,428 mF cm$^{-2}$ is the largest reported value for MXene in RTIL, showing promising application in flexible electronics and wearable devices.

Galvanostatic charge-discharge tests (GCD) at different current densities were performed to further investigate the electrochemical performance of the $Ti_3C_2$-C12 electrode. A small iR drop can be found during the discharge process in FIGS. 22A-22B, reflecting good conductivity of $Ti_3C_2$-C12 electrode. As displayed in FIGS. 22A-22B, the specific capacity of 201 mAh g$^{-1}$ (187 F g$^{-1}$) was achieved at a current density of 0.2 A g$^{-1}$, and at 10 A g$^{-1}$ a specific capacity of 116 mAh g$^{-1}$ (100 F g$^{-1}$) was maintained which is an outstanding value at such high specific currents (graphite anodes in LIBs have negligible capacity at such specific currents as reported by Chao et al.). The long-term cycling performance is an important parameter for supercapacitors, which was tested at a current density of 1.0 and 5.0 A g$^{-1}$, as exhibited in FIG. 4C. The $Ti_3C_2$-C12 electrode presents good cycling stabilities with 97% and 95% capacitance retention at 1.0 and 5.0 A g$^{-1}$, respectively, after 10,000 cycles.

More importantly, it is worth noting that in the disclosure, the mass loading of the single electrode is about 5.0-5.5 mg cm$^{-2}$, which is almost two to three-fold heavier than most of the reported electrodes. The unique layered structure and excellent conductivity of MXenes enable the delivery of high specific capacitance and specific energy. As shown in FIG. 23, a maximum specific energy of 370 Wh kg$^{-1}$ (specific power of 330 W kg$^{-1}$) was achieved in neat EMIMTFSI electrolyte, and the maximum specific power of 46 kW kg$^{-1}$ (specific energy of 18 Wh kg$^{-1}$) is obtained in 1 M EMIMTFSI/ACN electrolytes. Compared to other reported $Ti_3C_2T_x$ MXenes and holey graphene foam, the $Ti_3C_2$-C12 electrode shows much higher specific energy, which demonstrates that engineering the interlayer spacing is a promising approach to improve the specific capacitance and specific energy. The drop in specific energy for neat EMIMTFSI at higher specific power can be related to the high viscosity of RTIL leading to slower dynamics. The inventors demonstrate that this decay can be tuned by changing the d-spacing (FIG. 1D) that affects ion dynamics between the layers (FIG. 2B).

To further investigate the electrochemical performance of $Ti_3C_2$-C12 free-standing electrode, blends of protic room temperature ionic liquids of 1-butylimidazole (BuIM) and bis(trifluoromethanesulfonyl)imide ($HNTf_2$) solutions in different molar ratios were employed as electrolytes in a three-electrode cells (activated carbon and Ag wire as counter and reference electrodes, respectively). The blend of protic ionic liquids 1-butylimidazole (BuIM) and bis(trifluoromethanesulfonyl)imide ($HNTf_2$) solution in a molar ratio of 0.8:0.2 achieved the best specific capacitance performance for this system. CV tests were performed in a window of −0.8 to 0.8 V vs. Ag wire at scan rates of 1 mV s$^{-1}$, 2 mV s$^{-1}$, 5 mV s$^{-1}$, 10 mV s$^{-1}$, 20 mV s$^{-1}$, 50 mV s$^{-1}$, and 100 mV s$^{-1}$, respectively, as shown in FIG. 25A. The voltage window for neat protic room temperature ionic liquid (RTIL) of 1-butylimidazole (BuIM) and bis(trifluoromethanesulfonyl)imide ($HNTf_2$) solutions is large because of the higher stability of RTIL than solvents. It is noted that $Ti_3C_2$-C12 shows larger CV area (larger capacitance) in the neat blend of BuIM and $HNTf_2$ solution electrolyte at the scan rate of 1 mV s$^{-1}$ than those at higher scan rates of 2-100 mV s$^{-1}$, indicating $Ti_3C_2$-C12 in the blend of BuIM and HNTf2 solution electrolyte exhibits larger specific capacitance of about 155 F/g than those at higher scan rates, as shown in FIG. 25B. With lower scan rates, there is more time for ion transport throughout the volume of the electrode, and thus the largest specific capacitance of about 155 F g$^{-1}$ can be obtained at 1 mV s$^{-1}$.

In the disclosure, MXenes with various interlayer spacings have been produced by intercalating different AA cations to study the interlayer spacing and the effect on the electrochemical performance. The large d-spacing achieved by pre-intercalation of AA cations allows, for the first time, intercalation of RTIL cations between the layers of MXene. Dodecyl-trimethylammonium intercalated $Ti_3C_2T_x$, $Ti_3C_2$-C12, with a d-spacing of 2.2 nm, showed the best performance among the pre-intercalated MXenes studied. This system delivered a large specific capacitance of 257 F $g^{-1}$ (1428 mF $cm^{-2}$ and 492 F $cm^{-3}$) in neat EMIMTFSI electrolyte which is much higher than any other report on MXene in RTIL. Moreover, a maximum specific energy of 370 Wh $kg^{-1}$ is achieved in neat EMIMTFSI, and the maximum specific power of 46 kW $kg^{-1}$ is obtained in 1 M EMIMTFSI/ACN electrolytes. It is believed that due to the structural similarity of the exemplified $Ti_3C_2T_x$ and other MXenes, other MXenes are expected to behave similarly with respect to including an intercalant, such as an AA intercalant. It is further expected that the capacity of other superconductors including an MXene as an electrode material can be tuned by selecting an intercalant and an RTIL, such that the intercalant modifies the d-spacing of the MXene to allow intercalation of the RTIL. Considering that this is the first report on intercalation of RTIL between the layers of MXene and one RTIL was studied in this example, there is no reason to believe that these outstanding values of energy and power densities are the highest that MXene can achieve. Without intending to be bound by theory, it is believed that further improvements can be achieved, e.g., by matching RTIL with MXene d-spacing and studying different electrically or ionically conductive pre-intercalant to achieve even higher capacitance at high cycling rates. The disclosure exemplifies the importance of engineering the d-spacing in 2D materials to unlock their potential for new applications.

EXAMPLES

Example 1

Synthesis of MAX Phase $Ti_3AlC_2$ $Ti_3AlC_2$ powder was produced using a modified method from a previous report by Simon et al., Titanium (Ti, 99.99%, −325 mesh, Alfa Aesar, USA), aluminum (Al, 99.5%, −325 mesh, Alfa Aesar, USA), and graphite (C, 99.9995%, −325 mesh, Alfa Aesar, USA) powders with a Ti:Al:C molar ratio of 3.00:1.20:1.88 (total weight of 50 g) were mixed in a high density polyethylene (HDPE) jar with yttria-stabilized zirconia balls for 3 h using a Turbula T2F mixer. 25 g of the mixed powder then was transferred into an alumina crucible and put in the center of a tube furnace, followed by heating at 10° C./min to 1600° C. then held at that temperature for 2 h under a continuous flow of argon, Ar. After that, the furnace was switched off and materials were allowed to cool down to room temperature under Ar flow. The as-prepared black brick was crushed into small particles using a jaw crusher then sieved through a 325-mesh sieve.

Example 2

Preparation of AA Cations-Intercalated $Ti_3C_2T_x$ Multilayer MXenes

The alkylammonium (AA) cations-intercalated $Ti_3C_2T_x$ multilayer MXenes, denoted AA-$Ti_3C_2$, were prepared through a wet chemistry etching and ion-exchange intercalation method as reported by Ghidiu er al. In this experiment, 1 g of as-prepared $Ti_3AlC_2$ powder (about 325 mesh) was slowly immersed into a 50 mL mixed solution of 10 wt % aqueous hydrofluoric acid (HF, 48-51%, Acros Organics, USA) and 1 g lithium chloride (LiCl, 99%, Alfa Aesar, USA) in an HDPE reaction vessel that was initially kept in an ice bath. Then, the reaction vessel was transferred to an oil bath and kept at 25° C. for the duration of the treatment (24 h). After that, the mixture was centrifuged at 3500 rpm to separate the solution from the powders, then the settled powders were washed twice using 6 M aqueous hydrochloric acid (HCl, 37%, Fisher Chemicals, USA) and centrifuged at 3500 rpm. This was followed by washing twice using degassed deionized (DI) water. The remaining wet sediments were then immersed into 0.5 M alkylammonium (AA) salts aqueous solutions. The employed alkylammonium salts, $[(CH_3)_3NC_nH_{2n+1}]^+$, were hexyl-, octyl-, decyl-, dodecyl- and hexadecyl-trimethylammonium, denoted as C6, C8, C10, C12 and C16, respectively. The mixed solutions were allowed to rest at room temperature (RT) for 4 days with manual shaking daily. After washing using degassed DI water for four times, the materials were dried using vacuum-assisted filtration.

Example 3

Materials Characterization.

X-ray diffraction (XRD) patterns were obtained using a Rigaku Smart Lab powder diffractometer configured with a Cu $K_\alpha$ radiation (λ=0.154 nm) with a scan rate of 1.0° $min^{-1}$ at 40 kV voltage and 40 mA current. The morphology and the composition of the as-prepared AA-$Ti_3C_2$ samples in Example 2 were characterized using a Hitachi S 4800 and 3400 scanning electron microscope (SEM), respectively. TEM samples were prepared by drop-casting a suspension of the $Ti_3C_2$-C12 in deionized (DI) water (sonicated for 2 minutes in a water bath) is drop-cast on a copper supported lacey carbon TEM grid and air drying. High-angle annual dark-field (HAADF) scanning transmission electron microscopy (STEM) images were acquired using aberration-corrected Nion Ultra STEM operating at 100 kV. A convergence angle of 31 mrad was used, with HAADF detector inner and outer collection angles of 86 mrad and 200 mrad, respectively. The weights of intercalated alkylammonium cations were determined by thermogravimetric analysis (TGA, SII EXSTAR6000 TG/DTA6200), using an alumina pan to load about 10 mg materials with a heating ramp of 10° C. $min^{-1}$ from 25° C. to 900° C. in air.

Example 4

Electrode Preparation.

The working and counter electrodes were prepared using as-prepared AA-$Ti_3C_2$ and commercial activated carbon (YP50, Kuraray, Japan), respectively, with 5 wt. % polytetrafluoroethylene (PTFE, 60 wt. % dispersion in water, Sigma Aldrich, USA) as binders and ethanol (200 proof, Fisher, USA) as solvent. The AA-$Ti_3C_2$/PTFE and carbon/PTFE composites were hand-rolled several times using a glass cylinder to form free-standing electrodes with thicknesses of about 50 and 100 m, respectively. The as-prepared free-standing electrodes were heated in a vacuum oven at 110° C. for 4 hours to remove the residual water and ethanol. The mass loading of free-standing AA-$Ti_3C_2$ electrodes was in the range of 5.0 to 5.5 mg cm-2.

Example 5

Electrochemical Tests.

All electrochemical tests were performed in Swagelok three-electrode T-cells with AA-$Ti_3C_2$ as the working electrode, activated carbon as the counter electrode, and an Ag wire as the reference electrode. To balance the charge, the mass of the counter electrode was at least 3 times larger than that of the working electrode. Glassy carbon electrodes (CH Instruments, USA) were employed as current collectors. Glass fibers (Whatman, Grade A, GE healthcare) were used as the separators. A neat room temperature ionic liquid, 1-ethyl 1-3-methylimidazolium bis(trifluoromethylsulfonyl) imide (EMIMTFSI), and 1 M EMIMTFSI in acetonitrile (ACN) were employed as electrolytes. After adding the electrolyte, all the T-cells were wrapped by Parafilm. All the cells assembly processes were conducted in an Ar-filled glovebox with $H_2O$ and $O_2$ less than 0.1 ppm. All cells were tested at 30° C.

Cyclic voltammograms (CVs) and electrochemical impedance spectroscopy (EIS) tests were performed using a multi-channel Bio-Logic VMP3 potentiostat. All the electrodes were scanned 100 times at a scan rate of 100 mV $s^{-1}$ to stabilize the electrochemical performance before carrying out CV and EIS tests. The CVs were performed with scan rates from 1 to 100 mV $s^{-1}$. The EIS were collected at open circuit potential with an amplitude of 10 mV in a frequency range from 200 kHz to 10 mHz. The data were fitted and analyzed using an EC-Lab software (Bio-Logic, USA). Galvanostatic charge-discharge tests (GCD) with current densities from 0.2 to 10 A $g^{-1}$ were conducted on a Landt 2001A multi-channel system. The long-term stability testing was carried out at current densities of 1.0 and 5.0 A $g^{-1}$, respectively, for 10,000 cycles.

Example 6

Ex Situ Investigation of Electrochemically Tested Electrodes:

Ex-situ XRD tests were conducted using the pristine $Ti_3C_2T_x$ and $Ti_3C_2$-C12 free-standing electrodes after fully discharging to −1.8 V vs. Ag wire and recharging back to 1.0 V vs. Ag wire. Samples were fixed onto the XRD sample holder with Mylar film (6 m, TF-160, Premier Lab Supply, Inc, USA).

Ex-situ quasi elastic neutron scattering (QENS) experiments were performed on two sets of samples. The first set consisted of the untreated (before testing) $Ti_3C_2T_x$ and $Ti_3C_2$-C12 freestanding electrodes, which were used as control samples. The second set comprised the $Ti_3C_2T_x$ and $Ti_3C_2$-C12 electrodes disassembled from the cell and sealed in an Ar-filled glovebox after discharging to −1.8 V at 10 mA $g^{-1}$ (after testing). Those films were placed in aluminum foils separately and shaped into cylindrical rolls. The samples were kept inside the Teflon coated annular aluminum cans, which were sealed using Indium O-rings inside the glove box. The elastic neutron scattering measurements (fixed window scan) of the said samples were carried out using the NG-2 high flux backscattering spectrometer (HFBS) at the National Institute of Standards and Technology (NIST). A neutron wavelength of 6.271 Å with an energy of 2.08 meV was used during the measurements. The elastic neutron scattering intensity measured upon continuous heating (1 K/min) as a function of Q (Q=momentum transfer vector) was recorded by operating the instrument at a Doppler drive monochromator frequency of 0 Hz. The temperature dependent MSD was obtained from the elastic scattering data after normalizing to the base line temperature of 4 K.

Since the dynamics of the intercalated cations in MXene during the electrochemical cycling are of major importance, the inventors collected QENS spectra using the backscattering spectrometer (BASIS) at the Spallation Neutron Source at Oak Ridge National Laboratory. The spectra were collected at 300 K by operating the instrument in a standard configuration. This configuration of the instrument uses Si (111) analyzer crystals which Bragg reflect the scattered neutrons with the final wavelength of 6.267 Å. This set up provides a fine energy resolution of 3.5 μeV (Q-averaged full width at half maximum) and covers an energy range of ±100 μeV and Q range of 0.2-2.0 $Å^1$. The sample temperature at both spectrometers was controlled by top loading Closed Cycle Refrigerators (CCRs). Mantid and DAVE software packages were used for the data reduction and analysis.

The overall measured scattering intensity, I(Q,E), has a contribution from the elastic scattering, represented by a product of the elastic incoherent structure factor, $X_I(Q)$, and a delta function, $X_1(Q)^{\delta(E)}$, and a quasielectric contribution, S(Q,E). During the data analysis, the model dynamic structure factor is convoluted with the instrument resolution, R(Q,E), and a linear background term, B(Q,E), is added. The resulting model scattering intensity is fitted to the experimentally measured scattering intensity. The S(Q,E) was modeled to a sum of two Lorentzian functions. Thus, I(Q,E) can be represented by the following expression as reported in Slade et al.:

$$I(Q,E) = \Big[X_1(Q)\delta(E) + (1 - X_1(Q))\Big(p_1(Q)\frac{1}{\pi}\frac{\Gamma_1(Q)}{\Gamma_1^2(Q)+E^2} + (1 - p_i(Q))\frac{1}{\pi}\frac{\Gamma_2(Q)}{\Gamma_2^2(Q)+E^2}\Big)\Big] \otimes R(Q,E) + B(Q,E) \qquad (S1)$$

In this equation, $\Gamma_1(Q)$ and $\Gamma_2(Q)$ are the half width at half maximum (HWHM) of the two Lorentzian functions capturing a broad and a narrow dynamic components that represent a faster and a slower dynamics with their corresponding spectral weight of $p_1(Q)$ and $1-p_1(Q)$, respectively. The dependence of $\Gamma_1(Q)$ and $\Gamma_2(Q)$ on Q may suggest the presence of either long-rage or of localized motion of the hydrogen-bearing species in the systems. Note that QENS signal originates predominantly from the hydrogen-bearing species, because of the exceptionally high incoherent neutron scattering cross-section of hydrogen. The hydrogen-bearing species that are not mobile within the sensitivity of the instrument contribute only to the elastic incoherent scattering.

Example 7

Analysis of the Electrochemical Results.

The specific capacitances of AA-$Ti_3C_2$ were obtained from the anodic scan of the:

$$C = \frac{3.6\ C_o}{\mathrm{mV}} \qquad (S2)$$

wherein, C is the specific capacitances (in F/g) of AA-$Ti_3C_2$; $C_o$ is the anodic capacity (in mAh) recorded on the software; m is the mass (in g) of the electrode active materials (i.e., total electrode mass without the binder); and V is the potential window (in Volts). The areal and volumetric capacitances are calculated by replacing mass by electrode area (in $cm^2$) and volume (in $cm^3$), respectively.

Example 8

Molecular Dynamics (MD) Simulations.

MD simulations were performed to provide a molecular perspective on the experimental findings reported in the disclosure. All simulated systems were initialized with mBuild (as reported in Liang et al.) and were parametrized with foyer (as reported by Summers et al. and Köddermann et al.), a set of Python packages that belong to the molecular simulation and design framework (MoSDeF). $Ti_3C_2(OH)_2$ MXenes with repeat units of 20×20×1 were constructed with 20 alkylammonium cations in each pore. A bulk region of EMIMTFSI extending 10 nm away from the MXene sheets was initialized. 65 $EMIM^+$ and $TFSI^-$ ions were placed in each pore and 625 $EMIM^+$ and $TFSI^-$ ions were placed in the bulk region of the $Ti_3C_2(OH)_2$—C12 system. 75 $EMIM^+$ and $TFSI^-$ ions were placed in each pore and 737 $EMIM^+$ and $TFSI^-$ ions were placed in the bulk region of the $Ti_3C_2(OH)_2$—C16 system. Interlayer spacings of 1.31 nm and 1.63 nm were used for the $Ti_3C_2(OH)_2$—$C_{12}$ and $Ti_3C_2(OH)_2$—C16 systems, respectively, to match the Δd determined from the XRD data. To account for the net-positive charge due to the alkylammonium cations, the partial charges of the carbon atoms on the MXenes were adjusted to make the overall system electrically neutral. A set of parameters derived by Vlceck (65) were used to parametrize the MXene atoms. The EMIMTFSI atoms were modeled by a force field reported by Köddermann et al., and the alkylammonium atoms were modeled by a force field reported by Tsuzuki et al. Both sets of parameters originate from the optimized potentials for liquid systems (OPLS) force field, and have been further refined to better reproduce various properties of ionic liquid ions. Thus, all parameters utilize the same functional form for non-bonded and bonded interactions, combining rules, and 1-4 scaling factors. All simulations were run with GROMACS 2020 as reported by Hess et al., Essmann et al. and Bussi et al., The MXene atoms were frozen in place, and bonds containing hydrogen atoms were constrained to have fixed bond lengths through the use of the LINCS algorithm reported by Augustyn et al., Van der Waals and Coulomb interactions were cutoff at 1.2 nm, and long-range Coulomb interactions were computed with the Fast Smooth Particle-Mesh Ewald method reported by Gogotsi et al., Additionally, the number of k-space vectors to compute the long-range Coulomb interactions was set by a Fourier spacing of 0.12 nm. Temperature was controlled with the Bussi thermostat reported by Brezesinski et al. with separate groups for the MXene atoms and ion atoms. Steepest descent energy minimization was first run for 5000 steps to remove any unfavorable interactions due to initial packing. Equilibration was performed in the canonical ensemble (fixed molecule number N, volume V and temperature T) using a 1 fs timestep. During equilibration, the system was first run at a temperature of 303 K for 1 ns. The temperature was then slowly increased to 700 K over the course of 2 ns, in which the system was further equilibrated for 18 ns. The temperature was then slowly cooled to 393 K over 4 ns, and then was further equilibrated at 393 K for 25 ns. Each system was then sampled in the canonical ensemble for 50 ns using a 1 fs timestep. All files to run the simulations are contained within the "mxene_polymer_emim" repository contained on GitHub (see GitHub—rmatsum836/mxene_polymer_emim).

For MXene materials, the interlayer spacing, d, can be experimentally determined using 002 peak from XRD patterns. In this study, the interlayer spacing of pristine $Ti_3C_2T_x$ is 10.94 Å. When the alkylammonium cations intercalated $Ti_3C_2T_x$, the interlayer spacing was expanded. Therefore, the following equation can be used to estimate the change in the interlayer spacing:

$$\Delta d = d_{expanded} - 10.94 \quad (S3)$$

Example 9

Thermogravimetric Analysis (TGA)

Because of different levels of hydration for the samples, it is believed that it will be more accurate to correct the data by taking the samples weight at 120° C. as the starting point. An overall weight gain of about 17.3% was observed from the TGA data of the pristine $Ti_3C_2T_x$ powder. Therefore, the remaining weight percentage at 900° C. was divided by 1.173 to estimate the weight percentage of $Ti_3C_2T_x$. Then, the weight percentages of intercalated alkylammonium (AA) cations can be obtained using 100% minus the weight percentage of $Ti_3C_2T_x$. The number of intercalants per MXene can be calculated by finding the ratio of [the weight percentages of intercalated alkylammonium cations divided molecular weight of the AA cation] to [the weight percentage of $Ti_3C_2T_x$ divided by the molecular weight of $Ti_3C_2$—OF (OF is used as representative for the mixed surface termination in the molecular weight calculations)].

TABLE S1

Summary of TGA data for AA cations intercalated $Ti_3C_2T_x$ MXenes.

| Samples | $Ti_3C_2T_x$ | $Ti_3C_2$-C10 | $Ti_3C_2$-C12 | $Ti_3C_2$-C16 |
|---|---|---|---|---|
| Remaining wt. % starting from 120° C. | 1.173 | 1.092 | 1.052 | 1.01 |
| Wt. % of intercalated AA cations | NA | 6.9 | 10.3 | 13.9 |
| Wt. % of $Ti_3C_2T_x$ | 100 | 93.1 | 89.7 | 86.1 |
| Numbers of intercalant per $Ti_3C_2OF$ | NA | 0.08 | 0.1 | 0.11 |

Example 10

CVs Section

In capacitive systems, the current response to potential/voltage is very fast even at very slow scan rate, which means there is very small potential/voltage hysteresis between charge and discharge processes, especially, for fast scan rates. In CVs, this small hysteresis can be expressed small potential/voltage differences between charging peaks and discharging peaks at slow scan rates, which is also revealing the reversible reaction is pseudocapacitive mechanism as reported by Gogotsi et al.

Example 11

Capacitive and Diffusive Contribution Section

The total charge stores in an electrode can be classified into two components: the diffusive contribution and capacitive (surface controlled) contribution, including electrochemical double-layer capacitance (EDLC) and pseudocapacitance reported by Augustyn et al. and Brezesinski et al. The relationship between the CV current and the sweep rate can be represented by a power law relationship reported by Sathiya et al.

$$i_P = av^b \tag{S4}$$

where $i_P$ is the peak current (the anodic currents were used); v is the scan rate, a and b are adjustable parameters. The b value reflects the rate-determining step, and specifically, b=0.5 means a semi-infinite diffusion-controlled step, while b=1 means a surface-controlled step, as reported by Ju et al.

For capacitive process, the capacitive current is related to scan rate, obeying the following equation as reported by Lindström et al.:

$$i(V) = AC_d v \tag{S5}$$

where i is the current at a specific potential from CVs; A is the surface area of electrode; $C_d$ is the capacitance; and v is the scan rate.

For diffusive process, the current can be described using Randles-Sevcik equation as reported by Liang et al.:

$$i(V) = (2.69\times 10^5)n^{3/2}AD^{1/2}\Delta C_0 v^{1/2} \tag{S6}$$

where i is the current at a specific potential from CVs; n is the numbers of transfer electron; A is the surface area of electrode; D is the diffusion coefficient; $\Delta C_0$ is the concentration of surface reaction; and v is the scan rate.

Therefore, the current at a specific potential from CVs depends on the scan rates, as described by the following equation reported by Forghani et al. and He et al.:

$$i(V) = k_1 v + k_2 v^{1/2} \tag{S7}$$

where i(V) is the current at a specific potential; and $k_1v$ and $k_2\ v^{1/2}$ represent the currents from surface-controlled and diffusion-controlled processes, respectively. Therefore, the contributions from surface and diffusive processes can be quantified by fitting the plots of $v^{1/2}$ versus $i(V)/v^{1/2}$ (as shown in FIGS. 11 and 12).

To quantitate the contributions from capacitive and diffusion processes, $k_1$ or $k_2$ need to be calculated. Equation S4 can be changed into the following equation:

$$i(V)/v^{1/2} = k_1 v^{1/2} + k_2 \tag{S8}$$

Therefore, k1 can be determined by fitting the plot of $v^{1/2}$ versus $i(V)/v^{1/2}$. In this analysis, the different potentials of −1.8, −1.5, −1.0, −0.5, 0, 0.5, and 1.0 V were chosen to do the fitting.

As shown in FIG. 11, the plots were fitting using the scan rates from 1 to 100 mV $s^{-1}$ and from 1 to 20 mV $s^{-1}$, respectively. It can be observed that $k_1$ values are different from FIGS. 11A and 11B. With the scan rates from 1 to 100 mV $s^{-1}$, the goodness of fit is smaller than the one with the scan rates from 1 to 20 mV $s^{-1}$, reflecting that the fitting result is better at the scan rates from 1 to 20 mV $s^{-1}$. Therefore, it is more accurate to take slow scan rates, which is agree with the previous reports by Augustyn et al., Brezesinski et al. and Chao et al.

For anodic scan, the currents were picked at 1.0, 0.5, 0, −0.5, −1.0, −1.5 V, and the cathodic currents were chosen at −1.8, −1.5, −1.0, −0.5, 0, 0.5 V, as shown in FIG. 11. After fitting all the points, $k_1$ was obtained, then the anodic and cathodic currents can be achieved by using $k_1v$. Finally, the capacitive contribution ratios can be calculated through integrating the CVs, as presented in FIGS. 12-18.

For pristine $Ti_3C_2T_x$ and AA-$Ti_3C_2$ electrodes, the surface-controlled capacitive contributions are varied at 1 mV $s^{-1}$, while the capacitive contributions are similar at 20 mV $s^{-1}$ (as shown in FIGS. 12-18). In detail, for pristine $Ti_3C_2T_x$ and AA-$Ti_3C_2$ electrodes, the ratios of capacitive contribution significantly increase when the scan rate increased from 1 to 20 mV $s^{-1}$, because of the fast response to the increased scan rates from capacitive behavior. For pristine $Ti_3C_2T_x$, $Ti_3C_2$-C6, and $Ti_3C_2$-C8, the ratios of capacitive contribution at different scan rates are similar. The reason is that even though the interlayer spacing was expanded about 3.28-3.68 Å, it is still not large enough for $EMIM^+$ to intercalate and de-intercalate freely. The similar capacitive contribution ratios are also an evidence that the surface-controlled capacitive behavior, for pristine $Ti_3C_2T_x$, $Ti_3C_2$-C6, and $Ti_3C_2$-C8, is dominant by EDLC. For $Ti_3C_2$-C10 and $Ti_3C_2$-C12, the surface-controlled capacitive contribution ratios slightly increase, indicating fast capacitive response at all scan rates, which is beneficial for achieving high power density. For $Ti_3C_2$-C16, it is noticeable that the electrochemical capacitive charge is a limited step at low scan rates (1, 2, and 5 mV $s^{-1}$), but it turns to control step at 10 and 20 mV $s^{-1}$. The electrochemical mechanism change is due to the large charge-transfer resistance and the response balance between diffusion and surface-controlled processes. Therefore, it can be concluded that the surface-controlled capacitive process is the dominant step (except $Ti_3C_2$-C16) at different scan rates, and the surface-controlled capacitive contribution ratios become larger with increasing the expanded interlayer spacing.

Example 12

EIS Section

EIS is a powerful technique to investigate the electrochemical kinetics of pristine $Ti_3C_2T_x$ and AA-$Ti_3C_2$ electrodes in EMIMTFSI/ACN electrolyte. To further understand the EIS data, the real part of admittance is analyzed in the following equation:

$$Y'(\omega) = Z'(\omega)/[(Z'(\omega))^2 + (Z''(\omega))^2],$$

wherein the real part of admittance is proportional to the real part of conductivity $\sigma'(\omega)\sim Y'(\omega)$, and applied the ideas developed in this analysis as reported by Gainaru et al.

In the data representation as a real part of admittance/conductivity three regimes are clearly observed (as shown in FIG. 2C): i) electrode polarization at low frequency caused by accumulation of ions at surface of electrodes; ii) an almost constant plateau of DC regime; and iii) high frequency power law tail of AC regime. As shown in previous studies by Gainaru et al., the characteristic frequency $\omega^*=2\pi\upsilon^*$ between AC and DC regime defines the conductivity relaxation time $\tau_\sigma=1/\omega^*=1/(2\pi\upsilon^*)$, which corresponds to characteristic crossover time between individual jumps of charge carriers and Fickian diffusion regime resulting in DC-conductivity. In turn, the relaxation time is related to the self-diffusion coefficient via characteristic length of ion rearrangements, $D=\lambda^2/(6\ \tau_\sigma)$. In bulk systems the characteristic length of ion rearrangements is about 1-5 angstrom (as reported by Gainaru et al. and Stacy et al.) and comparable to the average distance between the ions. Thus, knowing the conductivity relaxation time provides a way to estimate the diffusion coefficient in confinement. For quantitative analysis, instead of random barrier model, which is usually applied in bulk systems, the inventors used the empirical Jonscher law (as reported by Jonscher et al.), $Y'(\omega)\sim\sigma'(\omega)=\sigma_{DC}(1+(i\omega\tau_\sigma)^a)$, with electrode polarization correction (as reported by Ishai et al. and Khamzin et al.). In FIG. 2D, the conductivity relaxation times for $Ti_3C_2$-C10, $Ti_3C_2$-C12, and $Ti_3C_2$-C16 are presented. Taking into account a possible broad variation of characteristic length in confinement (1-7 angstrom), the diffusion coefficient estimate varies in the range from $10^{-15}$ to $10^{-13}$ $m^2$/sec. Surprisingly, the diffusion decreases (relaxation time increases) with increasing d-spacing, which might be attributed to better intercalation of ions in the larger pore. For smaller interlayer distance, the AC-DC transition is out of the measured frequency range (see FIG. 2C), indicating faster ion dynamics and might be explained by the lack of ions intercalated in the interlayer, resulting in dominance of surface ion dynamics, which is faster than the dynamics of ions in the interlayer space.

TABLE S2

System resistances and charge-transfer resistances of AA-$Ti_3C_2$ electrodes.

| | $Ti_3C_2T_x$ | $Ti_3C_2$-C6 | $Ti_3C_2$-C8 | $Ti_3C_2$-C10 | $Ti_3C_2$-C12 | $Ti_3C_2$-C16 |
|---|---|---|---|---|---|---|
| $R_s$ (ohm) | 5.8 | 8.7 | 10.6 | 12.5 | 13.7 | 15.6 |
| $R_{ct}$ (ohm) | 1.9 | 3.4 | 4.2 | 4.4 | 8.6 | 10.4 |

Example 13

Preparation of Alkylammonium Cations-Intercalated $Nb_2CT_x$ MXenes

The alkylammonium (AA) cations-intercalated $Nb_2CT_x$ multilayer MXenes, denoted AA-$Nb_2C$, were prepared through a wet chemistry etching and ion-exchange intercalation method, similar to the method of preparing the AA-$Ti_3C_2T_x$ multilayer MXenes. In this experiment, 1 g of $Nb_2AlC$ powder (<45 microns) was slowly immersed into a 50 mL mixed solution of 48 wt. % aqueous hydrofluoric acid (HF, 48-51%, Acros Organics, USA) and 1 g lithium chloride (LiCl, 99%, Alfa Aesar, USA) in an HDPE reaction vessel that was initially kept in an ice bath. Then, the reaction vessel was transferred to an oil bath and kept at 50° C. for the duration of the treatment of about 72 hours. After that, the mixture was centrifuged at 3500 rpm to separate the solution from the powders, then the settled powders were washed twice using 6 M aqueous hydrochloric acid (HCl, 37%, Fisher Chemicals, USA) and centrifuged at 3500 rpm. This was followed by washing twice using degassed deionized (DI) water. The remaining wet sediments were then immersed into 0.5 M alkylammonium (AA) salts aqueous solutions. The employed alkylammonium salts, $[(CH_3)_3NC_nH_{2n+1}]^+$, were hexyl-, octyl-, decyl-, dodecyl- and hexadecyl-trimethylammonium, denoted as C6, C8, C10, C12 and C16, respectively. The mixed solutions were allowed to rest at room temperature (RT) for about 8 days with manual shaking daily. After washing using degassed DI water for four times, the materials were dried using vacuum-assisted filtration to yield the final MXenes, denoted as $Nb_2C$—C6, $Nb_2C$—C8, $Nb_2C$—C10, $Nb_2C$—C12, and $Nb_2C$—C16, respectively.

Example 14

Materials Characterization of $Nb_2C$—C12.

X-ray diffraction (XRD) patterns of the as-prepared AA-$Nb_2C$ samples in Example 14 were obtained using a Rigaku Smart Lab powder diffractometer configured with a Cu $K_\alpha$ radiation ($\lambda$=0.154 nm) with a scan rate of 1.0° $min^{-1}$ at 40 kV voltage and 40 mA current. As shown in FIG. 24, C12 intercalation in $Nb_2CT_x$ MXene resulted in a shift in the 002 diffraction peak from a 2θ of about 7.7° to about 4.8°. This change corresponds to an increase in the d-spacing from 1.15 nm to 1.84 nm. Thus, the expanded interlayer spacings relative to pristine $Nb_2CT_x$, Δd, was calculated to be about 6.9 Å for $Nb_2C$—C12. As detailed in Example 14, a solution of HF and LiCl was used as the etchant to remove Al from $Nb_2AlC$, and allow for the intercalation of $Li^+$ ions to intercalate into the layers of $Nb_2CT_x$, yielding Li-intercalated $Nb_2CT_x$. When alkylammonium (AA) cations were introduced into the system, $Li^+$ and AA cations are exchanged with each other, leading to AA-cations-intercalated $Nb_2CT_x$ multilayer MXenes (denoted AA-$Nb_2C$). The different AA cations, $[(CH_3)_3NC_nH_{2n+1}]^+$, used are denoted as C6, C8, C10, C12 and C16 according to the n values (6, 8, 10, 12 and 16, respectively). The expanded interlayer spacing from pristine MXene to intercalated MXene, Δd, can be calculated based on X-ray diffraction data (not shown). The inventors found that the longer the chain lengths of the intercalating AA cations, the larger the d-spacing of AA cations intercalated $Nb_2CT_x$ MXene. The expanded interlayer spacings relative to pristine $Nb_2CT_x$, Δd, were calculated to be about 6.9 Å for $Nb_2C$—C12, as shown in FIG. 24.

Numerous specific details are set forth such as examples of specific components, devices, compositions, and methods, to provide a thorough understanding of embodiments of the present disclosure. It will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail. Equivalent changes, modifications and variations of some embodiments, materials, compositions, devices, and methods can be made within the scope of the present technology, with substantially similar results.

The following non-limiting discussion of terminology is provided with respect to the present technology. The headings (such as "Introduction" and "Summary") and subheadings used herein are intended only for general organization of topics within the present disclosure and are not intended to limit the present disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein the term "comprising" or "comprises" is used in reference to compositions, methods, and respective component(s) thereof, that are essential to the invention, yet open to the inclusion of unspecified elements, whether essential or not. Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

"A" and "an" as used herein indicate "at least one" of the item is present; a plurality of such items may be present, when possible.

"About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. As used herein, the term "about" when used in connection with a value may refer to ±10% variation from the value. Other than in the operating examples, or where otherwise indicated, all numbers expressing quantities of ingredients or reaction conditions used herein should be understood as modified in all instances by the term "about."

As used herein, "about," "approximately," "essentially" and "substantially" are understood to refer to numbers in a range of numerals, for example the range of −10% to +10% of the referenced number, or −5% to +5% of the referenced number, or −1% to +1% of the referenced number, or −0.1% to +0.1% of the referenced number.

As used herein, the term "substantially no," "essentially free" or "substantially free" as used in reference to a particular component may mean that any of the component present constitutes less than 10% by weight, such as less than 9%, less than 8%, less than 7%, less than 6%, less than 5%, less than 4%, less than 3%, less than 2%, less than 1%, less than 0.5% or less than 0.1% by weight.

As used herein, and unless specified otherwise the term "partially" refers to a range of more than 0% and lower than 100%.

As used herein, the term "room temperature" may refer to a temperature in a range of 25° C.±5° C., or 25° C.±3 C.

As used herein, the term "substantially unchanged" by a process (e.g., reacting or heating) refers to a change in value of a characteristic of less than 20%. In embodiments, "substantially unchanged" refers to a change in value of a characteristic of less than 20%, less than 10%, less than 5%, less than 1%, less than 0.5%, or less than 0.1% relative to the value of the characteristic before the process.

As used herein, the term "and/or" includes any and all combinations of one or more of the associated listed items.

As used herein, the term "between" in the context of a range is inclusive of the two ends of the range, unless specified otherwise.

The abbreviation, "e.g." or "i.e." are used herein to indicate a non-limiting example. Thus, the abbreviation "e.g." or "i.e." is synonymous with the term "for example." Where used herein, the terms "example" and "such as," particularly when followed by a listing of terms, are merely exemplary and illustrative and should not be deemed to be exclusive or comprehensive.

What is claimed is:

1. A supercapacitor comprising:
an electrode comprising an electrode material, the electrode material comprising:
$M_{n+1}X_nT_x$ layers having interlayers therebetween,
wherein the M is selected from the group of Group 3, 4, 5, 6, and 7 transition metals and a combination thereof,
wherein X is C, N, or a combination thereof,
wherein n is 1, 2, 3, or 4,
wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof, and
an intercalant located in at least a portion of the interlayers; and
an electrolyte comprising a room temperature ionic liquid (RTIL), wherein the intercalant comprises an alkylammonium (AA) cation selected from a formula $[(CH_3)_3NC_nH_{2n+1}]^+$, wherein n is in a range of 3-30.

2. The supercapacitor of claim 1, wherein the alkylammonium (AA) cation comprises $[(CH_3)_3NC_{12}H_{25}]^+$.

3. The supercapacitor of claim 1, wherein the M is selected from the group of Ti, Nb, Sc, V, Cr, Y, Zr, Mo, Hf, Ta, W, and a combination thereof.

4. The supercapacitor of claim 1, wherein the room-temperature ionic liquid (RTIL) comprises an organic cation selected from the group of 1-ethyl-3-methyl imidazolium ($EMIM^+$), 1-alkyl-3-methyl-imidazolium, 1-alkyl-2,3-methyl-imidazolium, tetraalkylammonium, trialkylsulfonium, tetraalkylphosphonium, 1-alkylpyridinium, N-alkyl-N-methyl-morpholinium, 1-alkyl-1-methyl-piperidinium, 1-alkyl-1-methyl-pyrrolidinium, 3-methylpyridinium, 1-methylimidazolium, or a combination thereof, wherein the alkyl is a $C_1$-$C_{50}$ alkyl.

5. The supercapacitor of claim 1, wherein the room-temperature ionic liquid (RTIL) comprises an organic anion selected from bis-(trifluoromethylsulfonyl)-imide ($TFSI^-$), dicyanamide ($N(CN)_2^-$), hexafluorophosphate ($PF_6^-$), tetrachloroaluminate, thiocyanate ($SCN^-$), halides, tetrafluoroborate, hexafluorophosphate, tris(pentafluoroethyl) Trifluorophosphate, alkylsulfate, methanesulfonate, trifluoromethanesulfonate, bis(fluorosulfonyl)imide, (fluorosulfonyl) (trifluoromethanesulfonyl)imide, bis(trifluoromethanesulfonyl)imide, dicyanamide, bis(oxalato)borate, or a combination thereof, wherein the alkyl comprises a $C_1$-$C_{50}$ alkyl.

6. The supercapacitor of claim 1, wherein the $M_{n+1}X_nT_x$ layers have a d-spacing in a range of about 1.0-20 nm, and the difference in d-spacing, Δd, between pristine $M_{n+1}X_nT_x$ layers and the $M_{n+1}X_nT_x$ layers including the intercalant is in a range of about 0.1-20 nm.

7. The supercapacitor of claim 1, wherein the RTIL comprises 1-ethyl-3-methyl imidazolium bis-(trifluoromethylsulfonyl)-imide (EMIMTFSI).

8. The supercapacitor of claim 1, wherein the $M_{n+1}X_nT_x$ layers comprise $Ti_3C_2T_x$ layers.

9. The supercapacitor of claim 1, wherein the $M_{n+1}X_nT_x$ layers comprise $Nb_2CT_x$ layers.

10. A method of preparing a supercapacitor according to claim 1, the method comprising:
incorporating into the electrode the electrode material comprising the $M_{n+1}X_nT_x$ layers having interlayers therebetween and the intercalant located in at least a portion of the interlayers,
incorporating the electrode into the supercapacitor; and
incorporating the electrolyte comprising the room-temperature ionic liquid (RTIL) into the supercapacitor.

11. A supercapacitor comprising:
an electrode comprising an electrode material, the electrode material comprising:
$M_{n+1}X_nT_x$ layers having interlayers therebetween,
wherein the M is selected from the group of Group 3, 4, 5, 6, and 7 transition metals and a combination thereof,
wherein X is C, N, or a combination thereof,
wherein n is 1, 2, 3, or 4,
wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof; and
an intercalant located in at least a portion of the interlayers; and
an electrolyte comprising a room temperature ionic liquid (RTIL), wherein the $M_{n+1}X_nT_x$ layers have a unit cell and the amount of the intercalant located in the interlayers of the $M_{n+1}X_nT_x$ layers is in a range of about 0.01-1 intercalant cations per $M_{n+1}X_nT_x$ unit cell.

12. The supercapacitor of claim 11, wherein the $M_{n+1}X_nT_x$ layers comprise $Ti_3C_2T_x$ layers, the intercalant comprises an alkylammonium (AA) cation, and the amount of the alkylammonium cation located in the interlayers of the $Ti_3C_2T_x$ layers is in a range of about 0.01-1 of the alkylammonium cations per $Ti_3C_2T_x$ unit cell.

13. The supercapacitor of claim 11, wherein the $M_{n+1}X_nT_x$ layers comprise $Nb_2CT_x$ layers, the intercalant comprises an alkylammonium (AA) cation, and the amount of the alkylammonium cation located in the interlayers of the $Nb_2CT_x$ layers is in a range of about 0.01-1 of the alkylammonium cation per $Nb_2CT_x$ unit cell.

14. A supercapacitor comprising:
an electrode comprising an electrode material, the electrode material comprising:
$M_{n+1}X_nT_x$ layers having interlayers therebetween,
wherein the M is selected from the group of Group 3, 4, 5, 6, and 7 transition metals and a combination thereof, wherein X is C, N, or a combination thereof,
wherein n is 1, 2, 3, or 4,
wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof; and
an intercalant located in at least a portion of the interlayers; and
an electrolyte comprising a room temperature ionic liquid (RTIL), wherein the room temperature ionic liquid (RTIL) comprises a blend of 1-butylimidazole (BuIM) and bis(trifluoromethanesulfonyl)imide ($HNTf_2$) solution in a molecular ratio in a range of about 0.6:0.4 to 0.9:0.1.

15. A supercapacitor comprising:
an electrode comprising an electrode material, the electrode material comprising:
$M_{n+1}X_nT_x$ layers having interlayers therebetween,
wherein the M is selected from the group of Group 3, 4, 5, 6, and 7 transition metals and a combination thereof,
wherein X is C, N, or a combination thereof,
wherein n is 1, 2, 3, or 4,
wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof; and
an intercalant located in at least a portion of the interlayers; and
an electrolyte comprising a room temperature ionic liquid (RTIL), wherein the RTIL comprises an organic cation, and the electrode material further comprises the organic cation located in the interlayers of the $M_{n+1}X_nT_x$ layers in a density in a range of about 50-1500 $kg/m^3$.

16. A supercapacitor comprising:
an electrode comprising an electrode material, the electrode material comprising:
$M_{n+1}X_nT_x$ layers having interlayers therebetween,
wherein the M is selected from the group of Group 3, 4, 5, 6, and 7 transition metals and a combination thereof,
wherein X is C, N, or a combination thereof,
wherein n is 1, 2, 3, or 4,
wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof; and
an intercalant located in at least a portion of the interlayers; and
an electrolyte comprising a room temperature ionic liquid (RTIL), wherein the RTIL comprises an organic anion, and the electrode material further comprises the organic anion located in the interlayers of the $M_{n+1}X_nT_x$ layers in a density in a range of about 50-2000 $kg/m^3$.

17. An electrode material comprising:
$M_{n+1}X_nT_x$ layers having interlayers therebetween and an intercalant located in at least a portion of the interlayers, wherein the intercalant comprises an alkyl-ammonium (AA) cation selected from a formula $[(CH_3)_3NC_nH_{2n+1}]^+$, wherein n is in a range of 3-30,
wherein M is selected from the group of Group 3, 4, 5, 6, and 7 transition metals and a combination thereof,
wherein X is C, N, or a combination thereof,
wherein n is 1, 2, 3, or 4,
wherein $T_x$ comprises a termination group selected from the group of alkoxide, alkyl, carboxylate, halide, fluorine (F), chlorine (Cl), hydroxide, hydride, oxide, sub-oxide, nitride, sub-nitride, sulfide, sulfonate, thiol, and a combination thereof, and
the $M_{n+1}X_nT_x$ layers further comprising an organic cation of an RTIL located in at least a portion of the interlayers.

18. A supercapacitor comprising:
an electrode comprising an electrode material, the electrode material comprising:
$M_{n+1}X_nT_x$ layers having interlayers therebetween,
wherein the M is selected from the group of Group 3, 4, 5, 6, and 7 transition metals and a combination thereof,
wherein X is C, N, or a combination thereof,
wherein n is 1, 2, 3, or 4,
wherein $T_x$ comprises a termination group selected from the group of alkoxide, alkyl, carboxylate, halide, fluorine (F), chlorine (CI), hydroxide, hydride, oxide, sub-oxide, nitride, sub-nitride, sulfide, sulfonate, thiol, and a combination thereof; and
an intercalant located in at least a portion of the interlayers; and
an electrolyte comprising a room temperature ionic liquid (RTIL), wherein the RTIL is neat such that it is not combined with a solvent.

19. The supercapacitor of claim 18, wherein the intercalant comprises an alkyl-ammonium (AA) cation.

20. The supercapacitor of claim 19, wherein the alkyl-ammonium (AA) cation is selected from a formula $[(CH_3)_3NC_nH_{2n+1}]^+$, wherein n is in a range of 3-30.

* * * * *